(12) United States Patent
Matas et al.

(10) Patent No.: US 9,459,792 B2
(45) Date of Patent: Oct. 4, 2016

(54) PORTABLE ELECTRONIC DEVICE FOR PHOTO MANAGEMENT

(71) Applicant: Apple Inc., Cupertino, CA (US)

(72) Inventors: Michael Matas, San Francisco, CA (US); Greg Christie, San Jose, CA (US); Paul D. Marcos, Los Altos, CA (US); Scott Forstall, Los Altos, CA (US); Marcel Van Os, San Francisco, CA (US); Bas Ording, San Francisco, CA (US); Imran Chaudhri, San Francisco, CA (US)

(73) Assignee: APPLE INC., Cupertino, CA (US)

(*) Notice: Subject to any disclaimer, the term of this patent is extended or adjusted under 35 U.S.C. 154(b) by 433 days.

(21) Appl. No.: 13/666,943

(22) Filed: Nov. 1, 2012

(65) Prior Publication Data

US 2013/0061175 A1    Mar. 7, 2013

Related U.S. Application Data

(63) Continuation of application No. 13/361,912, filed on Jan. 30, 2012, now Pat. No. 8,305,355, and a continuation of application No. 11/848,210, filed on Aug. 30, 2007, now Pat. No. 8,106,856.

(Continued)

(51) Int. Cl.
*G06F 3/048* (2013.01)
*G06F 3/0488* (2013.01)
(Continued)

(52) U.S. Cl.
CPC ......... *G06F 3/04883* (2013.01); *G06F 3/0485* (2013.01); *G06F 3/0488* (2013.01);
(Continued)

(58) Field of Classification Search
CPC ............. G06F 3/04883; G06F 3/0485; G06F 3/0488; G06F 3/013; G06F 3/005; G06F 2203/04806; G06F 17/30274; G02B 2027/0138; H04N 5/23293; H04N 5/23216; H04N 5/2621; H04N 1/00307; H04N 21/41407
USPC ....................................................... 715/863
See application file for complete search history.

(56) References Cited

U.S. PATENT DOCUMENTS 5,677,708 A   10/1997   Matthews, III et al.
5,825,349 A   10/1998   Maier et al.
(Continued)

FOREIGN PATENT DOCUMENTS

CN   1404233 A   3/2003
CN   1590969 A   3/2005
(Continued)

OTHER PUBLICATIONS

Notice of Acceptance received for Australian Patent Application No. 2011265412, mailed on Nov. 12, 2014, 2 pages.
(Continued)

*Primary Examiner* — Tadeese Hailu
(74) *Attorney, Agent, or Firm* — Morrison & Foerster LLP

(57) ABSTRACT

A portable electronic device with a touch screen display for photo management is disclosed. One aspect of the invention involves a computer-implemented method in which the portable electronic device displays an array of thumbnail images corresponding to a set of photographic images. The device replaces the displayed array of thumbnail images with a user-selected photographic image upon detecting a user contact with a corresponding thumbnail image in the array. The user-selected photographic image is displayed at a larger scale than the corresponding thumbnail image. The portable device displays a different photographic image in replacement of the user-selected photographic image in accordance with a scrolling gesture. The scrolling gesture comprises a substantially horizontal movement of user contact with the touch screen display.

15 Claims, 40 Drawing Sheets

Related U.S. Application Data

(60) Provisional application No. 60/937,993, filed on Jun. 29, 2007, provisional application No. 60/947,118, filed on Jun. 29, 2007, provisional application No. 60/879,469, filed on Jan. 8, 2007, provisional application No. 60/879,253, filed on Jan. 7, 2007, provisional application No. 60/883,785, filed on Jan. 6, 2007, provisional application No. 60/824,769, filed on Sep. 6, 2006.

(51) Int. Cl.
| | | |
|---|---|---|
| *G06F 3/0485* | (2013.01) | |
| *H04M 1/725* | (2006.01) | |
| *H04N 5/232* | (2006.01) | |
| *H04N 1/00* | (2006.01) | |
| *H04N 101/00* | (2006.01) | |

(52) U.S. Cl.
CPC ...... *G06F3/04886* (2013.01); *H04M 1/72555* (2013.01); *H04N 1/00411* (2013.01); *H04N 1/00442* (2013.01); *H04N 1/00453* (2013.01); *H04N 1/00458* (2013.01); *H04N 1/00461* (2013.01); *H04N 5/23216* (2013.01); *G06F 2203/04808* (2013.01); *H04N 1/00347* (2013.01); *H04N 2101/00* (2013.01); *H04N 2201/0087* (2013.01); *H04N 2201/0089* (2013.01); *H04N 2201/325* (2013.01); *H04N 2201/3226* (2013.01); *H04N 2201/3273* (2013.01)

(56) References Cited

U.S. PATENT DOCUMENTS

| | | | |
|---|---|---|---|
| 6,069,626 A | | 5/2000 | Cline et al. |
| 6,181,316 B1 | | 1/2001 | Little et al. |
| 6,237,010 B1 | * | 5/2001 | Hui .................. G06T 17/00 345/428 |
| 6,301,586 B1 | * | 10/2001 | Yang ............... G06F 17/30017 |
| 6,334,025 B1 | * | 12/2001 | Yamagami ........... G11B 27/105 386/241 |
| 6,570,594 B1 | | 5/2003 | Wagner |
| 6,784,925 B1 | * | 8/2004 | Tomat ................ G06F 3/0481 348/207.11 |
| 6,920,619 B1 | | 7/2005 | Milekic |
| 7,152,210 B1 | | 12/2006 | Van Den Hoven et al. |
| 7,164,410 B2 | | 1/2007 | Kupka |
| 7,469,381 B2 | | 12/2008 | Ording |
| 7,783,990 B2 | | 8/2010 | Amadio et al. |
| 7,786,975 B2 | | 8/2010 | Ording et al. |
| 7,823,080 B2 | | 10/2010 | Miyajima |
| 8,024,658 B1 | * | 9/2011 | Fagans ............... G06Q 30/0621 715/243 |
| 8,106,856 B2 | | 1/2012 | Matas et al. |
| 8,339,420 B2 | * | 12/2012 | Hiraoka ..................... 345/660 |
| 2002/0021758 A1 | * | 2/2002 | Chui ..................... 375/240.19 |
| 2002/0051018 A1 | | 5/2002 | Yeh |
| 2003/0048291 A1 | | 3/2003 | Dieberger |
| 2003/0055905 A1 | | 3/2003 | Nishiyama et al. |
| 2003/0122787 A1 | | 7/2003 | Zimmerman et al. |
| 2004/0021676 A1 | | 2/2004 | Chen et al. |
| 2004/0119758 A1 | | 6/2004 | Grossman et al. |
| 2004/0135797 A1 | | 7/2004 | Meier et al. |
| 2004/0205504 A1 | | 10/2004 | Phillips |
| 2004/0239792 A1 | | 12/2004 | Shibutani et al. |
| 2005/0041035 A1 | * | 2/2005 | Nagatomo et al. ........... 345/601 |
| 2005/0062130 A1 | | 3/2005 | Ciancio et al. |
| 2005/0071767 A1 | * | 3/2005 | Kirkland ........... H04M 1/72555 715/753 |
| 2005/0073601 A1 | * | 4/2005 | Battles ............... H04N 1/00458 348/333.05 |
| 2005/0102635 A1 | * | 5/2005 | Jiang et al. ................... 715/851 |
| 2005/0104848 A1 | | 5/2005 | Yamaguchi et al. |
| 2005/0160377 A1 | * | 7/2005 | Sciammarella ....... G06F 3/0481 715/838 |
| 2005/0183026 A1 | | 8/2005 | Amano et al. |
| 2005/0195221 A1 | * | 9/2005 | Berger .................. G06F 3/0481 345/660 |
| 2005/0259116 A1 | | 11/2005 | Araoka |
| 2006/0001652 A1 | | 1/2006 | Chiu et al. |
| 2006/0017692 A1 | * | 1/2006 | Wehrenberg .......... G06F 1/1616 345/156 |
| 2006/0025218 A1 | | 2/2006 | Hotta |
| 2006/0026521 A1 | | 2/2006 | Hotelling et al. |
| 2006/0026536 A1 | * | 2/2006 | Hotelling .............. G06F 3/0418 715/863 |
| 2006/0077266 A1 | * | 4/2006 | Nurmi ............... H04M 1/72563 348/239 |
| 2006/0080386 A1 | * | 4/2006 | Roykkee et al. ............. 709/203 |
| 2006/0088228 A1 | | 4/2006 | Marriott et al. |
| 2006/0136839 A1 | * | 6/2006 | Makela .......................... 715/786 |
| 2007/0016868 A1 | | 1/2007 | Nurmi |
| 2007/0081740 A1 | * | 4/2007 | Ciudad .............. H04N 1/00286 382/276 |
| 2007/0136778 A1 | * | 6/2007 | Birger et al. .................. 725/117 |
| 2007/0204225 A1 | * | 8/2007 | Berkowitz et al. ........... 715/700 |
| 2007/0229678 A1 | * | 10/2007 | Barrus et al. ............... 348/231.3 |
| 2007/0245236 A1 | * | 10/2007 | Lee .................................... 715/530 |
| 2008/0030456 A1 | * | 2/2008 | Asadi ...................... G06F 3/017 345/156 |
| 2008/0052945 A1 | | 3/2008 | Matas et al. |
| 2008/0057941 A1 | * | 3/2008 | Scott et al. ...................... 455/425 |
| 2008/0059888 A1 | * | 3/2008 | Dunko ............................ 715/744 |
| 2008/0133697 A1 | * | 6/2008 | Stewart et al. ................ 709/217 |
| 2009/0021576 A1 | | 1/2009 | Linder et al. |
| 2015/0130719 A1 | | 5/2015 | Wehrenberg et al. |

FOREIGN PATENT DOCUMENTS

| | | |
|---|---|---|
| CN | 1685714 A | 10/2005 |
| CN | 1695105 A | 11/2005 |
| CN | 1702645 A | 11/2005 |
| CN | 1735921 A | 2/2006 |
| CN | 17856273 A | 4/2006 |
| EP | 1 124 175 A2 | 8/2001 |
| FR | 2 830 093 A3 | 3/2003 |
| GB | 2 4102 105 A | 12/2004 |
| GB | 2 420 260 A | 5/2006 |
| JP | 3-217976 A | 9/1991 |
| JP | 06-309138 A | 11/1994 |
| JP | 08-106469 A | 4/1996 |
| JP | 11-164175 A | 6/1999 |
| JP | 11-168694 A | 6/1999 |
| JP | 2000-221879 A | 8/2000 |
| JP | 2000-350134 A | 12/2000 |
| JP | 2001-265481 A | 9/2001 |
| JP | 2003-338975 A | 11/2003 |
| JP | 2003-345491 A | 12/2003 |
| JP | 2004-032346 A | 1/2004 |
| JP | 2004-145291 A | 5/2004 |
| JP | 2004-153832 A | 5/2004 |
| JP | 2004-288208 A | 10/2004 |
| JP | 2004-336536 A | 11/2004 |
| JP | 2005-515530 A | 5/2005 |
| JP | 2005-150836 A | 6/2005 |
| JP | 2005-202483 A | 7/2005 |
| JP | 2005-303728 A | 10/2005 |
| JP | 2006-140865 A | 6/2006 |
| JP | 2007-515775 A | 6/2007 |
| JP | 2007-525775 A | 9/2007 |
| JP | 2008-518330 A | 5/2008 |
| WO | WO 03/023593 A1 | 3/2003 |
| WO | WO 03/060622 A2 | 7/2003 |
| WO | WO 03/081458 A1 | 10/2003 |
| WO | WO 2004/032053 | 4/2004 |
| WO | WO 2005/060392 A2 | 7/2005 |
| WO | 2005/093550 A2 | 10/2005 |

(56) References Cited

FOREIGN PATENT DOCUMENTS

| WO | WO 2005/103863 A2 | 11/2005 |
|----|-------------------|---------|
| WO | WO 2006/045530 A2 | 5/2006  |
| WO | 2008030779 A2     | 3/2008  |

OTHER PUBLICATIONS

Office Action received for Canadian Patent Application No. 2,853,273, mailed on Feb. 23, 2015, 5 pages.
Board Opinion received for Chinese Reexamination Patent Application No. 200780001142.8, mailed on Oct. 21, 2014, 19 pages (7 pages of English Translation and 12 pages of Official copy).
Summons to Attend Oral Proceedings received for European Patent Application No. 11178259.5, mailed on Feb. 11, 2015, 9 pages.
YouTube, "Steve Jobs—iPhone Introduction in 2007 (Complete)", available at <https://www.youtube.com/watch?v=9hUlxyE2Ns8>, retrieved on Apr. 23, 2015, 3 pages.
US 2002/0018582 A1, 2/2002, Hagiwara et al. (withdrawn).
Dailywireless.org, "GPS Blogging Phones," 3 pages, Aug. 25, 2005, http://www.dailywireless.org/modules.php?name=News&file=article&sid=4163.
EECE418 Project Paper Prototype, "Team 2: Portable Digital Photo Album," 16 pages, May 8, 2008.
Gears, "Orange SPV C600 Review," coolsmartphone.com, Apr. 14, 2006, 58 pages, http://www.coolsmartphone.com/article569.html.
Google Earth Blog, "New Improved Panoramio—Geo Photo Sharing," 1 page, printed Feb. 5, 2008, http://www.gearthblog.com/blog/archives/2006/new_improved_pa.html.
Han, J. Y., "Multi-Touch Interaction Research," Jan. 2006,k 4 pages, http://mrl.nyu.edu/~jhan/ftirtrouch/.
Hinckley et al., "Sensing Techniques for Mobile Interaction," UIST 2000 Symposium on User Interface Software and Technology, CHI Letters 2 (2), Nov. 2000, San Diego, CA, 10 pages.
MS Mobiles.com—Simply Mobile, "New Program for Mobile Blogging for Pocket PC Release: My Blog," Jul. 23, 2005, 1 page, http://msmobiles.com/new.php/4067.html.
Versiontracker, "Photogather—7.2.6. Hi-res Image Viewer & Editor for Palm," Mar. 8, 2004, 5 pages, http://www.versiontracker.com/dyn/moreinfo/palm/4624.
YouTube, "Steve Jobs—2007 iPhone Presentation (Part 1 of 2)," uploaded to YouTube by UG3genki Jan. 20, 2011, http//www.youtube.com/watch?v=6uW-E496FXg&feature=player_embedded, 3 pages.
European Search Report dated Jan. 7, 2011, received in European Patent Applicatoin No. 10172417.7, which corresponds to U.S. Appl. No. 11/848,210.
European Search Report dated Oct. 31, 2011, recieved in European Application No. 11178257.9, which corresponds to U.S. Appl. No. 11/848,210 (Matas).
European Search Report dated Oct. 31, 2011, received in European Application No. 1117821559.5, which corresponds to U.S. Appl. No. 11/848,210 (Matas).
Invitation to Pay Additional Fees dated Jan. 28, 2008, received in International Application No. PCT/US2007/077441, which corresponds to U.S. Appl. No. 11/848,210.
International Search Report and Written Opinion dated May 8, 2008, for International Application No. PCT/US2007/077441, which corresponds to U.S. Appl. No. 11/848,210 (Matas).
Office Action dated Jun. 30, 2011, received in U.S. Appl. No. 11/848,210, 12 pages (Matas).
Notice of Allowance dated Dec. 20, 2011, received in U.S. Appl. No. 11/848,210 (Matas).
Notice of Acceptance dated Sep. 13, 2011, reicevied in Australian Patent Application No. 2009212904, which corresponds to U.S. Appl. No. 11/848,210 (Matas).
Office Action dated Mar. 15, 2010, received in Canadian Application No. 2,627,118, which corresponds to U.S. Appl. No. 11/848,210.

Notice of Allowance dated Jun. 14, 2011, received in Canadian Application No. 2,627,118, which corresponds to U.S. Appl. No. 11/848,210.
Office Action dated Jan. 8, 2010, received in Chinese Patent Application No. 200780001142.8, which corresponds to U.S. Appl. No. 11/848,210.
Office Action dated Jun. 17, 2011, received in Chinese Application No. 200780001142.8, which corresponds to U.S. Appl. No. 11/848,210.
Office Action dated May 3, 2012, received in Chinese Patent Application No. 200780001142.8, which corresponds to U.S. Appl. No. 11/848,210, 16 pages (Matas).
Office Action dated Jan. 14, 2013, received in Chinese Patent Application No. 200780001142.8, which corresponds to U.S. Appl. No. 11/848,210, 20 pages (Matas).
Office Action dated Jan. 11, 2012, received in Chinese Patent Application No. 201010227633.8, which corresponds to U.S. Appl. No. 11/848,210, 6 pages (Matas).
Office Action dated Sep. 14, 2010, recieved in German Patent Application No. 11 2007 000 067.8, which corresponds to U.S. Appl. No. 11/848,210.
Summons to oral proceedings dated Jan. 28, 2013, received in European Patent Application No. 10172417.7, which corresponds to U.S. Appl. No. 11/848,210, 6 pages (Matas).
Decision to Grant dated Jan. 30, 2013, recieved in European Patent Application No. 11178257.9, which corresponds to U.S. Appl. No. 11/848,210, 5 pages (Matas).
Office Action dated Jan. 4, 2013, recieved in European Patent Application No. 1178259.5, which corresponds to U.S. Appl. No. 11/848,210, 7 pages (Matas).
Office Action dated Aug. 15, 2011, recieved in Japanese Patent Application No. 2009-526943, which corresponds to U.S. Appl. No. 11/848,210 (Matas).
Decision to grant dated Dec. 2, 2011, received in Japanese Patent Application No. 2009 526943, which corresponds to U.S. Appl. No. 11/828,410, 5 pages (Matas).
Decision to Grant dated Jun. 7, 2013, received in Japanese Patent Application No. 2011-271621, which corresponds to U.S. Appl. No. 11/848,210, 3 pages (Matas).
Office Action dated Jan. 19, 2011, received in Korean Patent Application No. 10 2009 7007065, which corresponds to U.S. Appl. No. 11/848,210 (Matas).
Office Action dated Sep. 3, 2011, recieved in Korean Patent Application No. 10 2009 7007065, which corresponds to U.S. Appl. No. 11/848,210 (Matas).
Notice of Allowance dated Feb. 6, 2012, received in Korean Patent Application No. 1020097007065, which corresponds to U.S. Appl. No. 11/848,210, 6 pages (Matas).
Office Action dated Mar. 22, 2012 received in U.S. Appl. No. 13/361,912, 8 pages (Matas).
Notice of Allowance dated Ju. 2, 2012, received in U.S. Appl. No. 13/361,912, 10 pages (Matas).
International Preliminary Report on Patentability received for PCT Patent Application No. PCT/US2007/077441, issued on Mar. 10, 2009, 9 pages.
Office Action received for Chinese Patent Application No. 2007800011428, mailed on Jul. 2, 2013, 38 pages (26 pages of English Translation and 12 pages of Official Copy).
Decision to Grant received for Chinese Patent Application No. 201010227633.8, mailed on Jun. 5, 2012, 2 pages (Official Copy only).
Office Action received for European Patent Application No. 07814633.9, mailed on Aug. 10, 2009, 3 pages.
Summons to Attend Oral Proceedings received for European Patent Application No. 08705751.9, mailed on Oct. 28, 2011, 9 pages.
Intention to Grant received for European Patent Application No. 10172417.7, mailed on Jul. 9, 2013, 10 pages.
Office Action received for European Patent Application No. 10172417.7, mailed on Oct. 31, 2011, 6 pages.
Certificate of Grant received for Hong-Kong Patent Application No. 12105228.9, mailed on Oct. 25, 2013, 2 pages.

(56) References Cited

OTHER PUBLICATIONS

Office Action received for Japanese Patent Application No. 2013-140171, mailed on Jul. 22, 2014, 5 pages (3 pages of English Translation and 2 pages of Official Copy).
Notice of Allowance received for Korean Patent Application No. 10-2009-7009549, mailed on Jun. 11, 2012, 2 pages (Official Copy only).
Communication Regarding Intention to Grant received for the European Patent Application No. 07814633.9, mailed on Mar. 19, 2010, 4 pages.
Decision to Grant received for the European Patent Application No. 07814633.9, mailed on Sep. 2, 2010, 3 pages.
Decision to Grant received for the European Patent Application No. 10172417.7, mailed on Nov. 14, 2013, 3 pages.
Decision to Grant received for the European Patent Application No. 11178257.9, mailed on Jun. 20, 2013, 3 pages.
Notice of Allowance received for Japanese Patent Application No. 2013-140171, mailed on May 29, 2015, 4 pages(Official Copy only). (See Communication under 37 CFR § 1.98(a) (3)).
Notice of Allowance received for the Canadian Patent Application No. 2,853,273, mailed on Jan. 12, 2016, 1 page.
Office Action Received for Japanese Patent Application No. 2014-259225, mailed on Nov. 20, 2015, 2 pages. (Official copy only) (see attached 37 CFR § 1.98(a)(3)).
Office action received for the Indian Patent Application No. 2797CHENP2008, mailed on Jan. 29, 2014, 3 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Office Action received for Australian Patent Application No. 2015201028, issued on Mar. 15, 2016, 2 pages.
Office Action received for Japanese Patent Application No. 2014-259225, mailed on May 27, 2016, 4 pages (2 pages of English Translation and 2 pages of Official Copy).

* cited by examiner

2400

Detect a first movement of a physical object on or near the touch screen display
2402

▼

While detecting the first movement, translate a first digital object displayed on the touch screen display in a first direction, wherein the first digital object is associated with a set of digital objects
2404

▼

In response to display of a previously hidden edge of the first digital object and continued detection of the first movement, display an area beyond the edge of the first digital object
2406

▼

After the first movement is no longer detected, translate the first digital object in a second direction until the area beyond the edge of the first digital object is no longer displayed
2408

▼

Detect a second movement of the physical object on or near the touch screen display
2410

▼

In response to detecting the second movement while the previously hidden edge of the first digital object is displayed, translate the first digital object in the first direction and display a second digital object in the set of digital objects
2412

Figure 24

PORTABLE ELECTRONIC DEVICE FOR PHOTO MANAGEMENT

RELATED APPLICATIONS

This application is a continuation of U.S. application Ser. No. 13/361,912, filed Jan. 30, 2012, now U.S. Pat. No. 8,305,355, which is a continuation of U.S. application Ser. No. 11/848,210, filed Aug. 30, 2007, entitled "Portable Electronic Device for Photo Management," now U.S. Pat. No. 8,106,856, and which claims priority to: (A) U.S. Provisional Patent Application No. 60/937,993 filed Jun. 29, 2007, entitled "Portable Multifunction Device"; (B) U.S. Provisional Patent Application No. 60/947,118, filed Jun. 29, 2007, entitled "Portable Electronic Device for Photo Management"; (C) U.S. Provisional Patent Application No. 60/879,469, filed Jan. 8, 2007, entitled "Portable Multifunction Device"; (D) U.S. Provisional Patent Application No. 60/879,253, filed Jan. 7, 2007, entitled "Portable Multifunction Device"; (E) U.S. Provisional Patent Application No. 60/883,785, filed Jan. 6, 2007, entitled "Portable Electronic Device for Photo Management"; and (F) U.S. Provisional Patent Application No. 60/824,769, filed Sep. 6, 2006, entitled "Portable Multifunction Device." All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No: 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to portable devices for photo management, such as digital photographing, photo editing, and emailing photos.

BACKGROUND

As portable electronic devices become more compact and capable of performing functions, it has become a significant challenge to design a user interface that allows users to easily interact with such a multifunction device. This challenge is more significant for handheld portable electronic devices, which have much smaller screens than desktop or laptop computers. This situation is unfortunate because a user interface is the gateway through which a user receives information and a device receives user actions or behaviors, including user attempts to access the portable electronic device's features, tools, and functions.

Some portable devices (e.g., mobile telephones, sometimes called mobile phones, cell phones, cellular telephones, and the like) have resorted to adding more push buttons, increasing the density of push buttons, overloading the functions of push buttons, or using complex menu systems to allow a user to access, store, and manipulate data. These approaches often result in complicated key sequences and menu hierarchies that must be memorized by the user.

Many conventional user interfaces, such as those that include physical push buttons, are also inflexible because a physical push button may prevent a user interface from being configured and/or adapted by either an application running on the portable electronic device or by users. When coupled with the time consuming requirement to memorize multiple key sequences and menu hierarchies, and the difficulty in activating a desired push button, such inflexibility is frustrating to most users.

For example, cell phones with a built-in digital camera have been on the market for some time. But existing cell phones are difficult to use for even basic photo-related operations such as displaying, deleting and sending a photo because of limitations with the cell phones' user interface.

Accordingly, there is a need for portable multifunction devices with more transparent and intuitive user interfaces for photo management.

SUMMARY

The above deficiencies and other problems associated with user interfaces for portable devices are reduced or eliminated by the disclosed portable multifunction device. In some embodiments, the portable electronic device has a touch-sensitive display (also known as a "touch screen" or "touch screen display") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. Instructions for performing photo management may be included in a computer program product configured for execution by one or more processors.

One aspect of the invention involves a computer-implemented method in which a portable electronic device with a touch screen: displays an array of thumbnail images corresponding to a set of photographic images; replaces the displayed array of thumbnail images with a user-selected photographic image upon detecting a user contact with a corresponding thumbnail image in the array, wherein the user-selected photographic image is displayed at a larger scale than the corresponding thumbnail image; and displays a different photographic image in replacement of the user-selected photographic image, wherein the different photographic image is selected in accordance with a scrolling gesture comprising a substantially horizontal movement of user contact with the touch screen display.

Another aspect of the invention involves a computer-implemented method in which a portable electronic device with a touch screen: displays an array of thumbnail images corresponding to a set of photographic images; detects a scrolling gesture comprising a substantially vertical movement of user contact with the touch screen display; and responds to the scrolling gesture by scrolling the display of thumbnail images in accordance with a direction of the scrolling gesture; wherein the scrolling gesture is substantially independent of a horizontal position of the user contact with the touch screen display.

Another aspect of the invention involves a portable electronic device. The device includes a touch screen display, one or more processors, memory, and one or more programs. The one or more program are stored in the memory and configured to be executed by the one or more processors. The one or more programs include: instructions for displaying an array of thumbnail images corresponding to a set of photographic images; instructions for replacing the displayed array of thumbnail images with a user-selected photographic image upon detecting a user contact with a corresponding thumbnail image in the array, wherein the user-selected photographic image is displayed at a larger scale than the corresponding thumbnail image; and instructions for displaying a different photographic image in replacement of the user-selected photographic image, wherein the different photographic image is selected in accordance with a scrolling gesture comprising a substantially horizontal movement of user contact with the touch screen display.

Another aspect of the invention involves a portable electronic device. The device includes a touch screen display, one or more processors, memory, and one or more programs. The one or more program are stored in the memory and configured to be executed by the one or more processors. The one or more programs include: instructions for displaying an array of thumbnail images corresponding to a set of photographic images; instructions for detecting a scrolling gesture comprising a substantially vertical movement of user contact with the touch screen display; and instructions for responding to the scrolling gesture by scrolling the display of thumbnail images in accordance with a direction of the scrolling gesture; wherein the scrolling gesture is substantially independent of a horizontal position of the user contact with the touch screen display.

Another aspect of the invention involves a computer-program product that includes a computer readable storage medium and a computer program mechanism embedded therein. The computer program mechanism includes instructions, which when executed by a portable electronic device with a touch screen display, cause the device to: display an array of thumbnail images corresponding to a set of photographic images; replace the displayed array of thumbnail images with a user-selected photographic image upon detecting a user contact with a corresponding thumbnail image in the array, wherein the user-selected photographic image is displayed at a larger scale than the corresponding thumbnail image; and display a different photographic image in replacement of the user-selected photographic image, wherein the different photographic image is selected in accordance with a scrolling gesture comprising a substantially horizontal movement of user contact with the touch screen display.

Another aspect of the invention involves a computer-program product that includes a computer readable storage medium and a computer program mechanism embedded therein. The computer program mechanism includes instructions, which when executed by a portable electronic device with a touch screen display, cause the device to: display an array of thumbnail images corresponding to a set of photographic images; detect a scrolling gesture comprising a substantially vertical movement of user contact with the touch screen display; and respond to the scrolling gesture by scrolling the display of thumbnail images in accordance with a direction of the scrolling gesture; wherein the scrolling gesture is substantially independent of a horizontal position of the user contact with the touch screen display.

Another aspect of the invention involves a portable electronic device with a touch screen display, comprising: means for displaying an array of thumbnail images corresponding to a set of photographic images; means for replacing the displayed array of thumbnail images with a user-selected photographic image upon detecting a user contact with a corresponding thumbnail image in the array, wherein the user-selected photographic image is displayed at a larger scale than the corresponding thumbnail image; and means for displaying a different photographic image in replacement of the user-selected photographic image, wherein the different photographic image is selected in accordance with a scrolling gesture comprising a substantially horizontal movement of user contact with the touch screen display.

Another aspect of the invention involves a portable electronic device with a touch screen display, comprising: means for displaying an array of thumbnail images corresponding to a set of photographic images; means for detecting a scrolling gesture comprising a substantially vertical movement of user contact with the touch screen display; and means for responding to the scrolling gesture by scrolling the display of thumbnail images in accordance with a direction of the scrolling gesture; wherein the scrolling gesture is substantially independent of a horizontal position of the user contact with the touch screen display.

Another aspect of the invention involves a computer-implemented method in which an electronic device with a touch screen: detects a first movement of a physical object on or near the touch screen display; while detecting the first movement, translates a first digital object displayed on the touch screen display in a first direction, wherein the first digital object is associated with a set of digital objects; in response to display of a previously hidden edge of the first digital object and continued detection of the first movement, displays an area beyond the edge of the first digital object; after the first movement is no longer detected, translates the first digital object in a second direction until the area beyond the edge of the first digital object is no longer displayed; detects a second movement of the physical object on or near the touch screen display; and, in response to detecting the second movement while the previously hidden edge of the first digital object is displayed, translates the first digital object in the first direction and displays a second digital object in the set of digital objects.

Another aspect of the invention involves an electronic device. The device includes a touch screen display, one or more processors, memory, and one or more programs. The one or more program are stored in the memory and configured to be executed by the one or more processors. The one or more programs include: instructions for detecting a first movement of a physical object on or near the touch screen display; instructions for, while detecting the first movement, translating a first digital object displayed on the touch screen display in a first direction, wherein the first digital object is associated with a set of digital objects; instructions for, in response to display of a previously hidden edge of the first digital object and continued detection of the first movement, displaying an area beyond the edge of the first digital object; instructions for, after the first movement is no longer detected, translating the first digital object in a second direction until the area beyond the edge of the first digital object is no longer displayed; instructions for detecting a second movement of the physical object on or near the touch screen display; and instructions for, in response to detecting the second movement while the previously hidden edge of the first digital object is displayed, translating the first digital object in the first direction and displaying a second digital object in the set of digital objects.

Another aspect of the invention involves a computer-program product that includes a computer readable storage medium and a computer program mechanism embedded therein. The computer program mechanism includes instructions, which when executed by an electronic device with a touch screen display, cause the device to: detect a first movement of a physical object on or near the touch screen display; while detecting the first movement, translate a first digital object displayed on the touch screen display in a first direction, wherein the first digital object is associated with a set of digital objects; in response to display of a previously hidden edge of the first digital object and continued detection of the first movement, display an area beyond the edge of the first digital object; after the first movement is no longer detected, translate the first digital object in a second direction until the area beyond the edge of the first digital object is no longer displayed; detect a second movement of the physical object on or near the touch screen display; and, in response to detecting the second movement while the previously hidden edge of the first digital object is displayed, translate the first digital object in the first direction and display a second digital object in the set of digital objects.

Another aspect of the invention involves an electronic device with a touch screen display, comprising: means for detecting a first movement of a physical object on or near the touch screen display; means for, while detecting the first movement, translating a first digital object displayed on the touch screen display in a first direction, wherein the first digital object is associated with a set of digital objects; means for, in response to display of a previously hidden edge of the first digital object and continued detection of the first movement, displaying an area beyond the edge of the first digital object; means for, after the first movement is no longer detected, translating the first digital object in a second direction until the area beyond the edge of the first digital object is no longer displayed; means for detecting a second movement of the physical object on or near the touch screen display; and means for, in response to detecting the second movement while the previously hidden edge of the first digital object is displayed, translating the first digital object in the first direction and displaying a second digital object in the set of digital objects.

Thus, the invention provides a transparent and intuitive user interface for managing photos on a portable electronic device with a touch screen display

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 24 is a flowchart illustrating a process for viewing digital objects in a set of digital objects in accordance with some embodiments.

DESCRIPTION OF EMBODIMENTS

Figure 1:
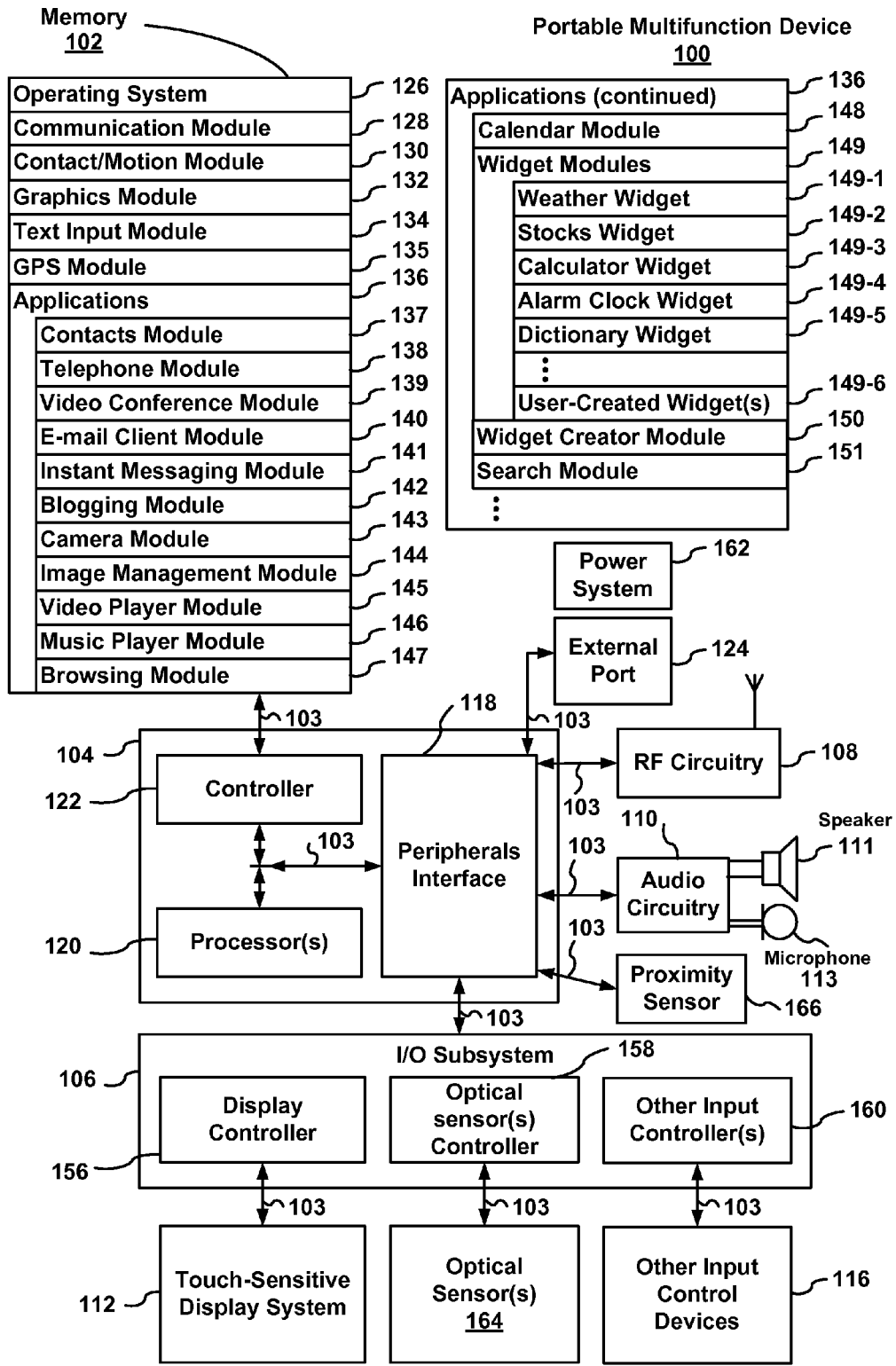
FIG. 1 is a block diagram illustrating a portable electronic device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the invention. However, it will be apparent to one skilled in the art that the invention may be practiced without these specific details. In other instances, well-known methods, procedures, components, circuits, and networks have not been described in detail so as not to unnecessarily obscure aspects of the embodiments.

Embodiments of a portable electronic device, user interfaces for such devices, and associated processes for using such devices are described. In some embodiments, the portable electronic device is a portable communications device such as a mobile telephone that also contains other functions, such as PDA and/or music player functions.

The user interface may include a physical click wheel in addition to a touch screen or a virtual click wheel displayed on the touch screen. A click wheel is a physical user-interface device that may provide navigation commands based on an angular displacement of the wheel or a point of contact with the wheel by a user of the portable electronic device. A click wheel may also be used to provide a user command corresponding to selection of one or more items, for example, when the user of the portable electronic device presses down on at least a portion of the wheel or the center of the wheel. Alternatively, breaking contact with a click wheel image on a touch screen surface may indicate a user command corresponding to selection. For simplicity, in the discussion that follows, a portable electronic device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

In addition to photo management, the device may support a variety of other applications, such as a telephone application, a video conferencing application, an e-mail application, an instant messaging application, a blogging application, a web browsing application, a digital music player application, and/or a digital video player application.

The various applications that may be executed on the portable electronic device may use at least one common physical user-interface device, such as the touch screen. One or more functions of the touch screen as well as corresponding information displayed on the portable electronic device may be adjusted and/or varied from one application to the next and/or within a respective application. In this way, a common physical architecture (such as the touch screen) of the portable electronic device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and U.S. patent application Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable electronic device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the portable electronic device. FIG. 1 is a block diagram illustrating a portable electronic device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the portable electronic device 100 is only one example of a portable electronic device 100, and that the portable electronic device 100 may have more or fewer components than shown, may combine two or more components, or a may have a different configuration or arrangement of the components. The various components shown in FIG. 1 may be implemented in hardware, software or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the portable electronic device 100, such as the CPU 120 and the peripherals interface 118, may be controlled by the memory controller 122.

The peripherals interface 118 couples the input and output peripherals of the portable electronic device to the CPU 120 and memory 102. The one or more processors 120 run or execute various software programs and/or sets of instructions stored in memory 102 to perform various functions for the portable electronic device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging (IM), and/or Short Message Service (SMS)), or any other suitable communication protocol, including communication protocols not yet developed as of the filing date of this document.

The audio circuitry 110, the speaker 111, and the microphone 113 provide an audio interface between a user and the portable electronic device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the portable electronic device 100, such as the display system 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the portable electronic device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the portable electronic device 100 on or off. The user may be able to customize a functionality of one or more of the buttons. The touch screen 112 is used to implement virtual or soft buttons and one or more soft keyboards.

The touch-sensitive display system 112 provides an input interface and an output interface between the portable electronic device and a user. The display controller 156 receives and/or sends electrical signals from/to the display system 112. The display system 112 displays visual output to the user. The visual output may include graphics, text, icons, video, and any combination thereof (collectively termed "graphics"). In some embodiments, some or all of the visual output may correspond to user-interface objects, further details of which are described below.

A touch screen in display system 112 is a touch-sensitive surface that accepts input from the user based on haptic and/or tactile contact. The display system 112 and the display controller 156 (along with any associated modules and/or sets of instructions in memory 102) detect contact (and any movement or breaking of the contact) on the display system 112 and converts the detected contact into interaction with user-interface objects (e.g., one or more soft keys, icons, web pages or images) that are displayed on the touch screen. In an exemplary embodiment, a point of contact between a touch screen in the display system 112 and the user corresponds to a finger of the user.

The touch screen in the display system 112 may use LCD (liquid crystal display) technology, or LPD (light emitting polymer display) technology, although other display technologies may be used in other embodiments. The touch screen in the display system 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen in the display system 112 displays visual output from the portable electronic device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the portable electronic device translates the rough finger-based input into a precise pointer/cursor position or command for performing the actions desired by the user.

A touch-sensitive display in some embodiments of the display system 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S.

patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the portable electronic device 100 may include a touchpad (not shown) for activating or deactivating particular functions. In some embodiments, the touchpad is a touch-sensitive area of the portable electronic device that, unlike the touch screen, does not display visual output. The touchpad may be a touch-sensitive surface that is separate from the touch screen in the display system 112 or an extension of the touch-sensitive surface formed by the touch screen.

In some embodiments, the portable electronic device 100 may include a physical or virtual click wheel as an input control device 116. A user may navigate among and interact with one or more graphical objects (henceforth referred to as icons) displayed in the display system 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the display system 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable electronic devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the portable electronic device 100, opposite the touch screen display 112 on the front of the portable electronic device, so that the touch screen display may be used as a viewfinder for either still and/or video image acquisition. In some embodiments, an optical sensor is located on the front of the portable electronic device so that the user's image may be obtained for videoconferencing while the user views the other video conference participants on the touch screen display. In some embodiments, the position of the optical sensor 164 can be changed by the user (e.g., by rotating the lens and the sensor in the portable electronic device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 2005, and Ser. No. 11/240,788, "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the portable electronic device is in the user's pocket, purse, or other dark area to prevent unnecessary battery drainage when the portable electronic device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen in the display system 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen in the display system 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the display system 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, email 140, IM 141, blogging 142, browser 147, and any other application that needs text input).

The GPS module 135 determines the location of the portable electronic device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a blogging module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6; and/or
  search module 151.

Examples of other applications 136 that may be stored in memory 102 include memo pad and other word processing applications, JAVA-enabled applications, encryption, digital rights management, voice recognition, and voice replication.

In conjunction with display system 112, display controller 156, optical sensor(s) 164, optical sensor controller 158, contact module 130, graphics module 132, and image management module 144, the camera module 143 may be used to capture still images or video (including a video stream) and store them into memory 102, browse the still images or videos, modify characteristics of a still image or video, or delete a still image or video from memory 102. Embodiments of user interfaces and associated processes using camera module 143 are described further below.

In conjunction with display system 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

Note that the above identified modules and applications (including the camera module 143 and the image management module 144) correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the portable electronic device 100 is a device where operation of a predefined set of functions on the portable electronic device is performed exclusively through a touch screen in the display system 112 and/or a touchpad. By using a touch screen and/or a touchpad as the primary input/control device for operation of the portable electronic device 100, the number of physical input/control devices (such as push buttons, dials, and the like) on the portable electronic device 100 may be reduced.

The predefined set of functions that may be performed exclusively through a touch screen and/or a touchpad include navigation between user interfaces. In some embodiments, the touchpad, when touched by the user, navigates the portable electronic device 100 to a main, home, or root menu from any user interface that may be displayed on the portable electronic device 100. In such embodiments, the touchpad may be referred to as a "menu button." In some other embodiments, the menu button may be a physical push button or other physical input/control device instead of a touchpad.

Figure 2:
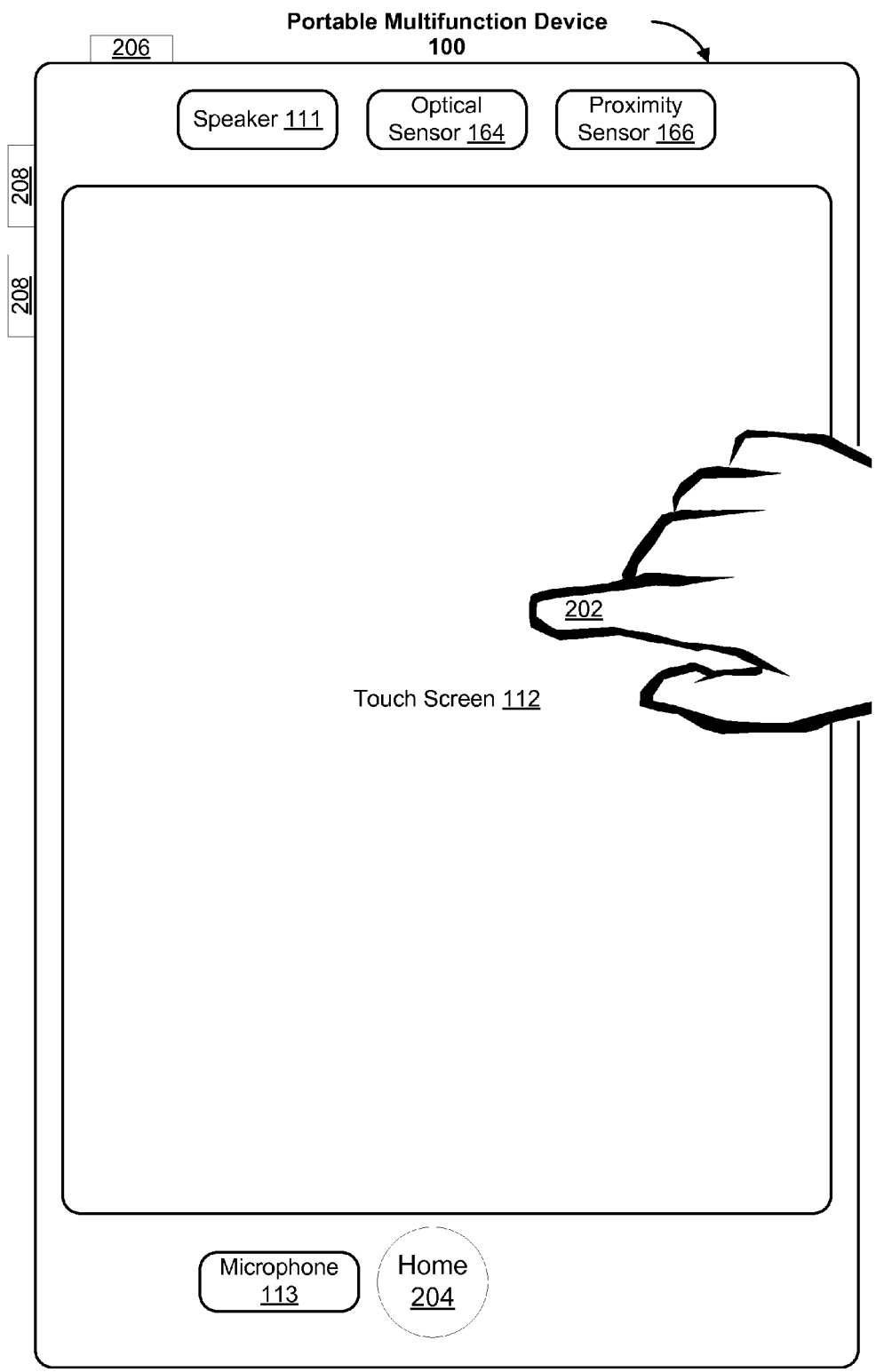
FIG. 2 illustrates a portable electronic device having a touch screen in accordance with some embodiments.

FIG. 2 illustrates a portable electronic device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure) or a stylus (not shown in the figure). In some embodiments, selection of one or more graphics occurs when the user breaks contact with the one or more graphics. In some embodiments, the contact may include a gesture, such as one or more taps, one or more swipes (from left to right, right to left, upward and/or downward and/or a rolling of a finger (from right to left, left to right, upward and/or downward) that has made contact with the portable electronic device 100. In some embodiments, inadvertent contact with a graphic may not select the graphic. For example, a swipe gesture with that sweeps over an application icon may not select the corresponding application when the gesture corresponding to selection is a tap. In other words, the portable electronic device 100 interprets the meaning of a gesture and acts accordingly after considering which application or module is in use at the moment.

The device 100 may also include one or more physical buttons, such as "home" or menu button 204. As described previously, the menu button 204 may be used to navigate to any application 136 in a set of applications that may be executed on the portable electronic device 100. Alternatively, in some embodiments, the menu button is implemented as a soft key in a GUI in touch screen 112.

In one embodiment, the portable electronic device 100 includes a touch screen 112, a menu button 204, a push button 206 for powering the portable electronic device on/off and locking the portable electronic device, and volume adjustment button(s) 208. The push button 206 may be used to turn the power on/off on the portable electronic device by depressing the button and holding the button in the depressed state for a predefined time interval; to lock the portable electronic device by depressing the button and releasing the button before the predefined time interval has elapsed; and/or to unlock the portable electronic device or initiate an unlock process. In an alternative embodiment, the portable electronic device 100 also may accept verbal input for activation or deactivation of some functions through the microphone 113.

Attention is now directed towards embodiments of user interfaces ("UI") and associated processes that may be implemented on a portable electronic device 100.

Figure 3:
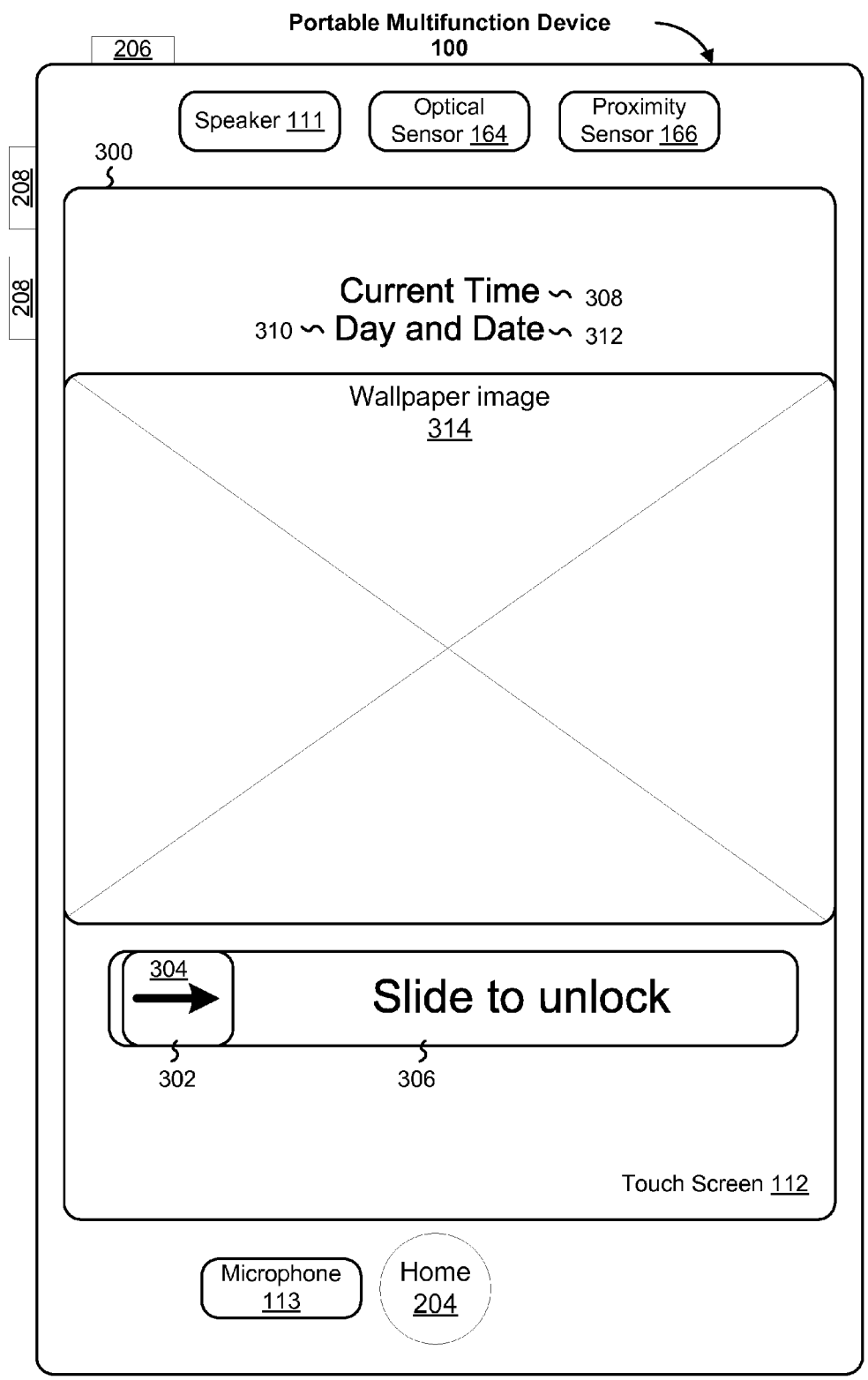
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the portable electronic device;
Arrow 304 that provides a visual cue to the unlock gesture;
Channel 306 that provides additional cues to the unlock gesture;
Time 308;
Day 310;
Date 312; and
Wallpaper image 314.

In some embodiments, the portable electronic device detects contact with the touch-sensitive display (e.g., a user's finger making contact on or near the unlock image 302) while the portable electronic device is in a user-interface lock state. The device moves the unlock image 302 in accordance with the contact. The device transitions to a user-interface unlock state if the detected contact corresponds to a predefined gesture, such as moving the unlock image across channel 306. Conversely, the portable electronic device maintains the user-interface lock state if the detected contact does not correspond to the predefined gesture. As noted above, processes that use gestures on the touch screen to unlock the portable electronic device are described in U.S. patent application Ser. No. 11/322,549, "Unlocking a Device by Performing Gestures on an Unlock Image," filed Dec. 23, 2005, which is hereby incorporated by reference.

Figure 4:
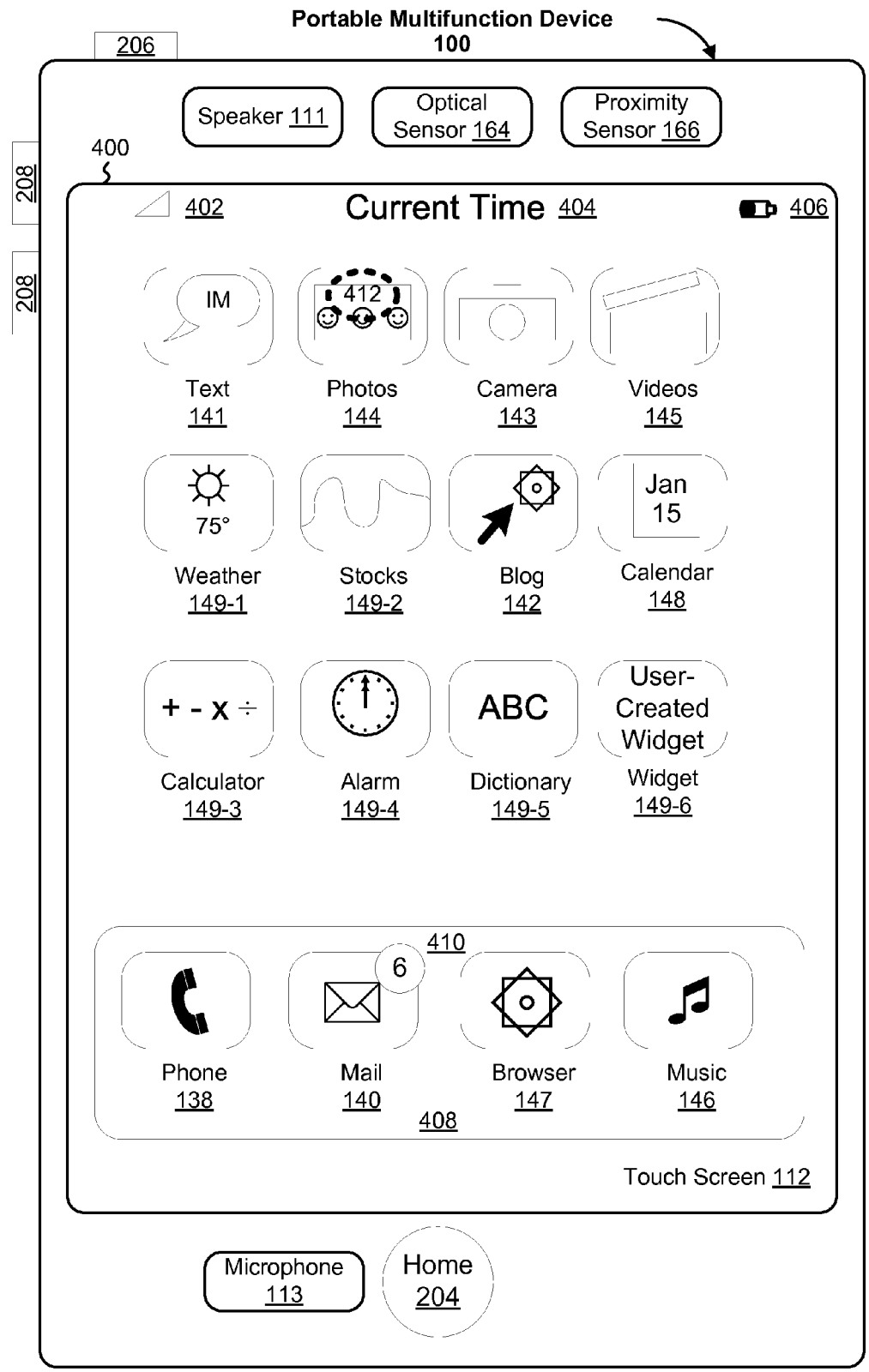
FIG. 4 illustrates an exemplary user interface for a menu of applications on a portable electronic device in accordance with some embodiments.

FIG. 4 illustrates an exemplary user interface for a menu of applications on a portable electronic device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as one or more of the following:
Phone 138;
E-mail client 140, which may include an indicator 410 of the number of unread e-mails;
Browser 147; and
Music player 146; and
Icons for other applications, such as one or more of the following:
IM 141;
Image management 144;
Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures on or near corresponding icons displayed on the touch screen 112.

Figure 5:
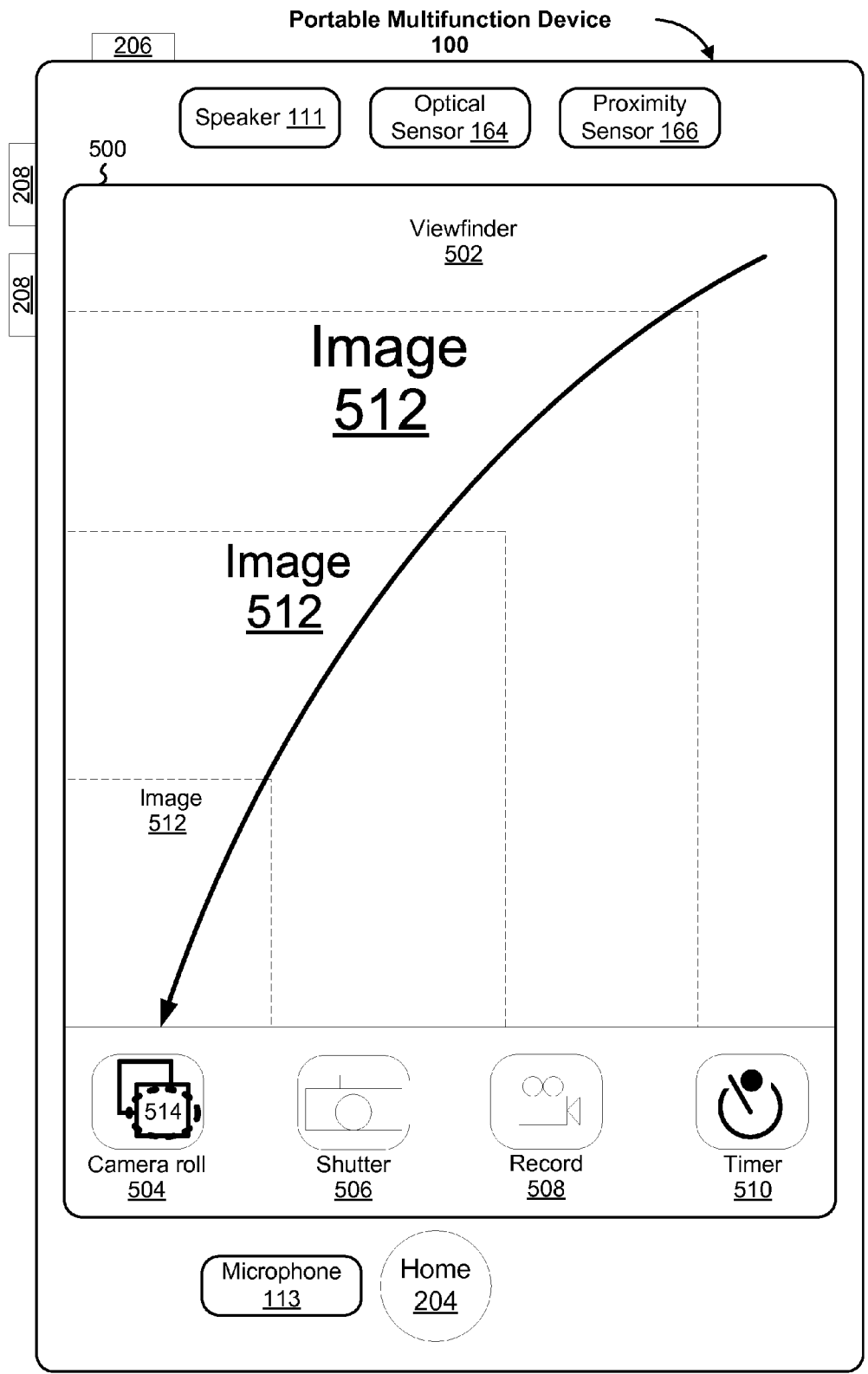
FIG. 5 illustrates an exemplary user interface for a camera in accordance with some embodiments.

FIG. 5 illustrates an exemplary user interface for a camera in accordance with some embodiments. In some embodiments, user interface 500 includes the following elements, or a subset or superset thereof:

Viewfinder 502;
Camera roll 504 that manages images and/or videos taken with the camera;
Shutter 506 for taking still images;
Record button 508 for starting and stopping video recording;
Timer 510 for taking an image or recording a video after a predefined time delay; and
Image 512 that appears (e.g., via the animation illustrated schematically in FIG. 5) to be added to camera roll 504 when it is obtained.

Figure 6:
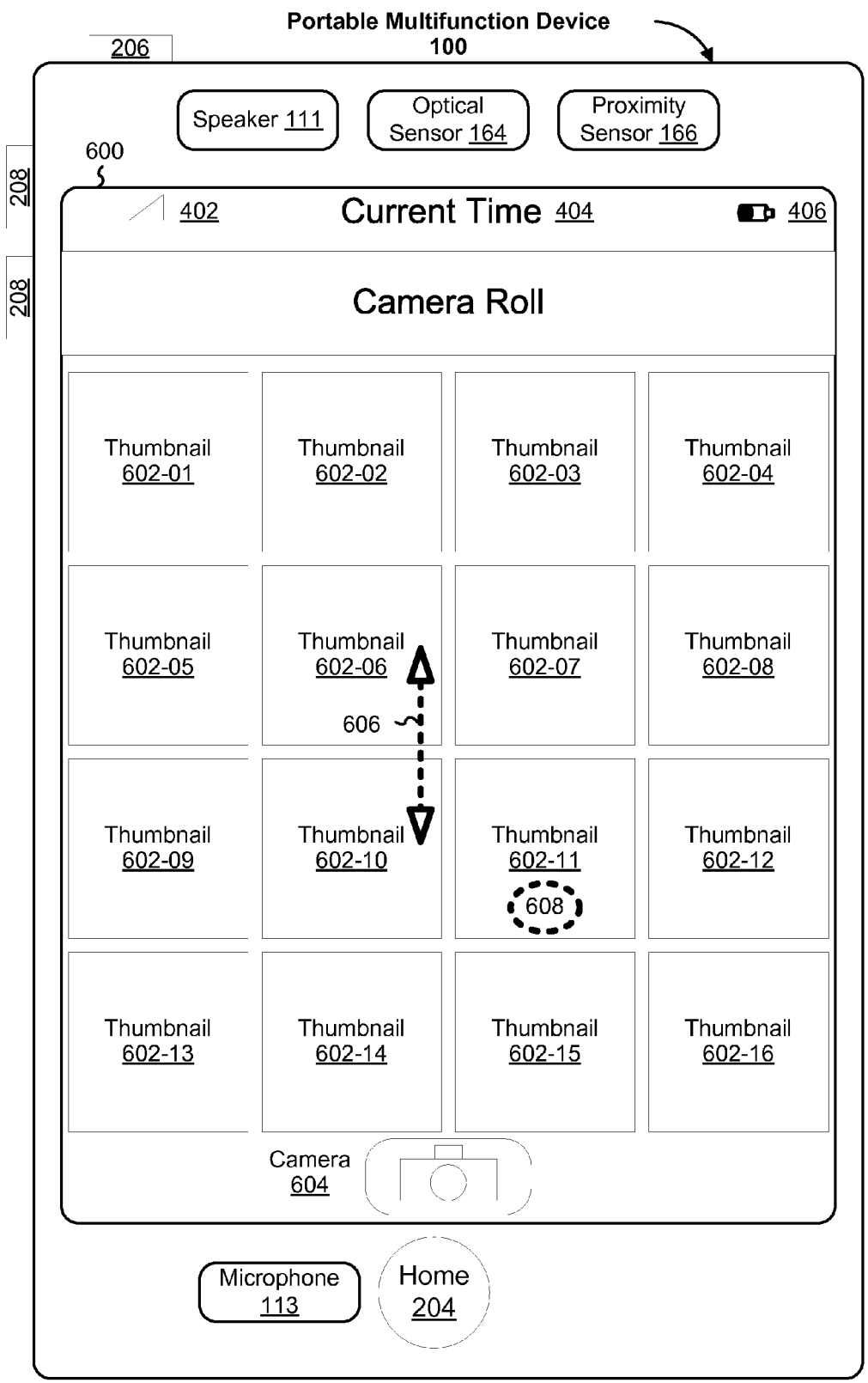
FIG. 6 illustrates an exemplary user interface for a camera roll in accordance with some embodiments.
Figure 16:
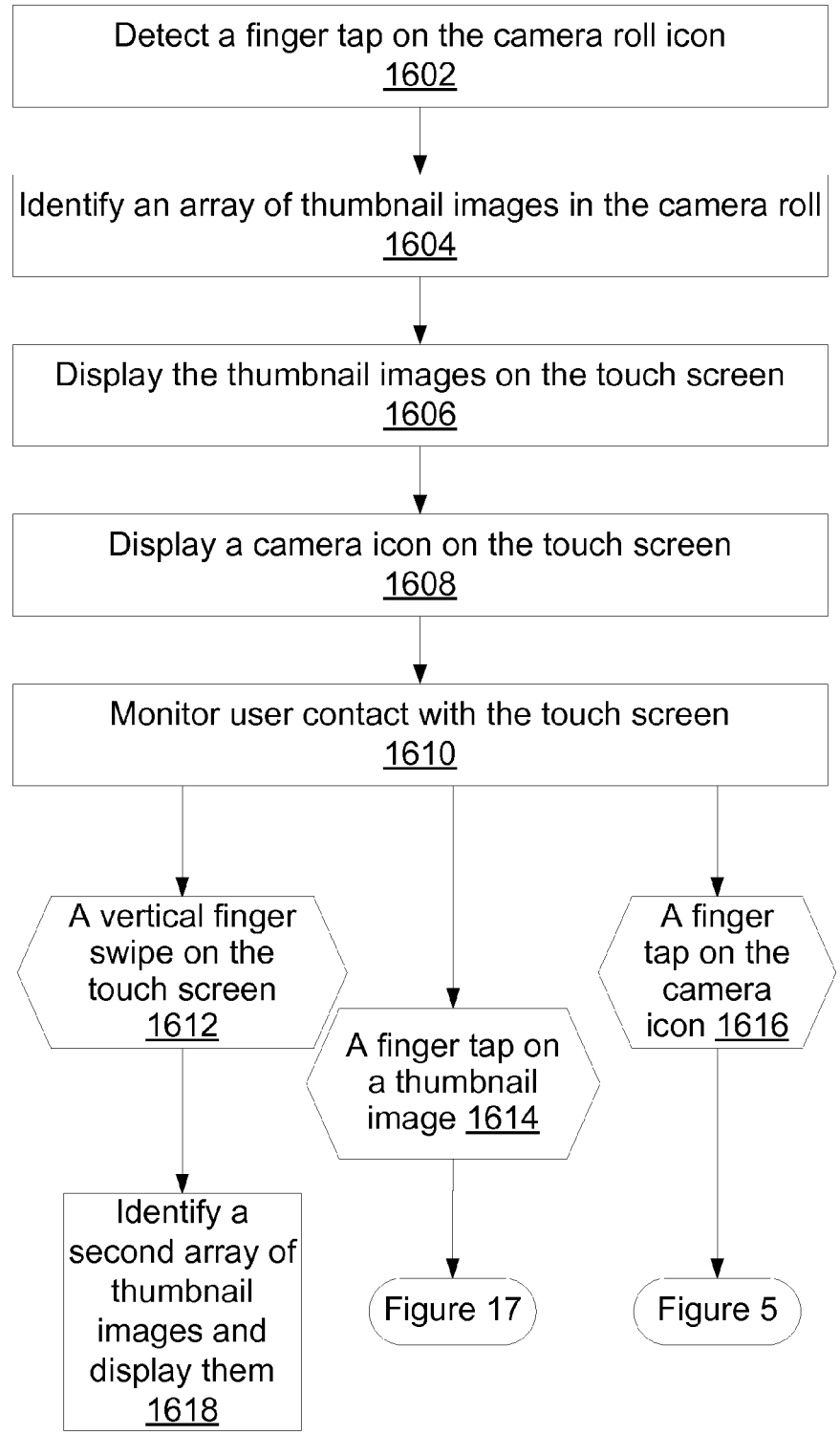
FIG. 16 is a flowchart illustrating a process for displaying thumbnail images on a touch screen in accordance with some embodiments.

FIG. 6 illustrates an exemplary user interface for a virtual camera roll in accordance with some embodiments. The portable electronic device displays the user interface after a user finger gesture 514 on the camera roll icon 504 in FIG. 5. In some embodiments, the finger gesture is a momentary, substantially single-position contact with the touch screen, while in other embodiments other finger gestures may be used. In some embodiments, user interface 600 includes the following elements, or a subset or superset thereof:

- 402, 404, and 406, as described above;
- Thumbnail images 602 of images and/or videos obtained by camera 143;
- Camera icon 604 that when activated (e.g., by a finger gesture on the icon) initiates transfer to the camera UI (e.g., UI 500);

FIG. 16 is a flowchart illustrating a process for displaying thumbnail images on a touch screen in accordance with some embodiments. Upon detecting the finger gesture 514 (1602), the portable electronic device identifies a set of thumbnail images in the virtual camera roll (1604) and displays the thumbnail images on the touch screen (1606). In some embodiments, the thumbnail images are displayed in a 2-D array (FIG. 6). In some other embodiments, the thumbnail images are displayed in a vertical column or a horizontal row. In some embodiments, a thumbnail image may have a description including a name, a file size, and a timestamp indicating when the image was created. In some embodiments, the thumbnail images of videos have a unique appearance that is visually distinguishable from the other still images. The portable electronic device displays the camera icon 604 at the bottom of the touch screen (1608) and starts monitoring next user contact with the touch screen (1610).

In some embodiments, the user may scroll through the thumbnail images 602 using vertically upward/downward finger gestures 606 on the touch screen (1612). Upon detecting such a finger gesture (e.g., a vertical finger swipe), the portable electronic device scrolls the set of thumbnail images accordingly (1618). In some embodiments, the scrolling gesture is independent of a horizontal position of the user contact with the touch screen display. In some embodiments, the scrolling gesture is substantially independent of a horizontal position of the user contact with the touch screen display (e.g., one or more side regions of the touch screen display may be reserved for other functions, such as functions corresponding to icons, soft keys or application navigation functions, and not available for the scroll gesture). In some embodiments, in response to a stationary gesture on a particular thumbnail image (1614), e.g., a finger tap 608 on the thumbnail image 602-11, the portable electronic device initiates a process of generating an enlarged display of the corresponding image (e.g., UI 700A) on the touch screen. A more detailed description of this process is provided below in connection with FIGS. 7 and 17. In some embodiments, upon detecting a user's finger gesture on the camera icon 604 (1616), the portable electronic device brings back the camera UI 500 as shown in FIG. 5.

Figure 7A:
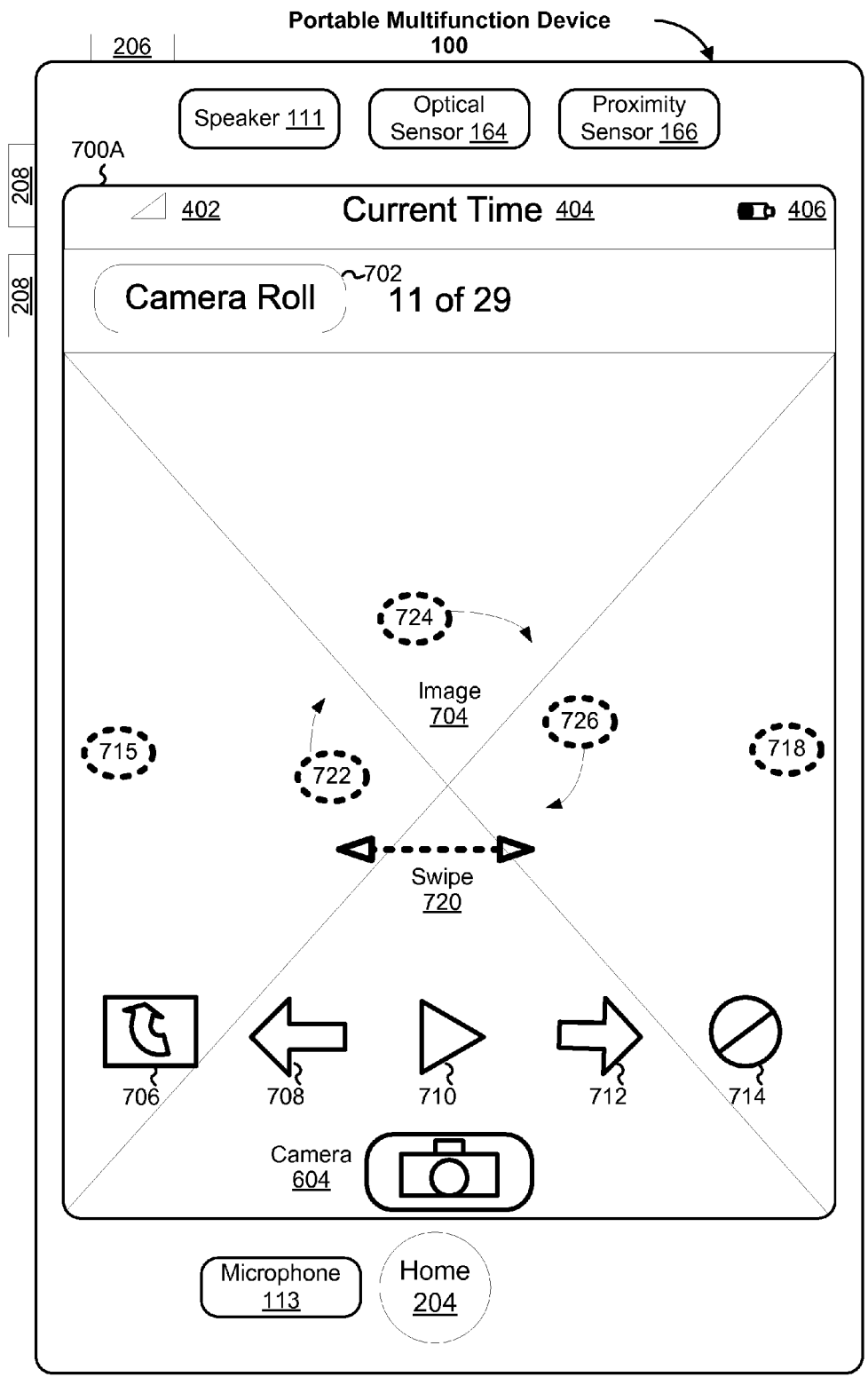
FIGS. 7A through 7C illustrate an exemplary user interface for viewing and manipulating images in accordance with some embodiments.
Figure 7B:
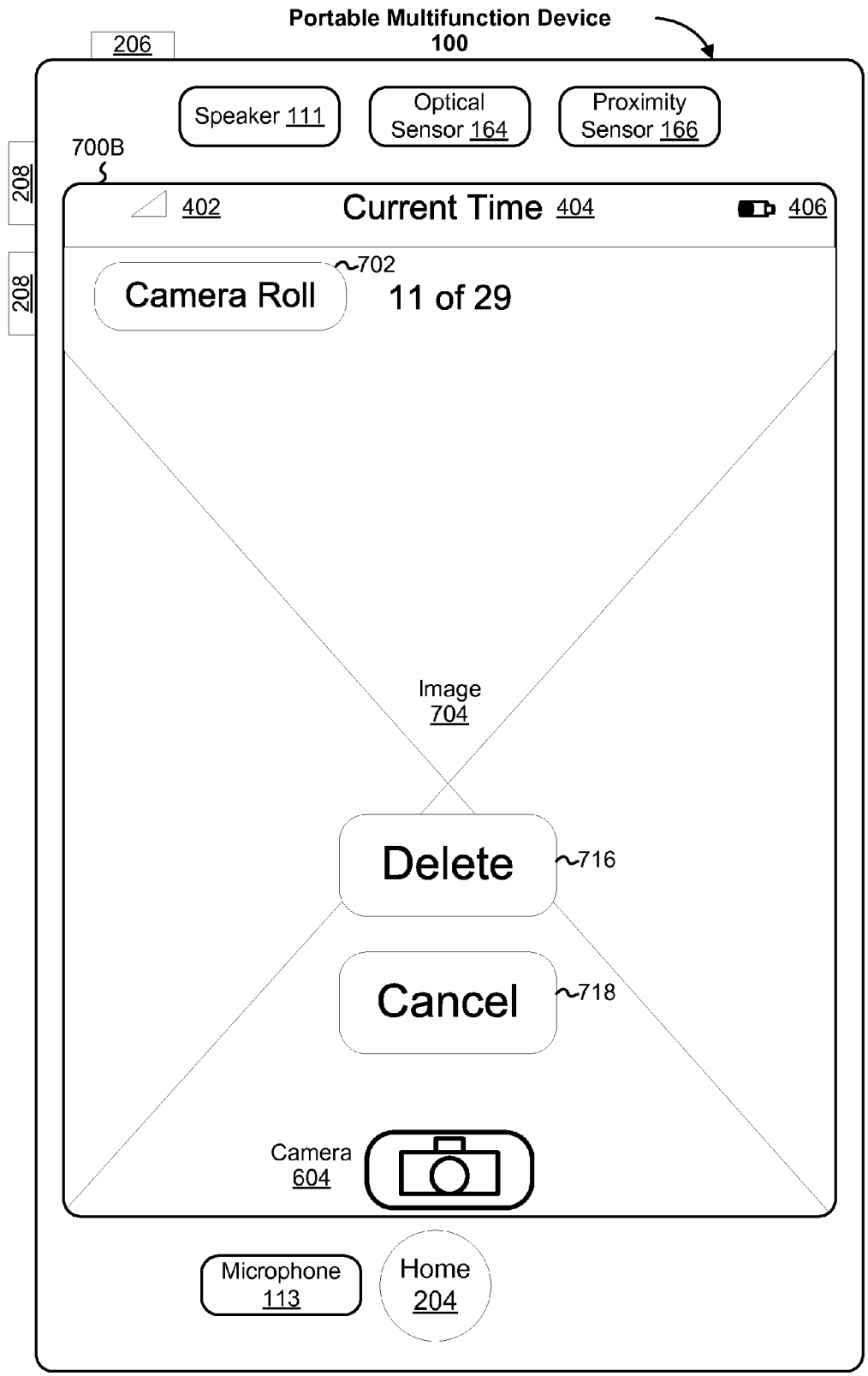
Figure 7C:
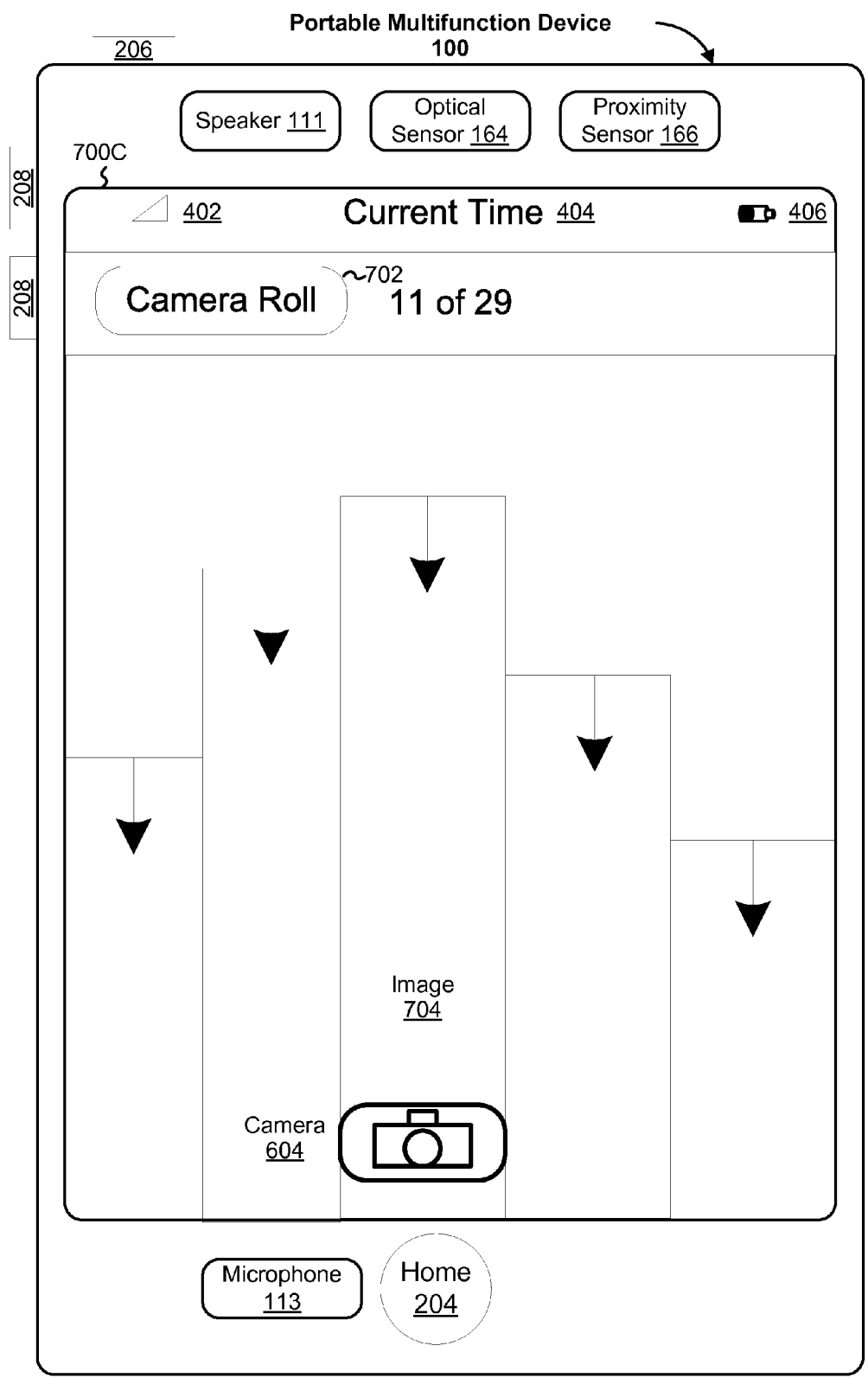

FIGS. 7A through 7C illustrate an exemplary user interface for viewing and manipulating images in accordance with some embodiments. Note that one skilled in the art would understand that the term "image" in the present application covers both still images and video streams.

In some embodiments, user interface 700A includes the following elements, or a subset or superset thereof:

- 402, 404, 406, and 604, as described above;
- Camera roll icon 702 that when activated (e.g., by a finger gesture on the icon) initiates transfer to the camera roll UI (e.g., UI 600);
- Image 704;
- Additional options icon 706 that when activated (e.g., by a finger gesture on the icon) initiates transfer to a UI with additional options for use of image 704 (e.g., UI 1200, FIG. 12));
- Previous image icon 708 that when activated (e.g., by a finger gesture on the icon) initiates display of the previous image in the virtual camera roll (e.g., 602-10);
- Play icon 710 that when activated (e.g., by a finger gesture on the icon) initiates a slide show of the images in the virtual camera roll;
- Next image icon 712 that when activated (e.g., by a finger gesture on the icon) initiates display of the next image in the virtual camera roll (e.g., 602-12); and
- Delete symbol icon 714 that when activated (e.g., by a finger gesture on the icon) initiates display of a UI to confirm that the user wants to delete image 704 (e.g. UI 700B, FIG. 7B).

Figure 17:
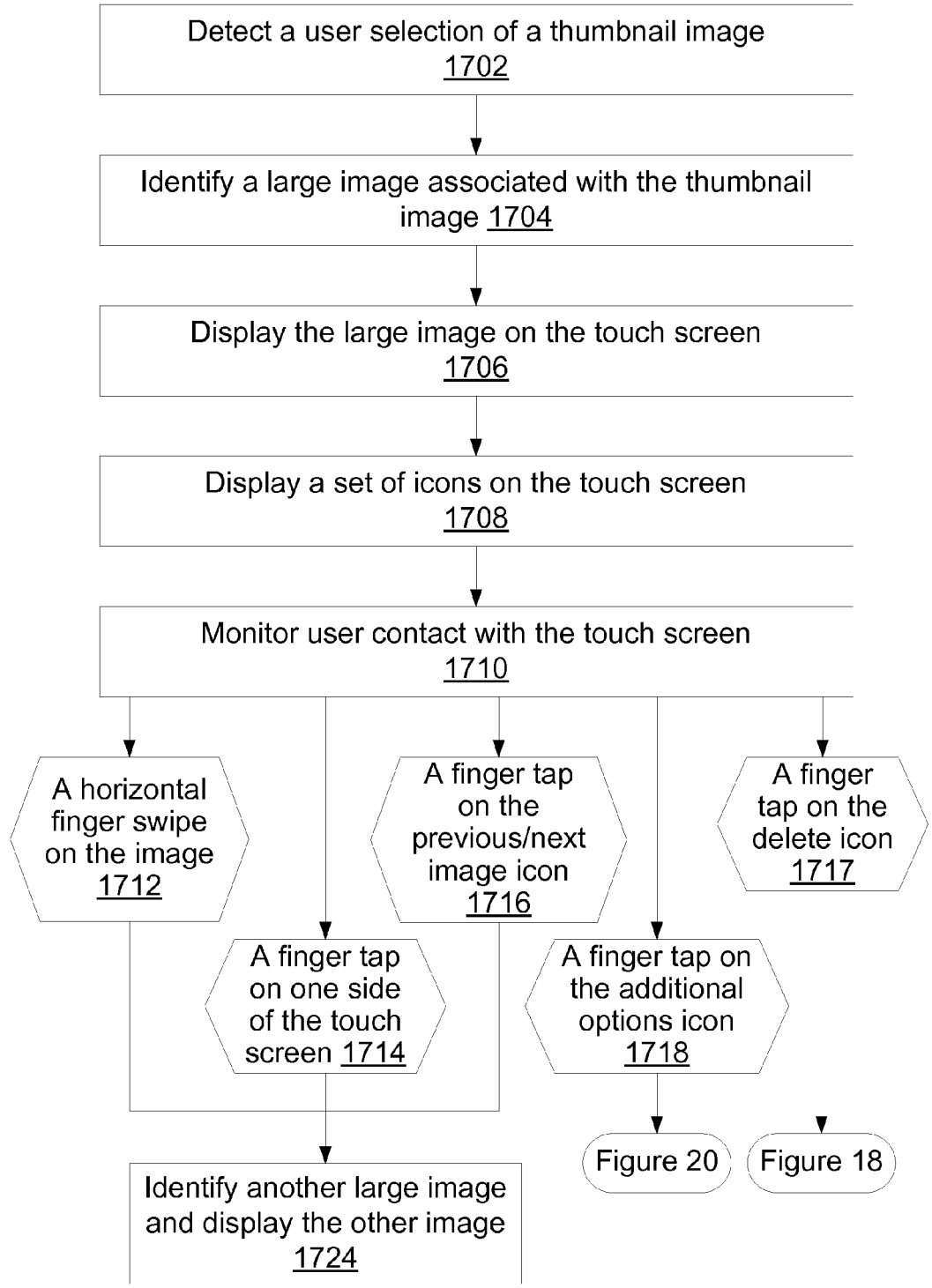
FIG. 17 is a flowchart illustrating a process for performing operations in response to user contact with the touch screen in accordance with some embodiments.

FIG. 17 is a flowchart illustrating a process for performing operations in response to user contact with the touch screen in accordance with some embodiments. After detecting a user selection of a thumbnail image (1702), the portable electronic device identifies an image associated with the thumbnail image (1704). Generally, this identified image is larger than the thumbnail image. In some embodiments, the thumbnail image is a sub-sampled version of the larger image. As shown in FIG. 7A, the large image is displayed on the touch screen in replacement of all the thumbnail images (1706). The portable electronic device displays various icons at predefined locations on the touch screen (1708) and waits for next user contact with the touch screen (1710).

In some embodiments, as shown in FIG. 7A, the portable electronic device performs the same operation(s) in response to different user contacts. In some embodiments, a user can browse images in the virtual camera roll through three different gestures: (i) a finger gesture on the previous/next image icon 708/712 (1716), (ii) a user image navigation gesture by a finger tap 715/718 adjacent to the left/right edge of the touch screen (1714), or (iii) a leftward/rightward horizontal finger swipe gesture 720 on the touch screen (1712). Upon detecting any of these user gestures, the portable electronic device replaces the image on the touch screen with the previous/next one in the virtual camera roll (1724). In some embodiments, this replacement is an animated process of moving the current image out of the touch screen to the right/left side and moving the previous/next image into the touch screen from the left/right side. With multiple means to perform the same task, the portable electronic device allows a user to choose whichever the user prefers, thereby making the photo management simpler and more intuitive. In some embodiments, the tap gestures 715 and 718 are used to magnify (e.g., by zooming in) an image by a predetermined amount, rather than to view a previous or next image. For this case, the user is still provided with two different types of gestures for browsing images: (i) a finger gesture on the previous/next image icon 708/712 (1716) and (ii) a leftward/rightward horizontal finger swipe gesture 720 on the touch screen (1712).

In some embodiments, the portable electronic device rotates the image 704 by an angle in response to a user image rotation gesture. For example, the user image rotation gesture may include three simultaneous finger contacts 722, 724 and 726 with the image 704. When the three finger contacts move in the directions indicated by the respective arrows for at least a predefined distance, the portable electronic device rotates the image 704 from a portrait orientation to a landscape orientation or from a landscape orientation to a portrait orientation. In some embodiments, the rotation gesture is a two-finger multitouch gesture (e.g., simultaneous finger contacts 722 and 726). In some embodiments, the image rotates in response to detection of a change in the orientation of the device (e.g., using accelerometers to detect the orientation of the device). For example, the image may rotate to maintain proper viewing orientation as the touch screen 112 is physically rotated from a portrait orientation to a landscape orientation.

In some embodiments, a user finger gesture on the additional options icon 706 (1718) triggers the portable electronic device to render additional operations on the image 704. A more detailed description of some exemplary operations associated with the icon 706 is provided below in connection with FIGS. 12 and 20.

In some embodiments, a user finger gesture on the delete symbol icon 714 (1717) causes the portable electronic device to provide a user interface 700B as shown in FIG. 7B. Through the user interface 700B, the user can delete the current image 704 from the camera roll. The user interface 700B includes the following elements, or a subset or superset thereof:

402, 404, 406, 604, 702, and 704, as described above;
Delete icon 716 that when activated (e.g., by a finger gesture on the icon) deletes the image 704; and
Cancel icon 718 that when activated (e.g., by a finger gesture on the icon) returns the portable electronic device to the previous user interface (e.g. UI 700A)

Figure 18:
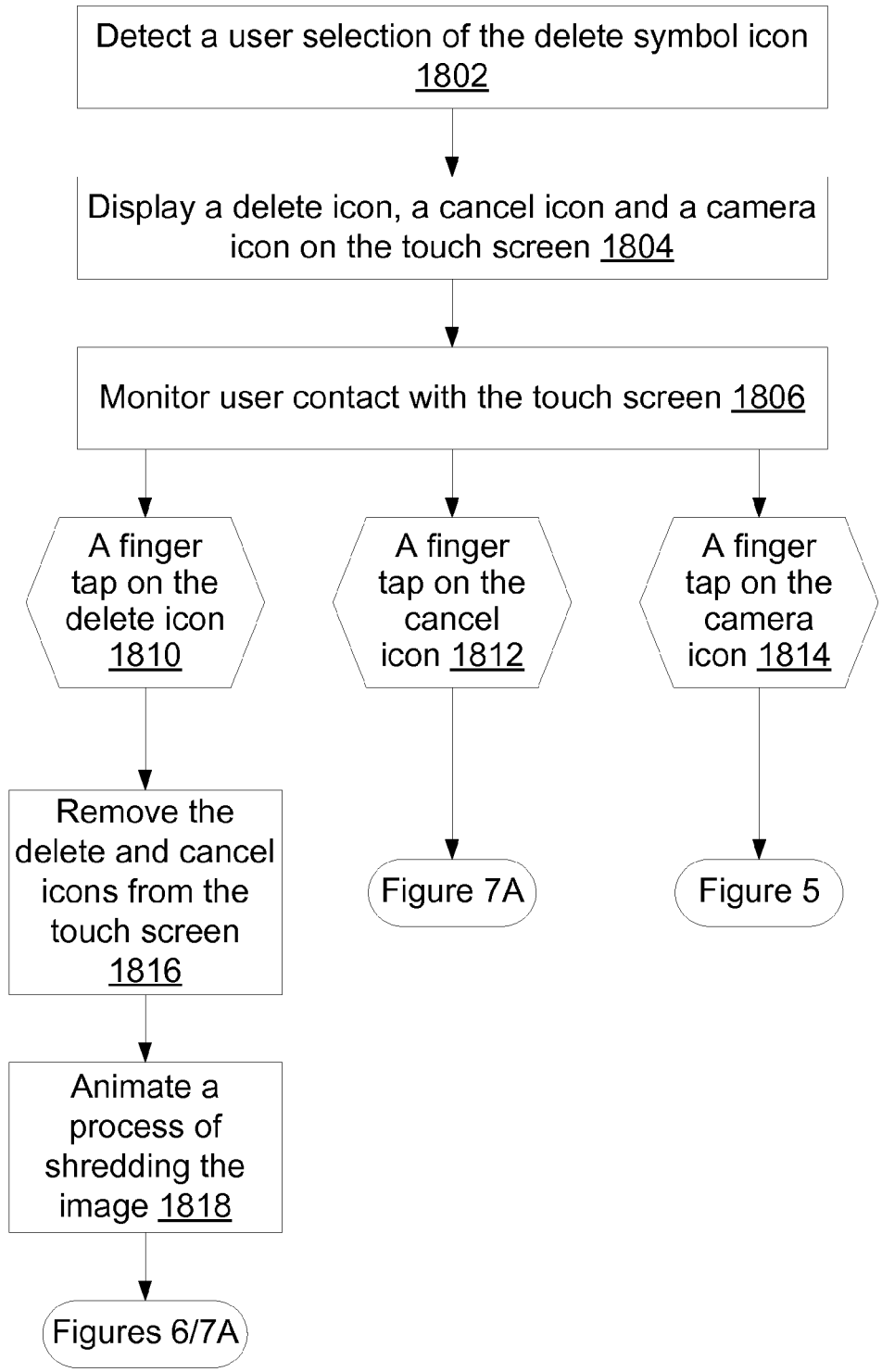
FIG. 18 is a flowchart illustrating a process for deleting an image in response to a user contact with the touch screen in accordance with some embodiments.

FIG. 18 is a flowchart illustrating a process for deleting an image in response to a user contact with the touch screen in accordance with some embodiments. Upon detecting a user contact with the delete symbol icon 714 (1802), the portable electronic device displays the delete icon 716, the cancel icon 718, and the camera icon 604 on top of the image 704 (1804) and then monitors next user contact with the touch screen (1806).

In some embodiments, in response to a finger gesture on the delete icon 716 (1810), the portable electronic device eliminates the icons 716, 718 from the touch screen (1816) and initiates an animated process of "shredding" the image 704 (1818). In some embodiments, the shredding process includes breaking the image 704 into vertical stripes and dropping the vertical stripes from the touch screen at different paces. Other shredding animations, such as placing the image in a trash icon, may be used in other embodiments.

In some embodiments, the portable electronic device brings back the camera roll user interface 600 as shown in FIG. 6 after deleting the image 704. The user can then repeat any aforementioned processes shown in FIG. 16. In some other embodiments, the portable electronic device displays the next image in the virtual camera roll on the touch screen. The user may repeat any aforementioned processes shown in FIG. 17.

If the portable electronic device detects a finger gesture on the cancel icon 718 (1812), it the device brings back the user interface 700A as shown in FIG. 7A. If the next user action is a finger gesture on the camera icon 604 (1814), the portable electronic device switches back to the camera mode user interface 500, which allows the user to take new photos.

This deletion process, which requires user finger gestures on two different user interfaces (e.g., 700A and 700B), reduces the chance of a user accidentally deleting an image or other similar item.

In some embodiments, the portable electronic device stores images within different photo albums. The images may come from different sources. They may be downloaded from locations such as the user's desktop or laptop computer and a website on the Internet, etc. For example, one album may include images downloaded from a website through the web browser 147, images attached to email messages received by the user of the portable electronic device, and photos taken by the portable electronic device using the camera module 143.

Figure 8:
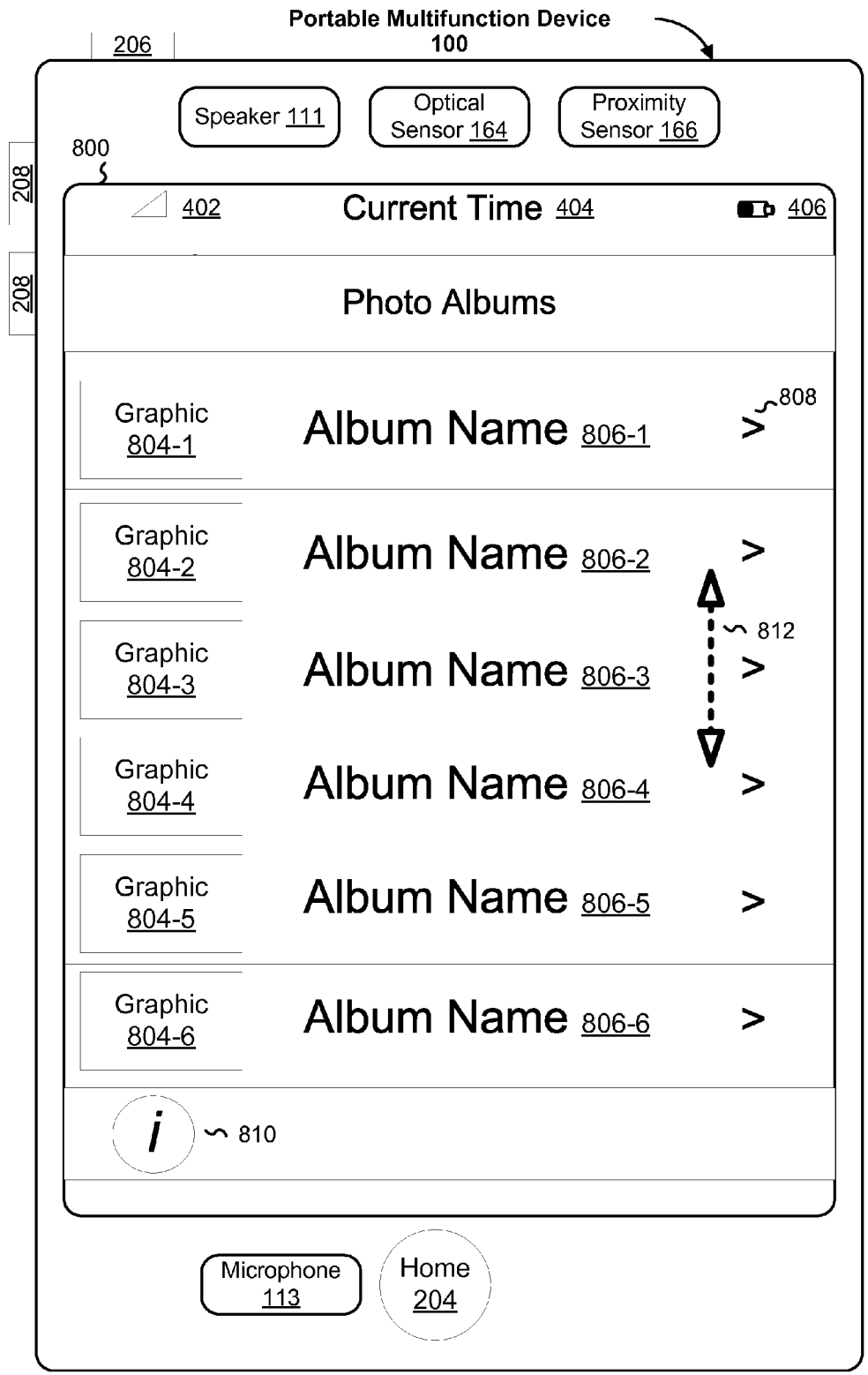
FIG. 8 illustrates an exemplary user interface for viewing photo albums in accordance with some embodiments.

FIG. 8 illustrates an exemplary user interface for viewing photo albums in accordance with some embodiments. In some embodiments, user interface 800 includes the following elements, or a subset or superset thereof:

402, 404, and 406, as described above;
Graphics 804, e.g., thumbnail images of the first picture or a user-selected picture in the corresponding albums;
Album names 806;
Selection icons 808 that when activated (e.g., by a finger gesture on the icon) initiates display of the corresponding album (e.g., UI 1000, FIG. 10); and
Settings icon 810, that brings up a settings menu (e.g., FIG. 9) when activated by a user gesture (e.g., a tap gesture).

Figure 19:
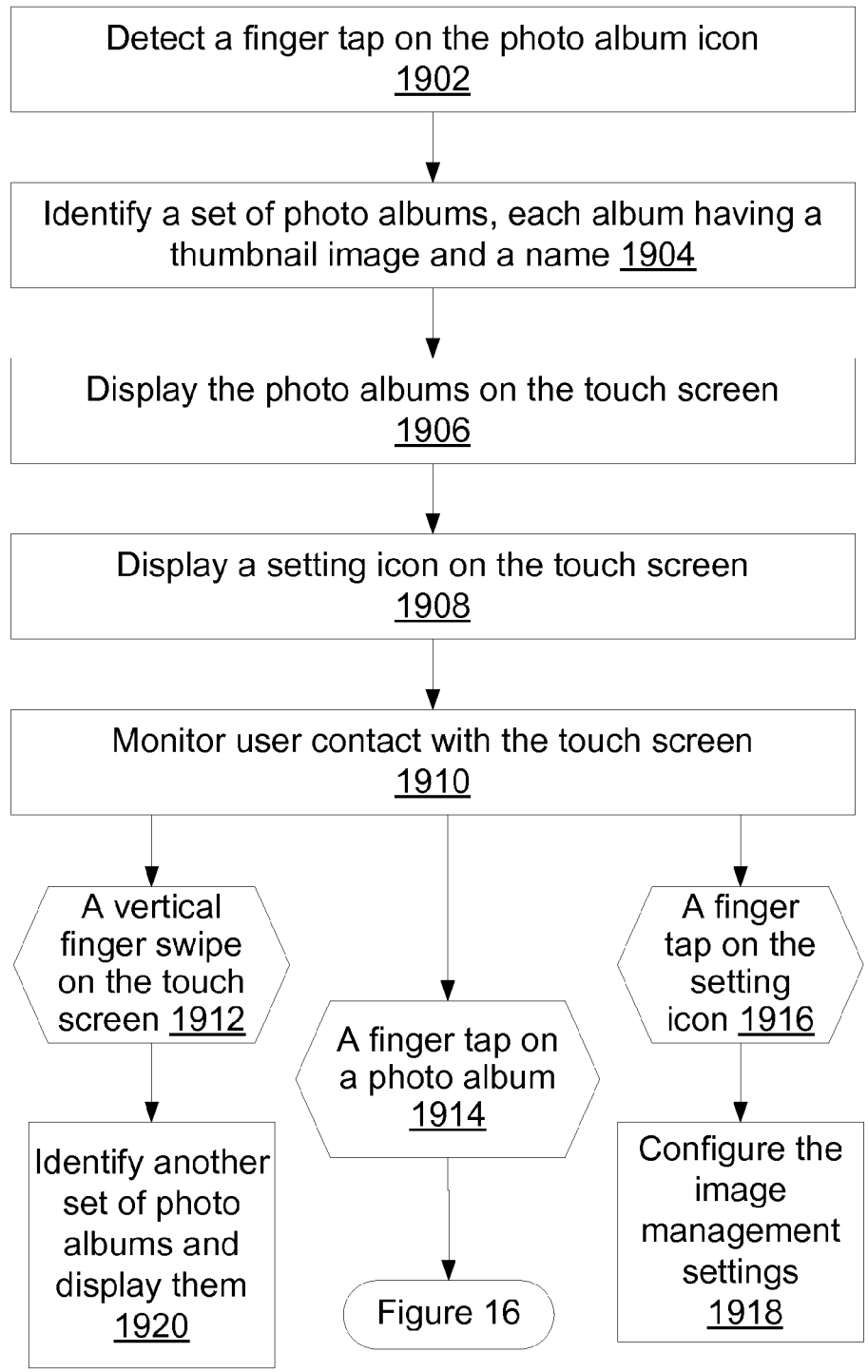
FIG. 19 is a flowchart illustrating a process for displaying multiple photo albums on the touch screen in accordance with some embodiments.

FIG. 19 is a flowchart illustrating a process for displaying multiple photo albums on the touch screen in accordance with some embodiments. After detecting a finger gesture 412 (FIG. 4) on the icon for the image management module 144 (1902), the portable electronic device identifies a set of photo albums (1904) and displays them on the touch screen (1906). FIG. 8 depicts a vertically list of photo albums 804 list, each album having a thumbnail image 804, a name 806, and a selection icon 808. In some embodiments, the photo albums are ordered alphabetically by their names. In some other embodiments, the photo albums are ordered by their creation timestamps, e.g., with the most recent one at the top of the list.

The portable electronic device displays a setting icon 810 at the bottom of the touch screen (1908) and monitors user contact with the touch screen (1910). As will be described below in connection with FIG. 9, a user can configure the image management module 144 to operate in a user-chosen manner through the setting icon 810.

If there is a long photo album list, the user may scroll through the list using vertically upward/downward finger gestures 812 such as a vertical finger swipe on the touch screen (1912, 1920). When the user selects a particular album by a finger gesture (1914), the portable electronic device opens the album by executing the process described above in connection with FIG. 16. The virtual camera roll shown in FIG. 6 is one of many photo albums. User operations associated with the virtual camera roll also applies to images in a user-chosen album. A more detailed description of exemplary user operations is provided below in connection with FIGS. 10-12. In some embodiments, a user may initiate display of an album by contacting any region on the touch screen corresponding to the album (e.g., a finger tap on the graphic 804, album name 806, or selection icon 808).

Figure 9:
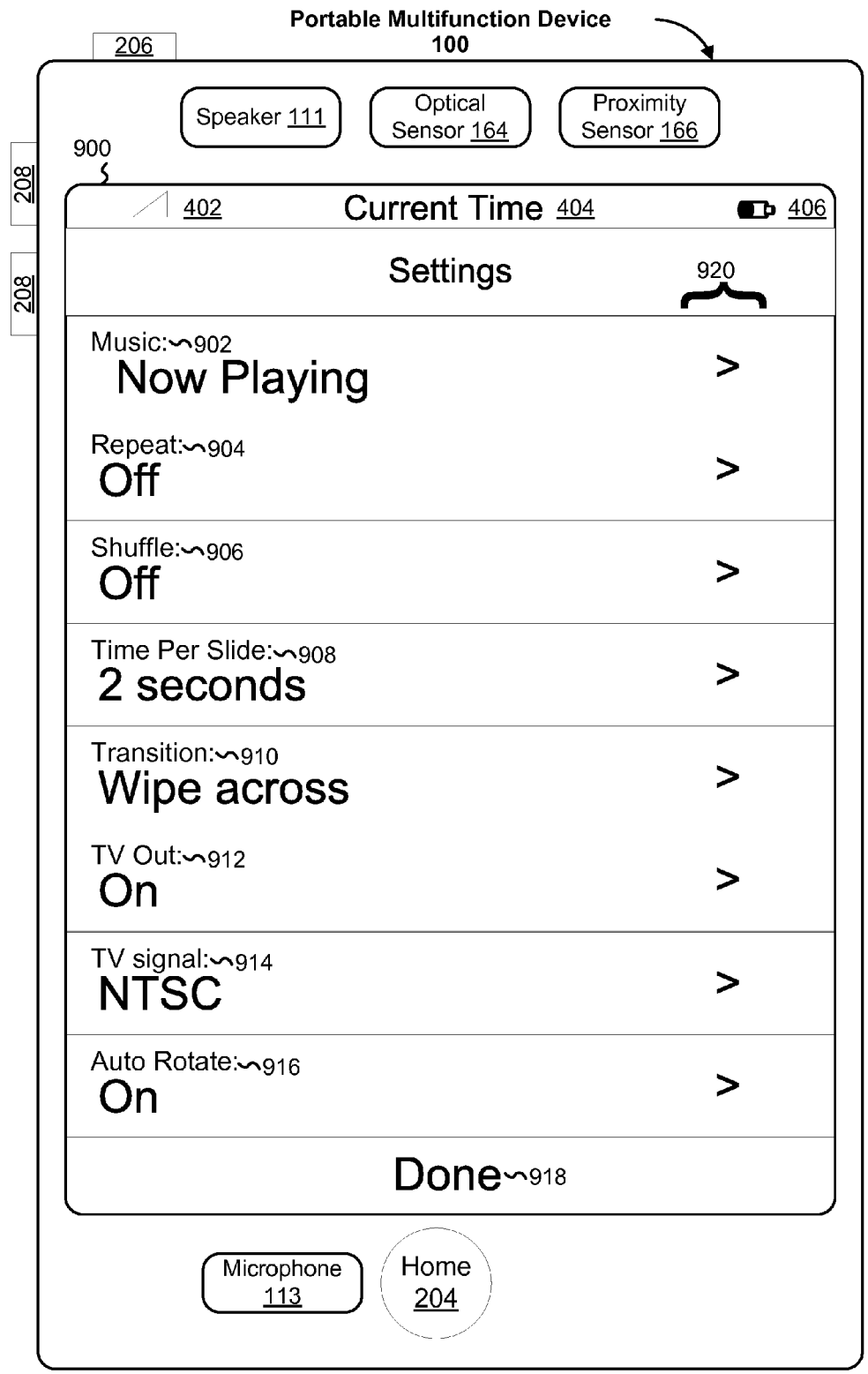
FIG. 9 illustrates an exemplary user interface for setting user preferences in accordance with some embodiments.

Upon detecting a finger gesture on the setting icon 810 (1916), the portable electronic device renders a Settings user interface that enables the user to configure the image management service (1918). FIG. 9 illustrates an exemplary Settings user interface 900 for setting user preferences in accordance with some embodiments. In some embodiments, user interface 900 includes the following elements, or a subset or superset thereof:

402, 404, and 406, as described above;
Music setting 902 for selecting the music during a slide show (e.g., Now Playing, 90s Music, Recently Added, or Off);

Repeat setting 904 for selecting whether the slide show repeats (e.g., On or Off);

Shuffle setting 906 for selecting whether the images in the slide show are displayed in a random or pseudo-random order (e.g., On or Off);

Time per slide setting 908 (e.g., 2, 3, 5, 10, 20 seconds or manual);

Transition setting 910 (e.g., random, wipe across, wipe down, or off);

TV out setting 912 for external display (e.g., on, off, or ask user);

TV signal setting 914 (e.g., NTSC or PAL);

Auto Rotate setting 916 (e.g. on or off);

Done icon 918 that when activated (e.g., by a finger gesture on the icon) returns the portable electronic device to the previous UI (e.g., UI 800); and Selection icons 920 that when activated (e.g., by a finger gesture on the icon) show choices for the corresponding settings.

In some embodiments, a user may touch anywhere in a row for a particular setting to initiate display of the corresponding setting choices. For example, upon detecting a finger tap on TV Signal setting 914, the portable electronic device brings up a dropdown menu adjacent to the corresponding row. The dropdown menu lists configuration options associated with the setting. The user can select one option over another by applying a finger gesture on the selected option.

Figure 10:
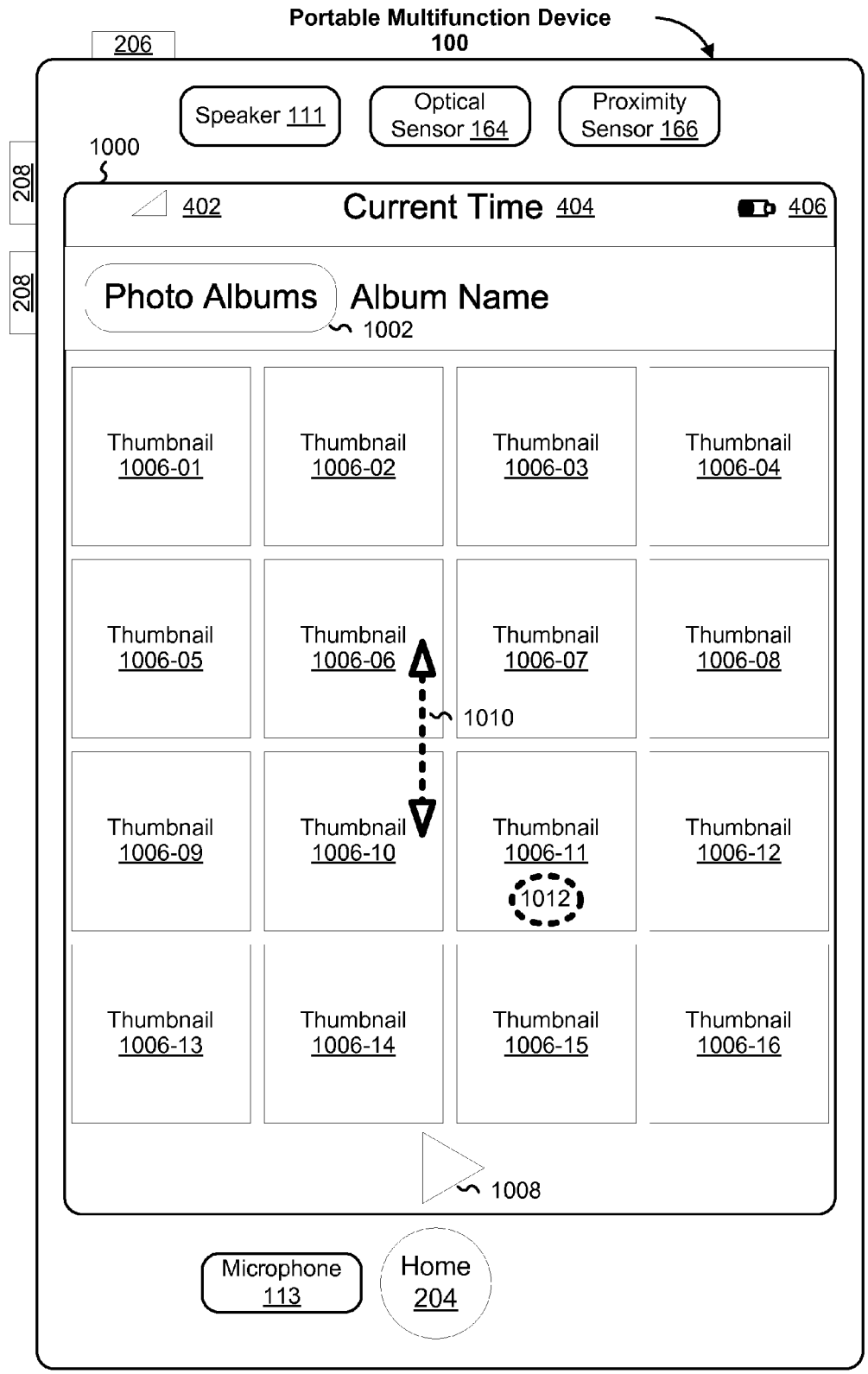
FIG. 10 illustrates an exemplary user interface for viewing an album in accordance with some embodiments.

FIG. 10 illustrates an exemplary user interface for viewing an album in accordance with some embodiments. In some embodiments, user interface 1000 includes the following elements, or a subset or superset thereof:

402, 404, and 406, as described above;

Photo albums icon 1002 that when activated (e.g., by a finger gesture on the icon) initiates transfer to the photo albums UI (e.g., UI 800);

Thumbnail images 1006 of images in the corresponding album;

Play icon 1008 that when activated (e.g., by a finger gesture on the icon) initiates a slide show of the images in the album;

The user interface 1000 is similar to the user interface 600 associated with the camera roll icon 504. Both user interfaces perform similar operations upon detecting a user contact with the thumbnail images. For example, the user may scroll through the thumbnails 1006 using vertically upward/downward gestures 1010 on the touch screen. In some embodiments, a stationary gesture on a particular thumbnail (e.g., a finger tap 1012 on thumbnail 1006-11) initiates transfer to an enlarged display of the corresponding image (e.g., UI 1100).

In some embodiments, there are differences between the two user interfaces. For example, the user interface 1000 has a play icon 1008 while the user interface 600 has a camera icon 604. A user selection of the play icon 1008 triggers the portable electronic device to begin a slide show of the images in the user-selected album. In contrast, the portable electronic device returns to the camera mode (e.g., for taking pictures) when there is a user finger gesture on the camera icon 604.

Figure 11:
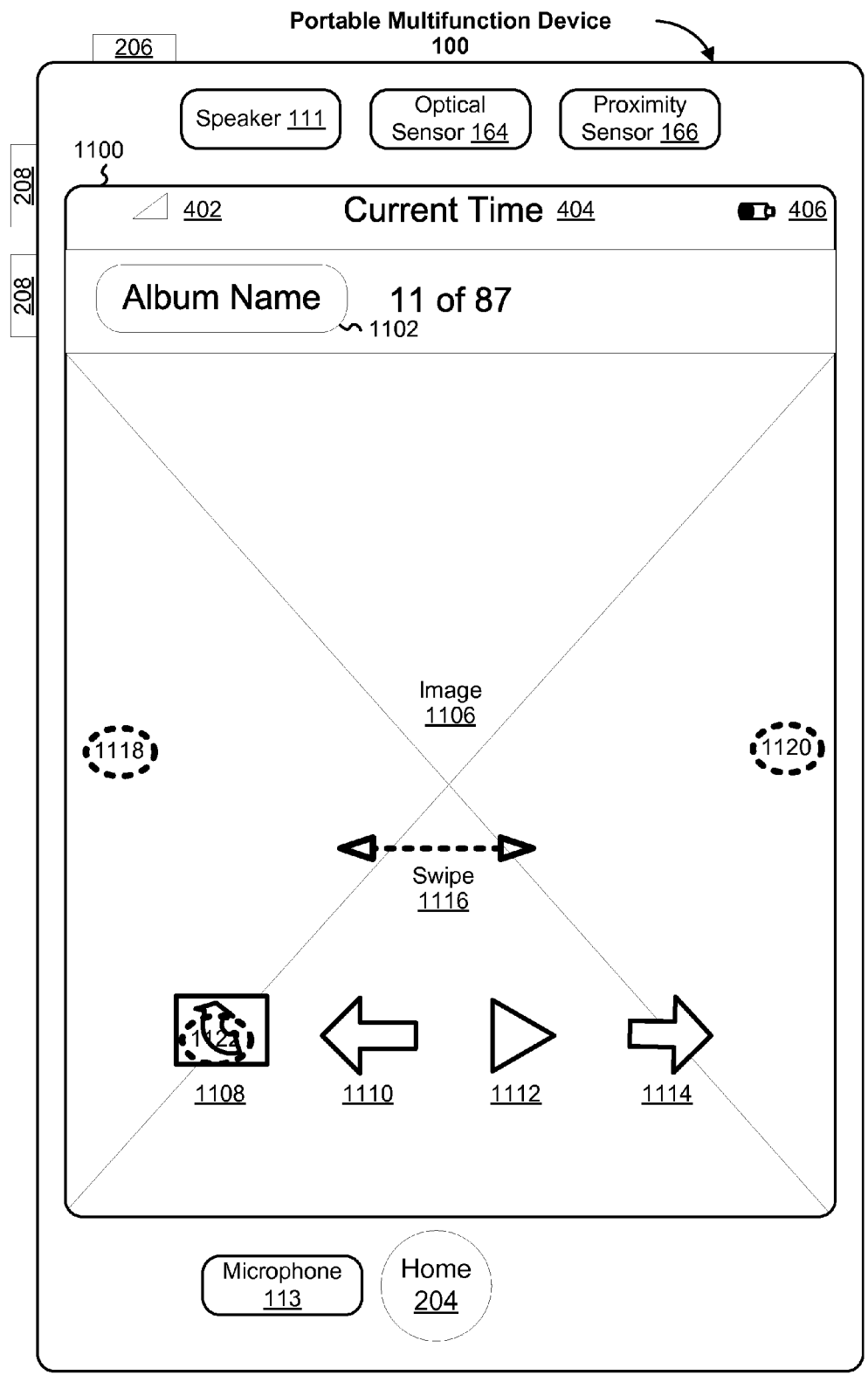
FIG. 11 illustrates an exemplary user interface for viewing images in an album in accordance with some embodiments.

Upon user selection of a particular image, the portable electronic device renders a new user interface displaying the user-selected image. FIG. 11 illustrates such an exemplary user interface for viewing images in an album in accordance with some embodiments. In some embodiments, user interface 1100 includes the following elements, or a subset or superset thereof:

402, 404, and 406, as described above;

Album name icon 1102 that when activated (e.g., by a finger gesture on the icon) initiates transfer to the corresponding album UI (e.g., UI 1000);

Image 1106;

Additional options icon 1108 that when activated (e.g., by a finger gesture on the icon) initiates transfer to a UI with additional options for use of image 1106 (e.g., UI 1200, FIG. 12));

Previous image icon 1110 that when activated (e.g., by a finger gesture on the icon) initiates display of the previous image in the album (e.g., 1006-10);

Play icon 1112 that when activated (e.g., by a finger gesture on the icon) initiates a slide show of the images in the album; and Next image icon 1114 that when activated (e.g., by a finger gesture on the icon) initiates display of the next image in the album.

Clearly, the user interface 1100 is very similar to the user interface 700A. Various image browsing functions described above with respect to FIG. 7A are also available at the user interface 1100. For example, the user can initiate viewing of the previous image by making a tap gesture 1118 on the left side of the image or making a swipe gesture 1116 from left to right on the image. Similarly, the user can initiate viewing of the next image by making a tap gesture 1120 on the right side of the image or making a swipe gesture 1116 from right to left on the image.

In some embodiments, image 1106 moves off screen to the left as the next image moves on screen from the right. In some embodiments, image 1106 moves off screen to the right as the previous image moves on screen from the left.

With multiple ways to perform the same task, the portable electronic device enables a user to choose whichever methodology or gesture the user prefers, thereby making the photo management simpler and more intuitive.

A detailed description of the portable electronic device's operations in response to user selections of the previous image icon 1110, the play icon 1112, and the next image icon 1114 have been provided above in connection with FIGS. 7A and 17. In response to a user contact with the additional options icon 706 (FIG. 7A) or 1108 (FIG. 11), the portable electronic device renders a new interface with additional options for the user to choose in connection with the image being displayed.

Figure 12:
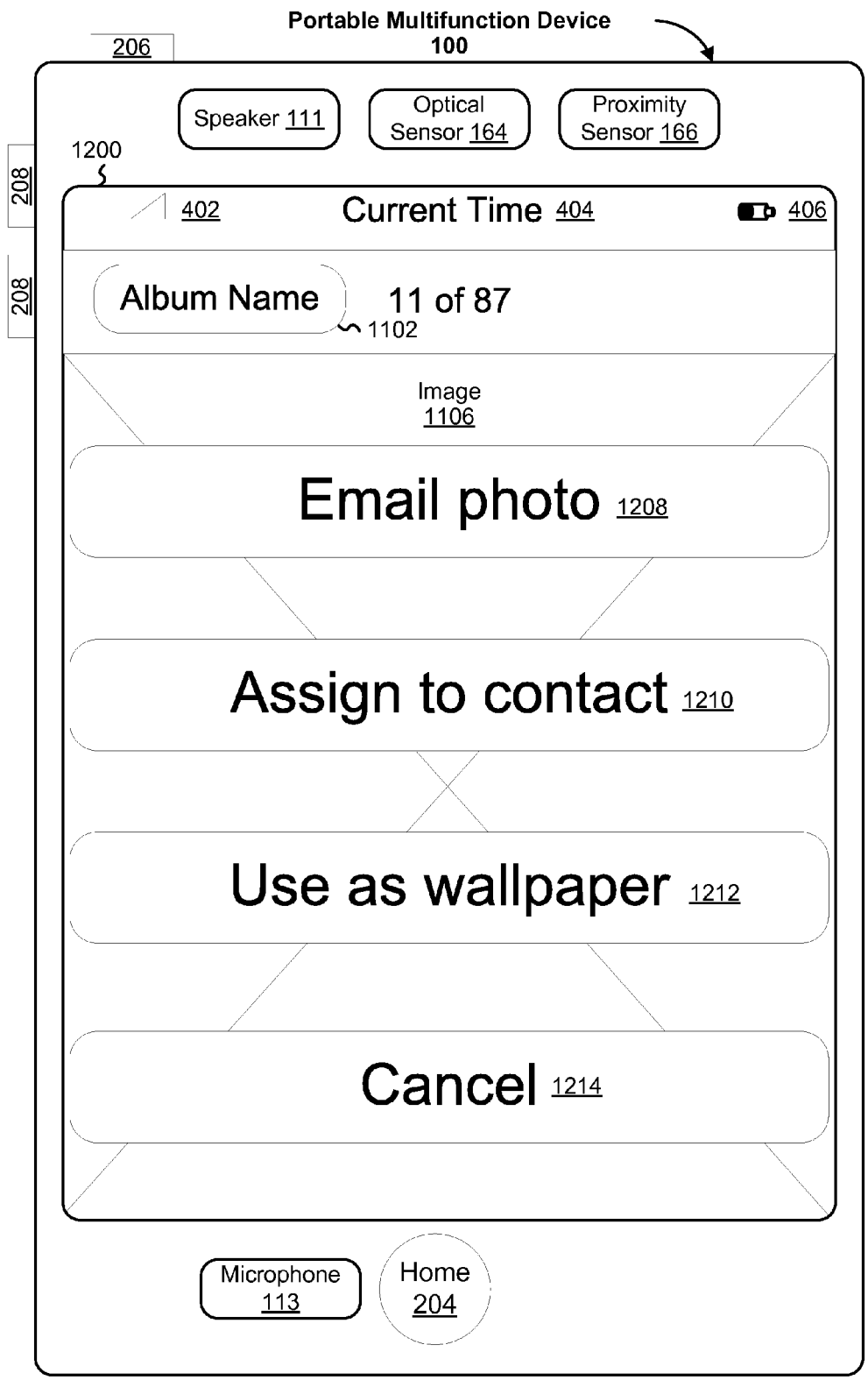
FIG. 12 illustrates an exemplary user interface for selecting a use for an image in an album in accordance with some embodiments.
Figure 14A:
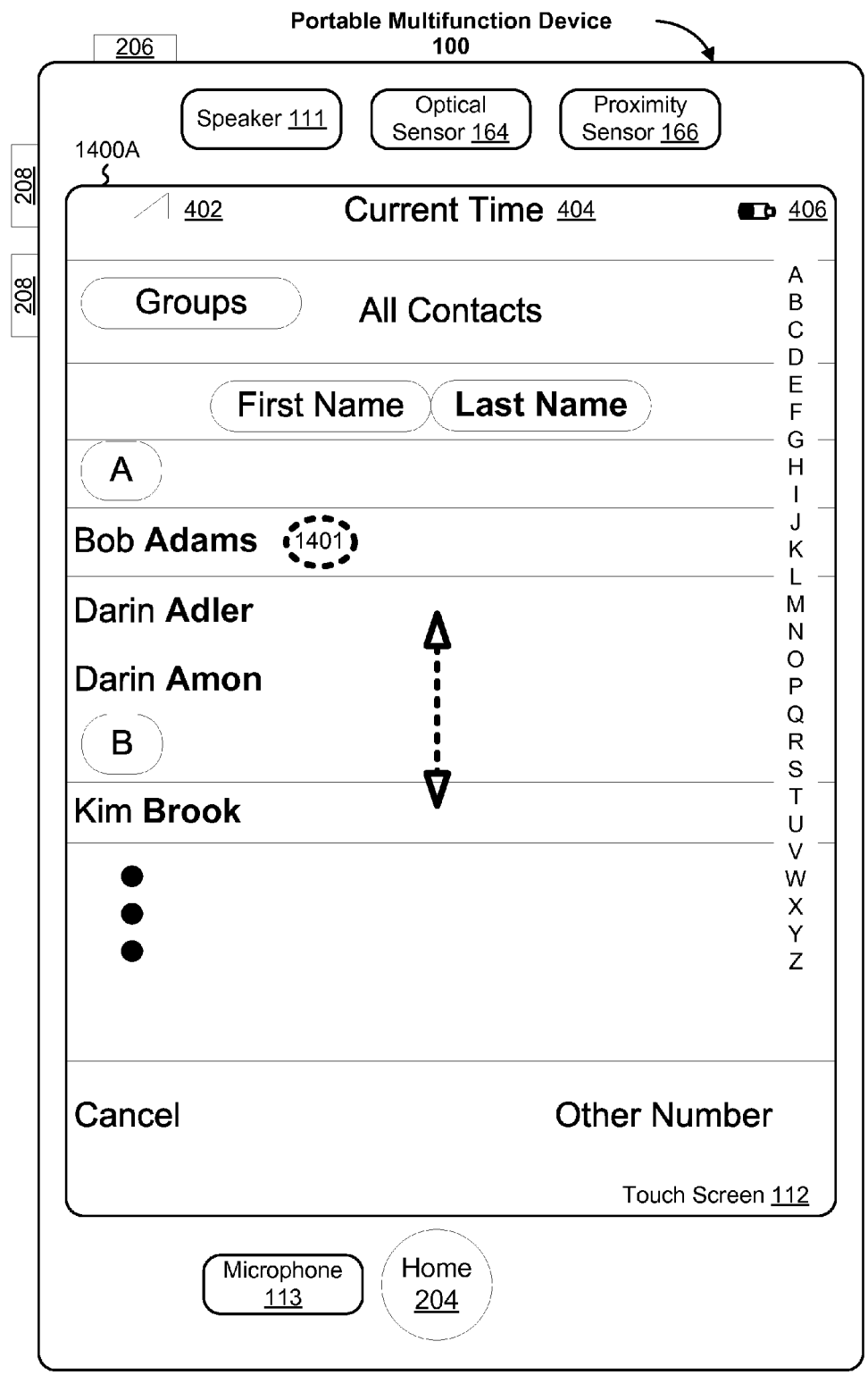
FIGS. 14A and 14B illustrate an exemplary user interface for assigning an image to a contact in the user's contact list in accordance with some embodiments.
Figure 14B:
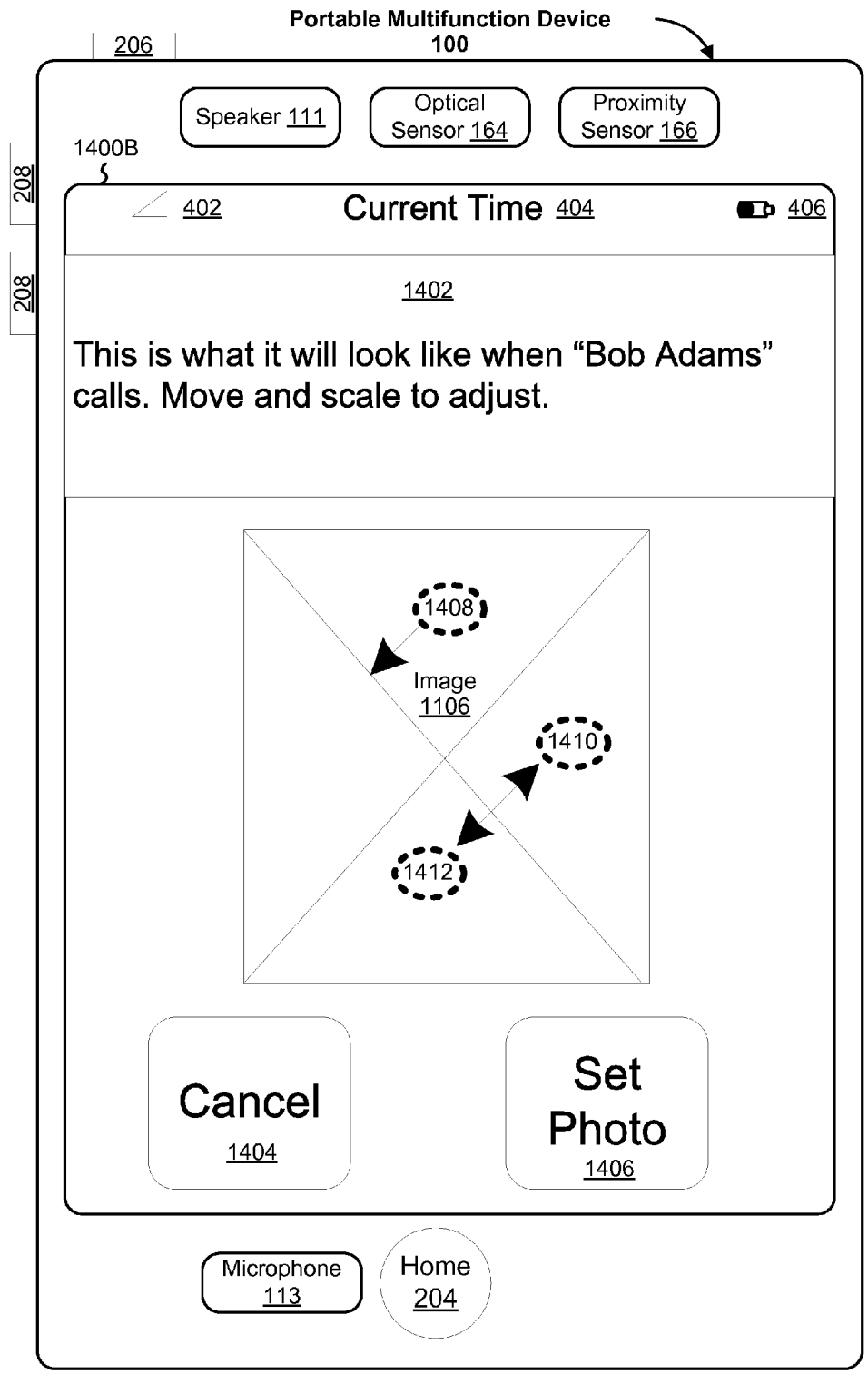
Figure 15:
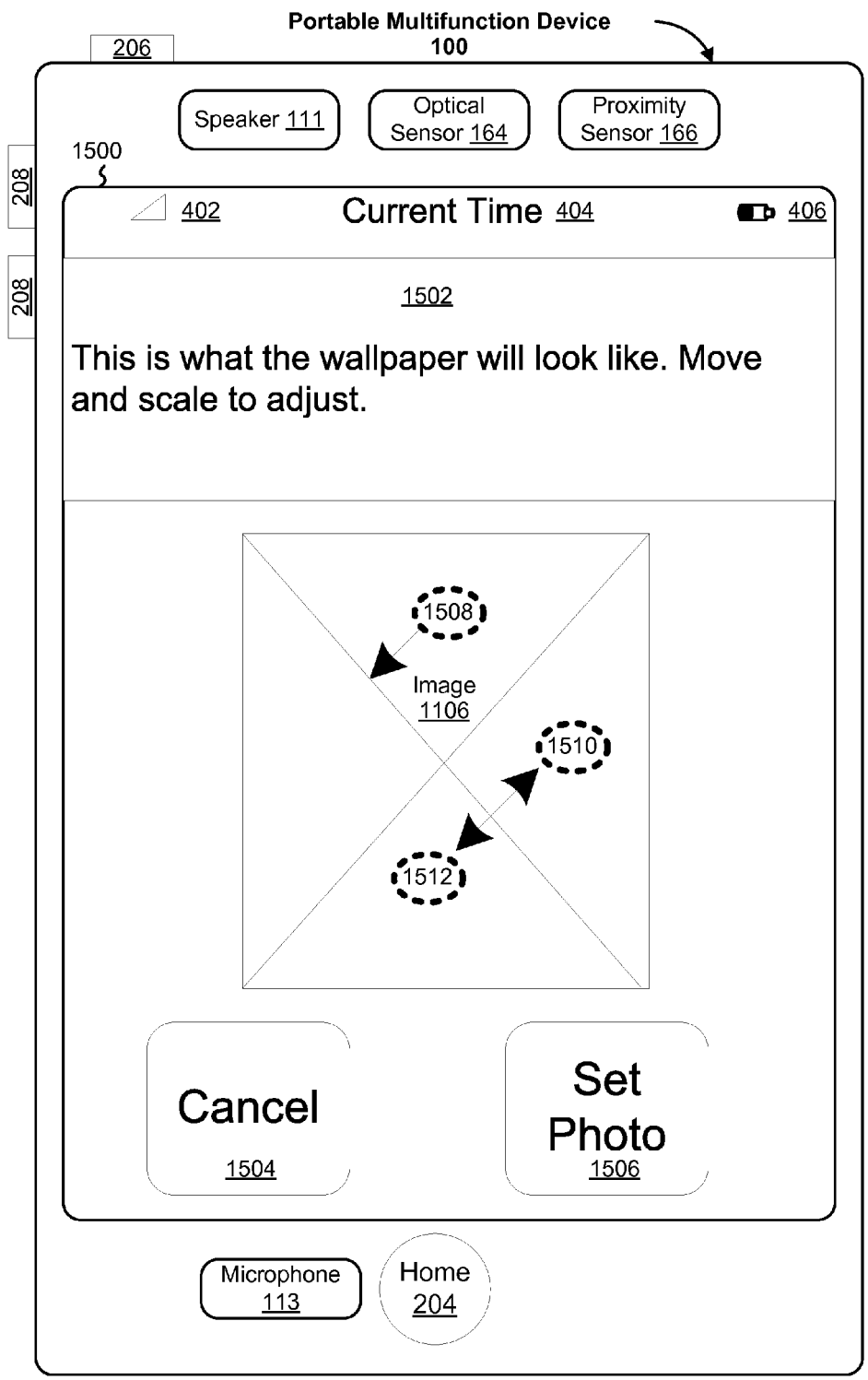
FIG. 15 illustrates an exemplary user interface for incorporating an image in the user's wallpaper in accordance with some embodiments.

FIG. 12 illustrates such an exemplary user interface for selecting a use for an image in an album in accordance with some embodiments. In some embodiments, user interface 1200 includes the following elements, or a subset or superset thereof:

402, 404, 406, 1602, and 1106 as described above;

Email photo icon 1208 that when activated (e.g., by a finger gesture on the icon) initiates a process for incorporating the image 1106 in an email (e.g., as illustrated in FIGS. 13A-13G);

Assign to contact icon 1210 that when activated (e.g., by a finger gesture on the icon) initiates a process for associating the image 1106 with a contact in the user's contact list (e.g., as illustrated in FIGS. 14A-14B);

Use as wallpaper icon 1212 that when activated (e.g., by a finger gesture on the icon) initiates a process for incorporating the image 1106 in the user's wallpaper (e.g., as illustrated in FIG. 15); and Cancel icon 1214 that when activated (e.g., by a finger gesture on the icon) initiates transfer back to the previous UI (e.g., UI 1100).

In some embodiments, as shown in FIG. 12, the image 1106 is displayed in the background and one or more the function icons 1208, 1210, 1212, 1214, are superimposed over the displayed image 1106.

Figure 20:
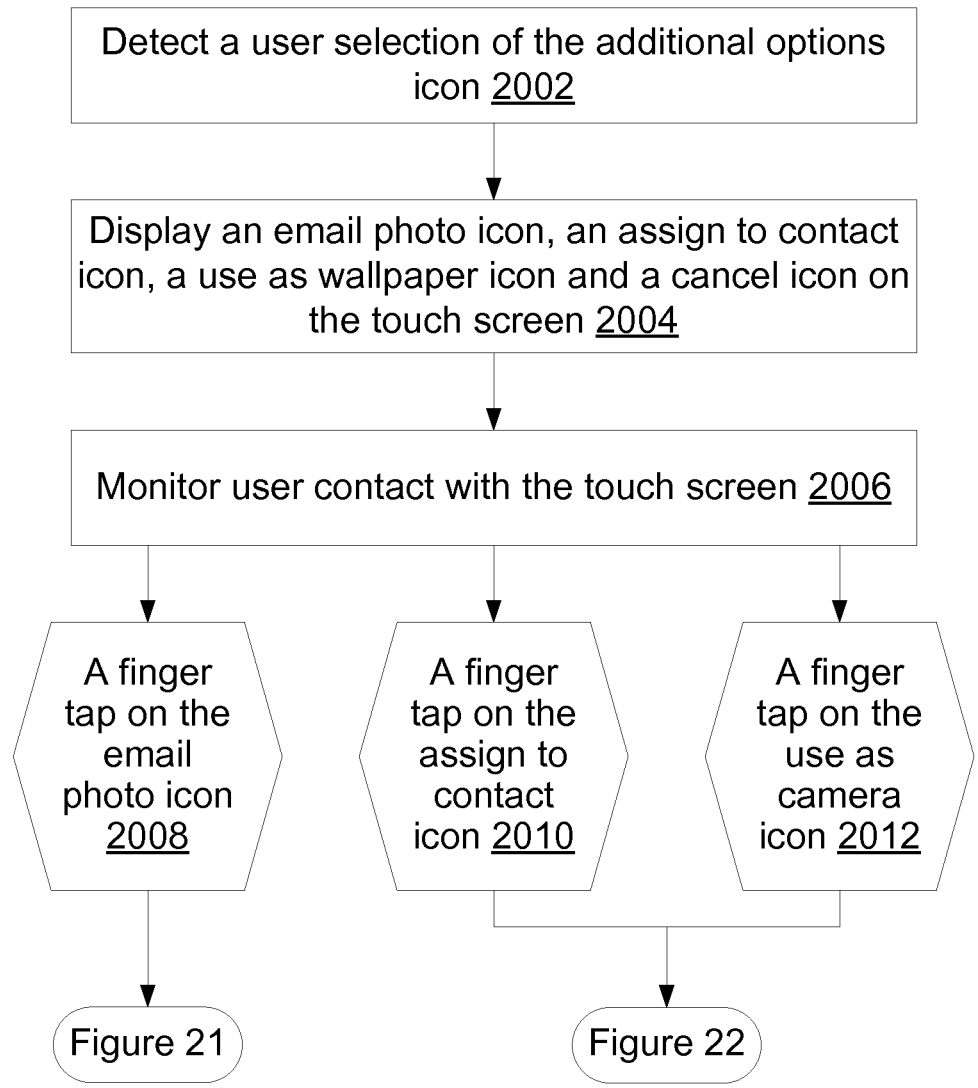
FIG. 20 is a flowchart illustrating a process for performing additional operations upon a user selection of an additional options icon in accordance with some embodiments.

FIG. 20 is a flowchart illustrating a process for performing additional operations upon a user selection of an additional options icon (e.g., icon 1108 in UI 1100, FIG. 11) in accordance with some embodiments. Upon detecting a finger gesture 1122 on the additional options icon (2002), the portable electronic device displays a list of option icons on the touch screen (2004). Each option icon corresponds to a specific operation on the image being displayed. As shown in FIG. 12, the list includes Email photo icon 1208, Assign to contact icon 1210, Use as wallpaper icon 1212, and Cancel icon 1214. In some other embodiments, the user interface 1200 may include a subset of these icons, and may also include additional image usage icons for invoking other image usage functions.

If the user selects the email photo icon 1208 by a finger gesture (2008), the portable electronic device renders an email service interface that allows the user to send the image 1106 to somebody through email. If the user selects the assign to contact icon 1210 (2010), the portable electronic device displays a user interface (having a list of contacts) for the user to select a contact to be associated with the image 1106. Similarly, if the user selects the use as wallpaper icon 1212 (2012), the portable electronic device displays a user interface for the user to edit the image 1106 and set it as the portable electronic device's wallpaper.

Figure 21:
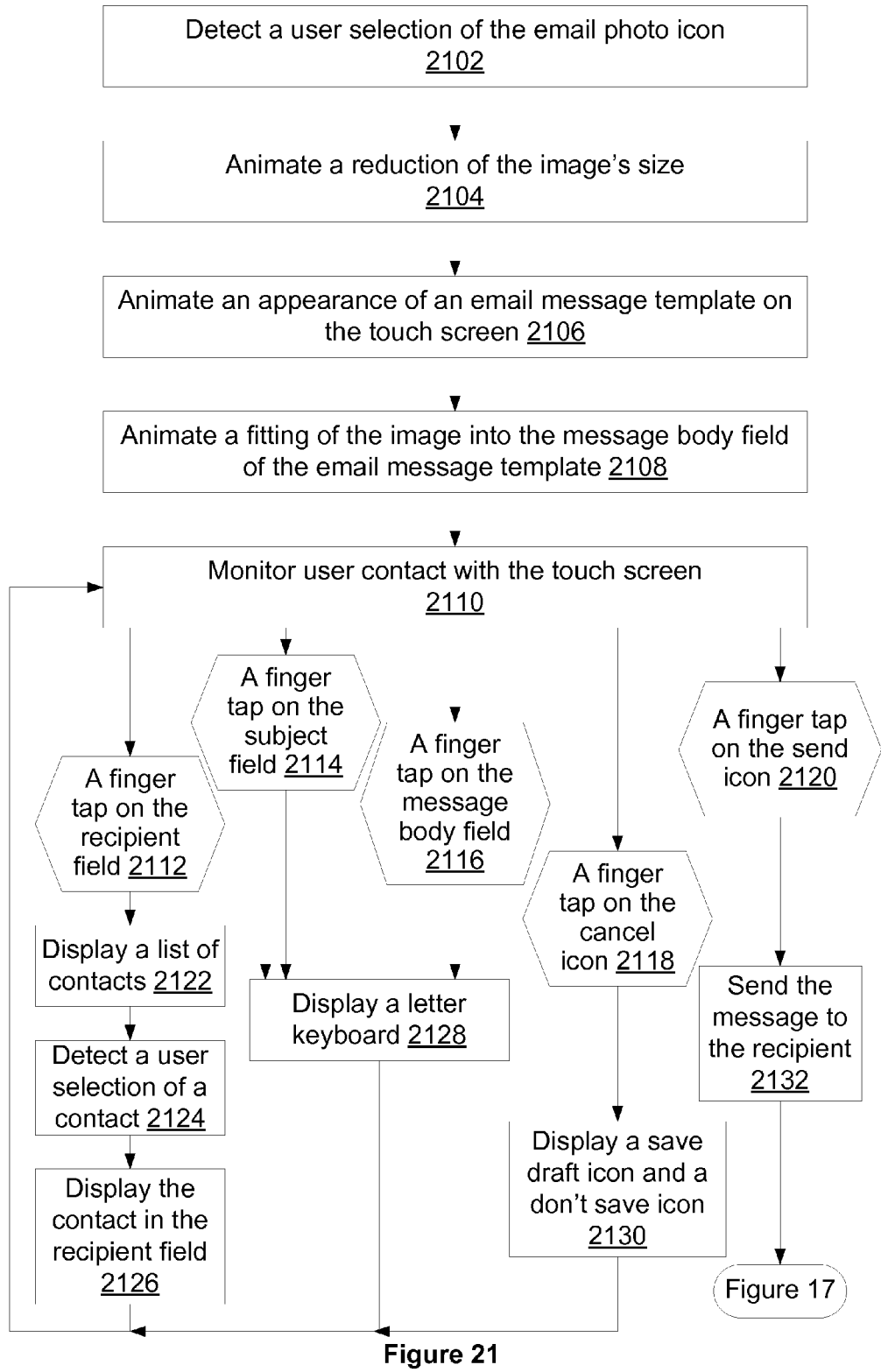
FIG. 21 is a flowchart illustrating an animated process for rendering an email service interface that includes a user selected image in accordance with some embodiments.

FIG. 21 is a flowchart illustrating an animated process for rendering an email service interface that includes a user selected image in accordance with some embodiments. After detecting the user selection of Email photo icon 1208 (2102), the portable electronic device animates a process of introducing an email message template onto the touch screen and placing the image into a predefined region of the email message template. In some embodiments, the animation includes initially reducing the image's size (FIG. 13A) (2104); sliding or otherwise rendering an email message template behind the image 1106 (FIG. 13B) (2106); and fitting the image into the message body field (FIG. 13C) of an email composition user interface 1300C (2108).

Figure 13A:
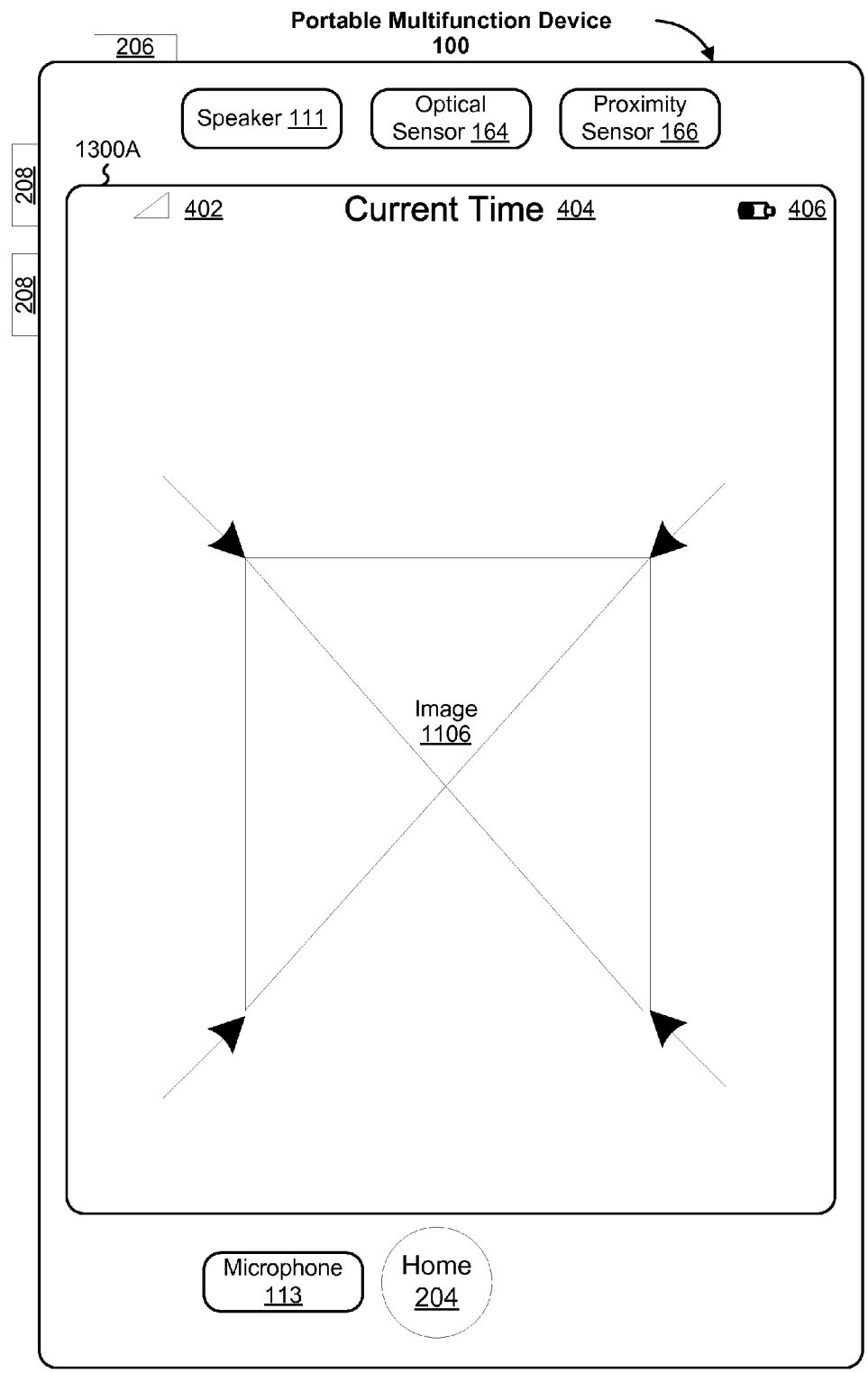
FIGS. 13A through 13G illustrate an exemplary user interface for incorporating an image in an email message template in accordance with some embodiments.
Figure 13B:
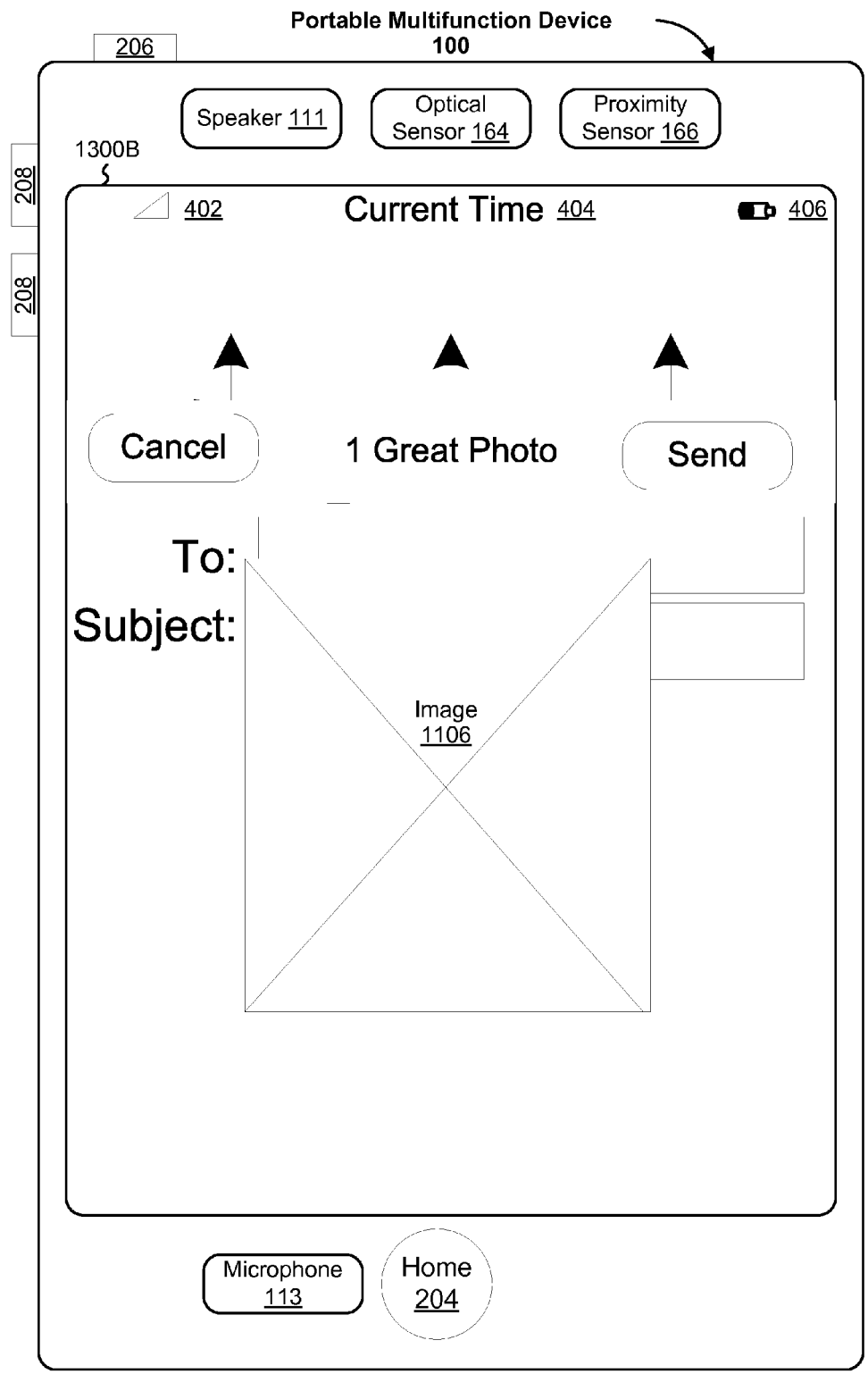
Figure 13C:
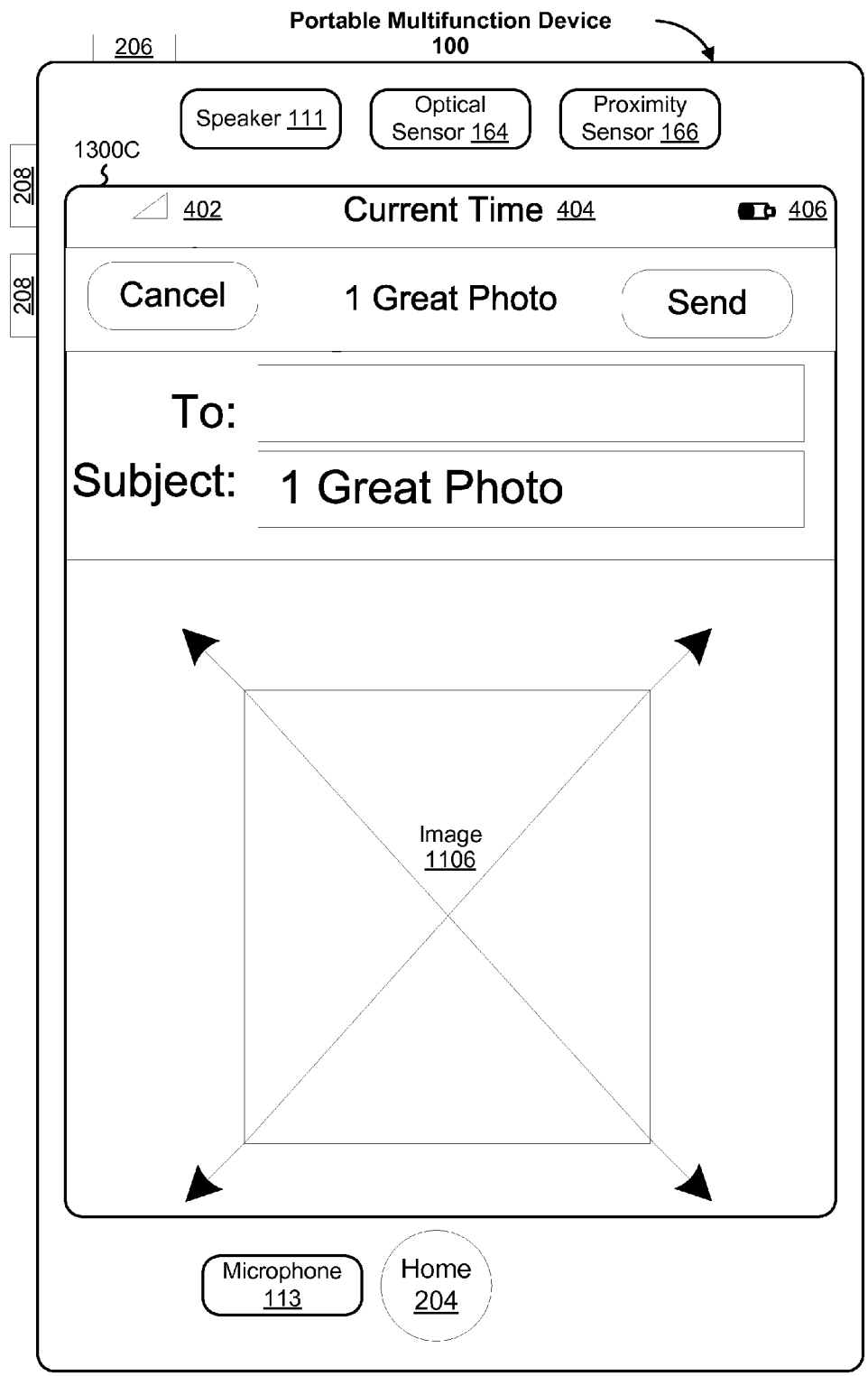
Figure 13D:
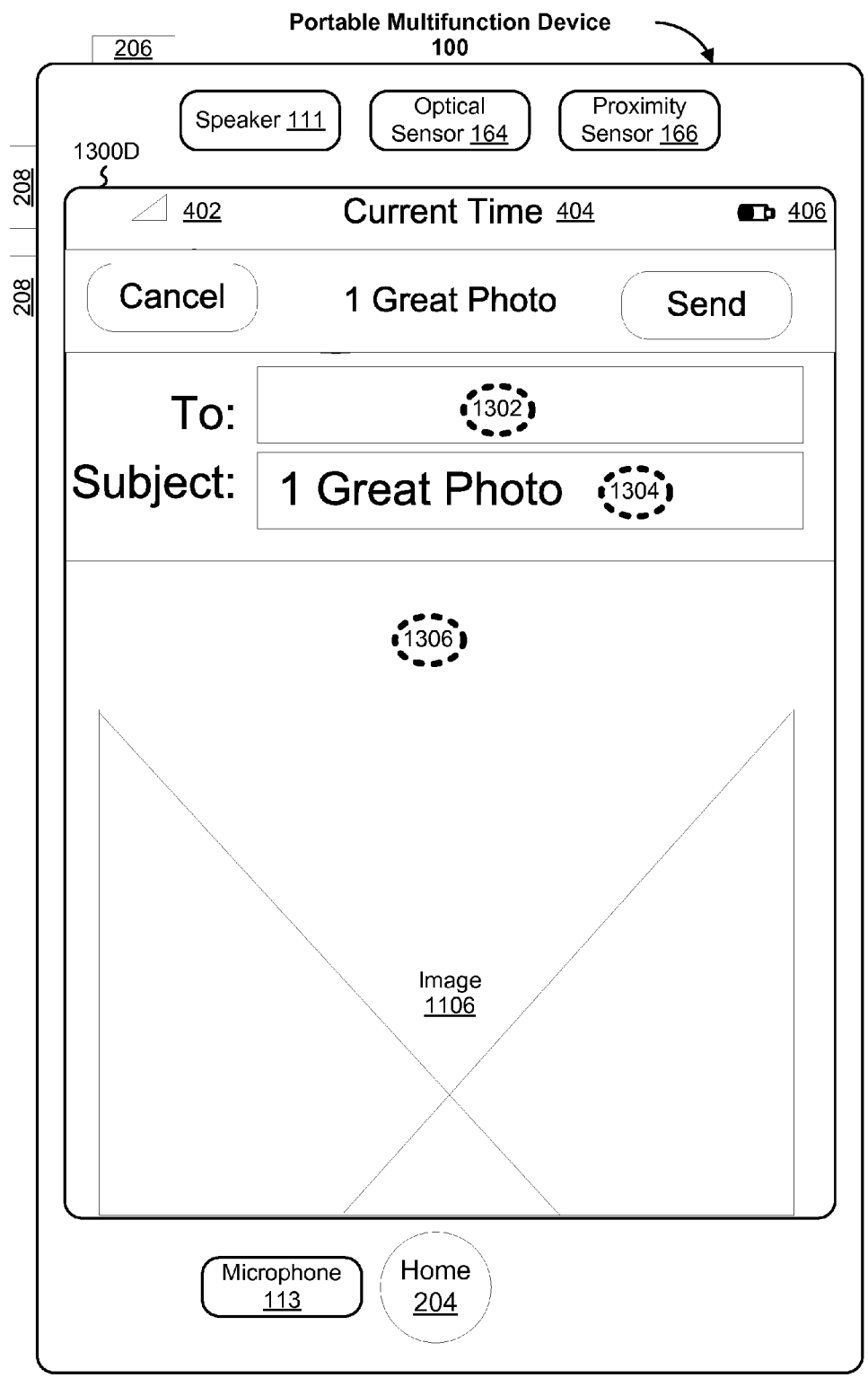
Figure 13E:
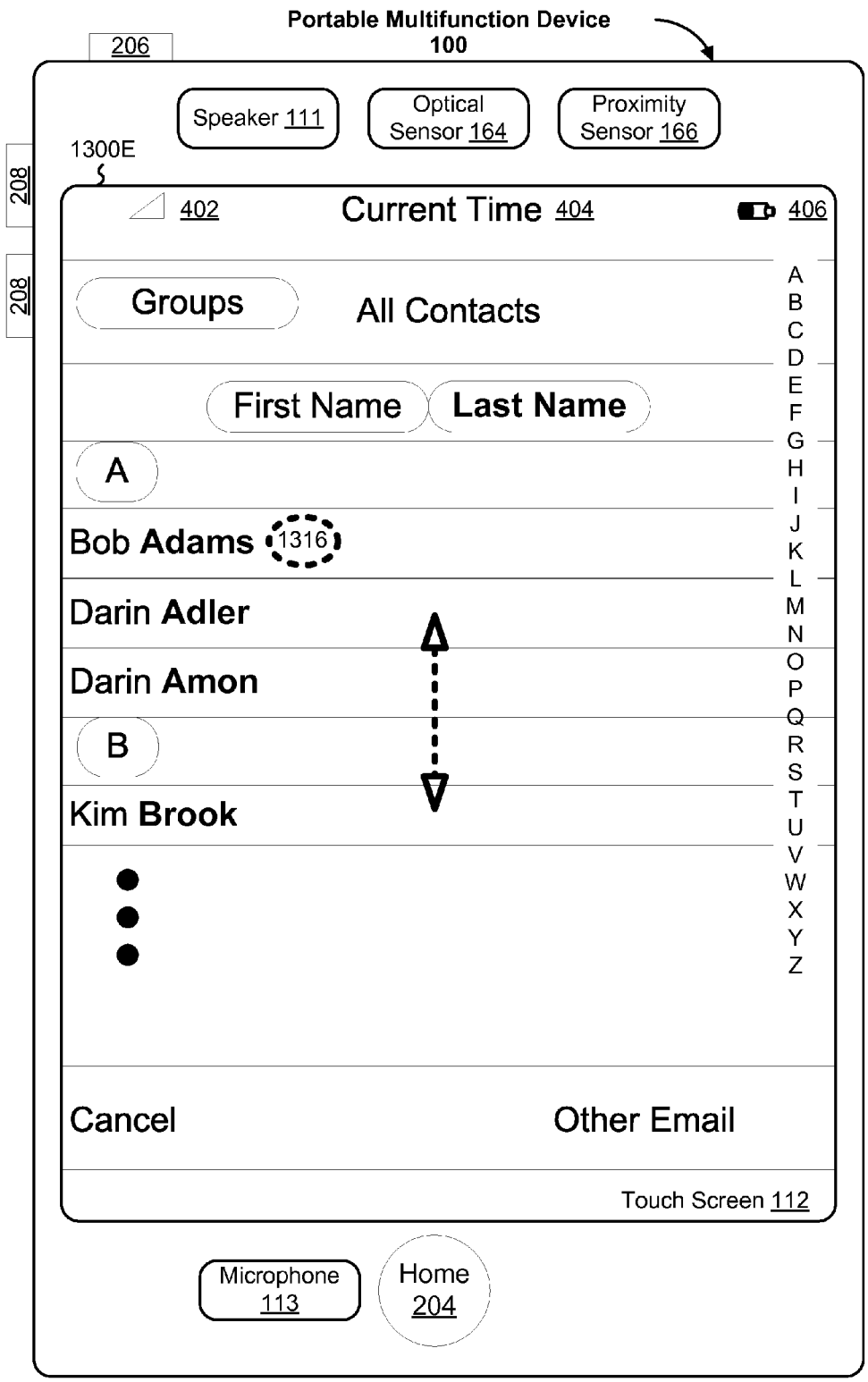

In some embodiments, following the animation, the device monitors the touch screen for user contact (2110). When the user taps on or makes other predefined gestures 1302 (FIG. 13D) on the To: field of the email recipient field to enter an email address (2112). The portable electronic device then displays the user's contact list (2122) (FIG. 13E). After detecting a user finger gesture or other predefined gesture on a recipient/contact (2124) (e.g., a finger tap 1316 on Bob Adams in FIG. 13E), the portable electronic device associates the recipient's email address with the email message and displays the contact's name in the To: field (2126) (e.g., "Bob Adams" in FIG. 13F).

Figure 13F:
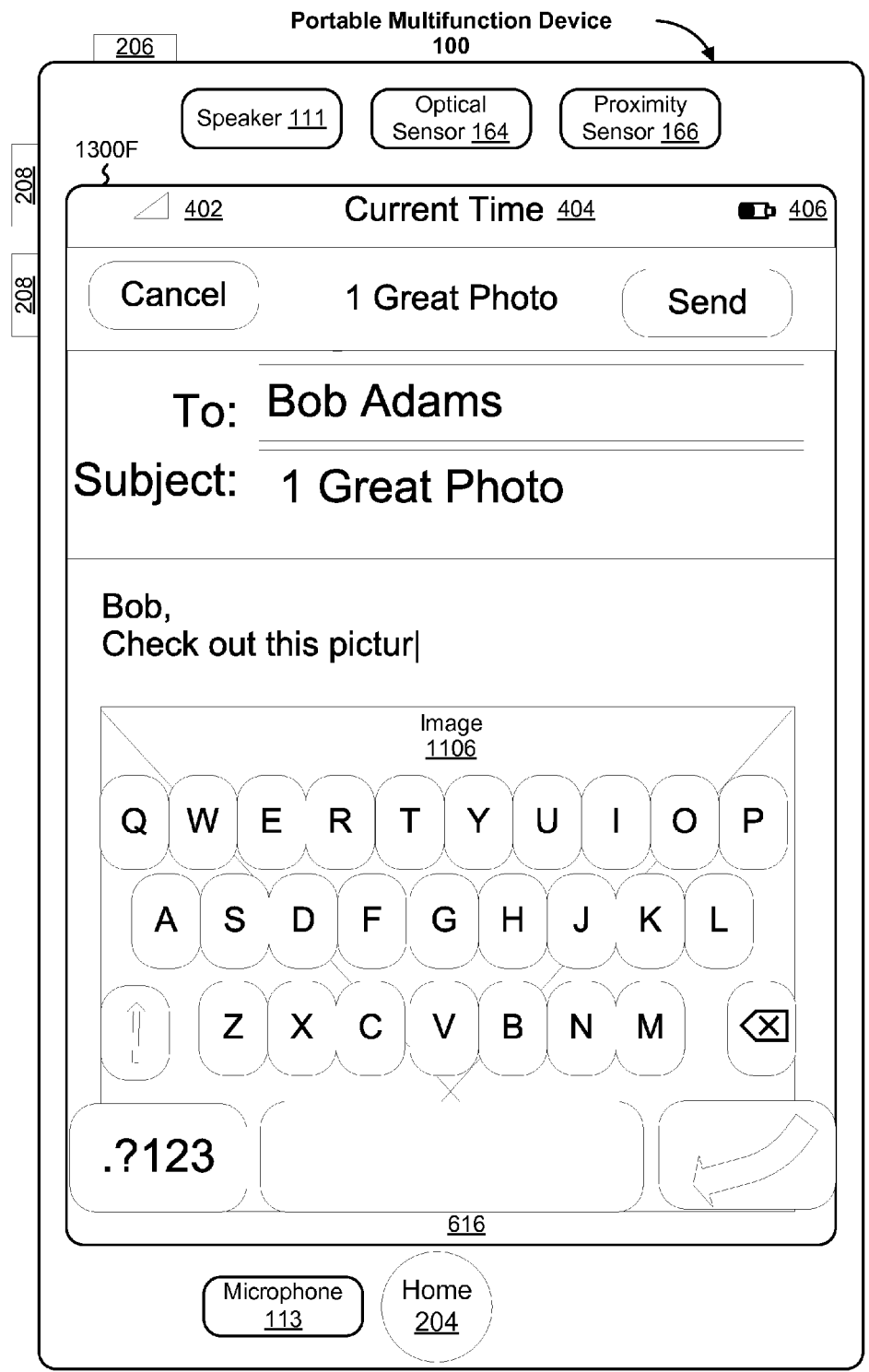

In some embodiments, in response to a user finger tap or other predefined gestures on predefined fields within the email message template (2114, 2116) (e.g., finger taps 1304, 1306 in FIG. 13D, or "Other Email" in FIG. 13E), the portable electronic device displays a letter keyboard 616 (2128) on the touch screen. The user may enter text into the respective fields through the letter keyboard 616 (FIG. 13F). In some embodiments, the user may also enter an email address by tapping on character icons in the letter keyboard or other character keyboards.

Figure 13G:
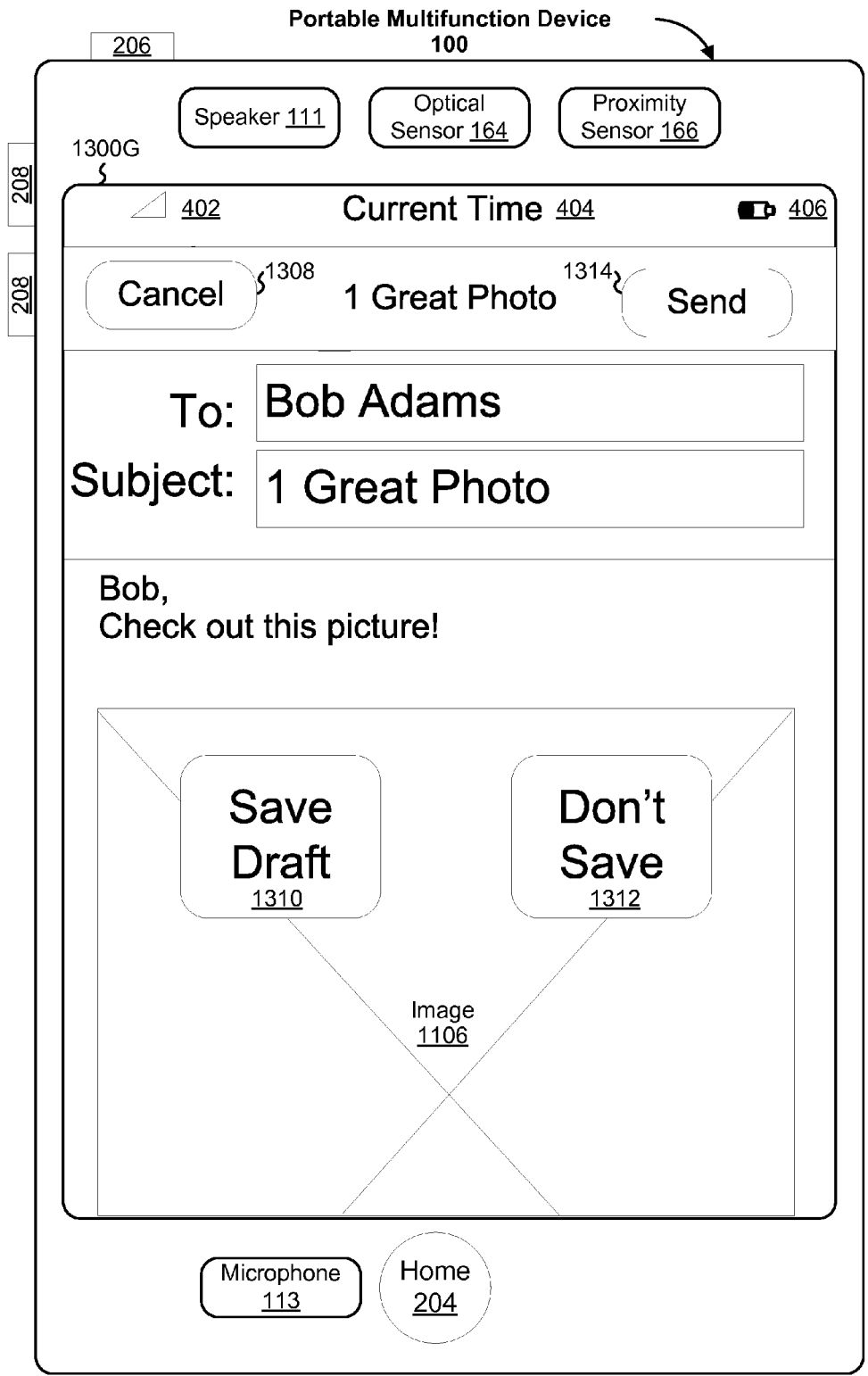

As shown in FIG. 13G, after detecting a finger gesture on the send icon 1314 (2120), the portable electronic device sends the email message to its recipient(s) (2132) and returns to the user interface 1000 or 1100. But if the user selects the cancel icon 1308 (2118), the portable electronic device may display the save draft icon 1310 and the don't save icon 1312 (2130). The device saves the draft in a draft folder associated with the e-mail client module 140 if the user chooses the save draft icon 1310 or deletes the draft if the user chooses the don't save icon 1312.

Figure 22:
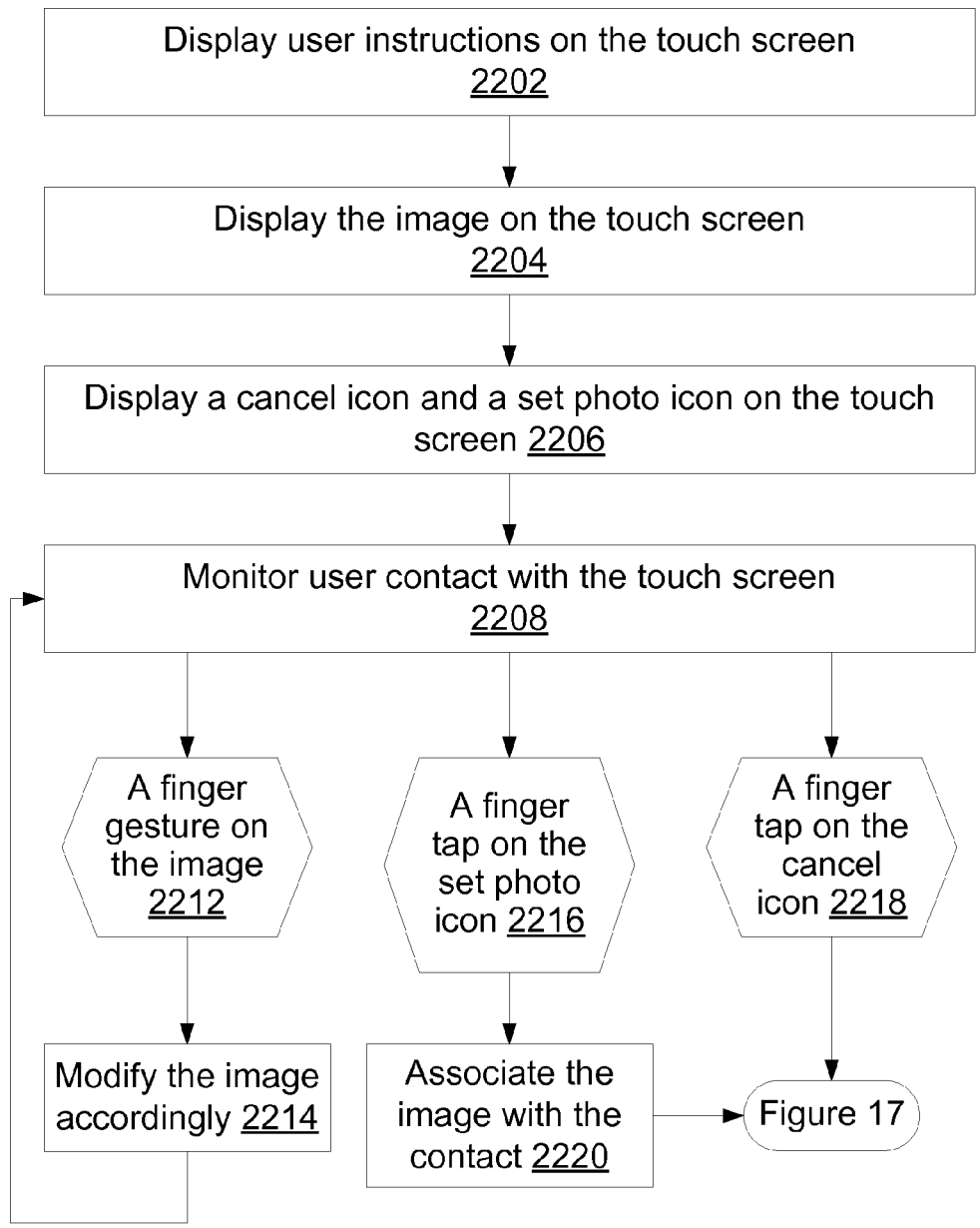
FIG. 22 is a flowchart illustrating a process for assigning an image to a user selected contact in the user's contact list in accordance with some embodiments.

Assuming that the user taps or makes other predefined gestures on the assign to contact icon 1210 shown in FIG. 12, FIG. 22 is a flowchart illustrating a process for assigning an image to a user selected contact in the user's contact list in accordance with some embodiments.

Upon a user selection of the assign to contact icon 1210, the portable electronic device displays the user's contact list (FIG. 14A). After the user selects a contact in the contact list (e.g., a finger tap 1401 on Bob Adams in FIG. 14A), the portable electronic device produces a new user interface 1400B as shown in FIG. 14B and monitors next user contact with the touch screen (2208). In some embodiments, the user interface 1400B includes the user instructions 1402 (2202), the user-selected image 1106 (2204), the cancel icon 1404 and the set photo icon 1406 (2206).

The portable electronic device modifies the image (2214) in response to a user finger gesture on the image 1106 (2212). For example, the user may crop, scale, and otherwise adjust the image 1106 using different types of finger gestures. In some embodiments, the portable electronic device moves the image on the touch screen in response to a movement of one-finger contact gesture 1408; enlarges the image in response to a de-pinching gesture including at least two simultaneous and continuous contacts 1410 and 1412; reduces the image in response to a pinching gesture including at least two simultaneous and continuous contacts 1410 and 1412; and/or rotates the image in response to a twisting gesture including two or more simultaneous and continuous contacts 1410 and 1412.

In some embodiments, the user assigns the modified image to the user-selected contact by tapping on the set photo icon 1406 (2216). This triggers the portable electronic device to associate the modified image with the contact. If the user selects the cancel icon 1404 (2218), the portable electronic device terminates the image assignment and brings back the user interface 1100.

If the user taps or makes other predefined gestures on the use as wallpaper icon 1212 in FIG. 12, the portable electronic device displays a user interface for incorporating an image in the user's wallpaper. FIG. 15 illustrates such an exemplary user interface 1500 in accordance with some embodiments.

In some embodiments, this wallpaper setting process is similar to the assign to contact process. For example, the user may move the image with a one-finger gesture 1508; enlarge the image with a de-pinching gesture using multiple contacts 1510 and 1512; reduce the image with a pinching gesture using multiple contacts 1510 and 1512; and/or rotate the image with a twisting gesture using multiple contacts 1510 and 1512.

The wallpaper setting process is completed after the user selects the set photo icon 1506. If the user selects the cancel icon 1504, the portable electronic device stops the assignment process and brings back the UI 1100 in FIG. 11. In some embodiments, the interface 1500 also includes user instruction information 1502.

FIGS. 23A-23H illustrate an exemplary user interface for viewing digital objects in a set of digital objects in accordance with some embodiments.

Figure 23A:
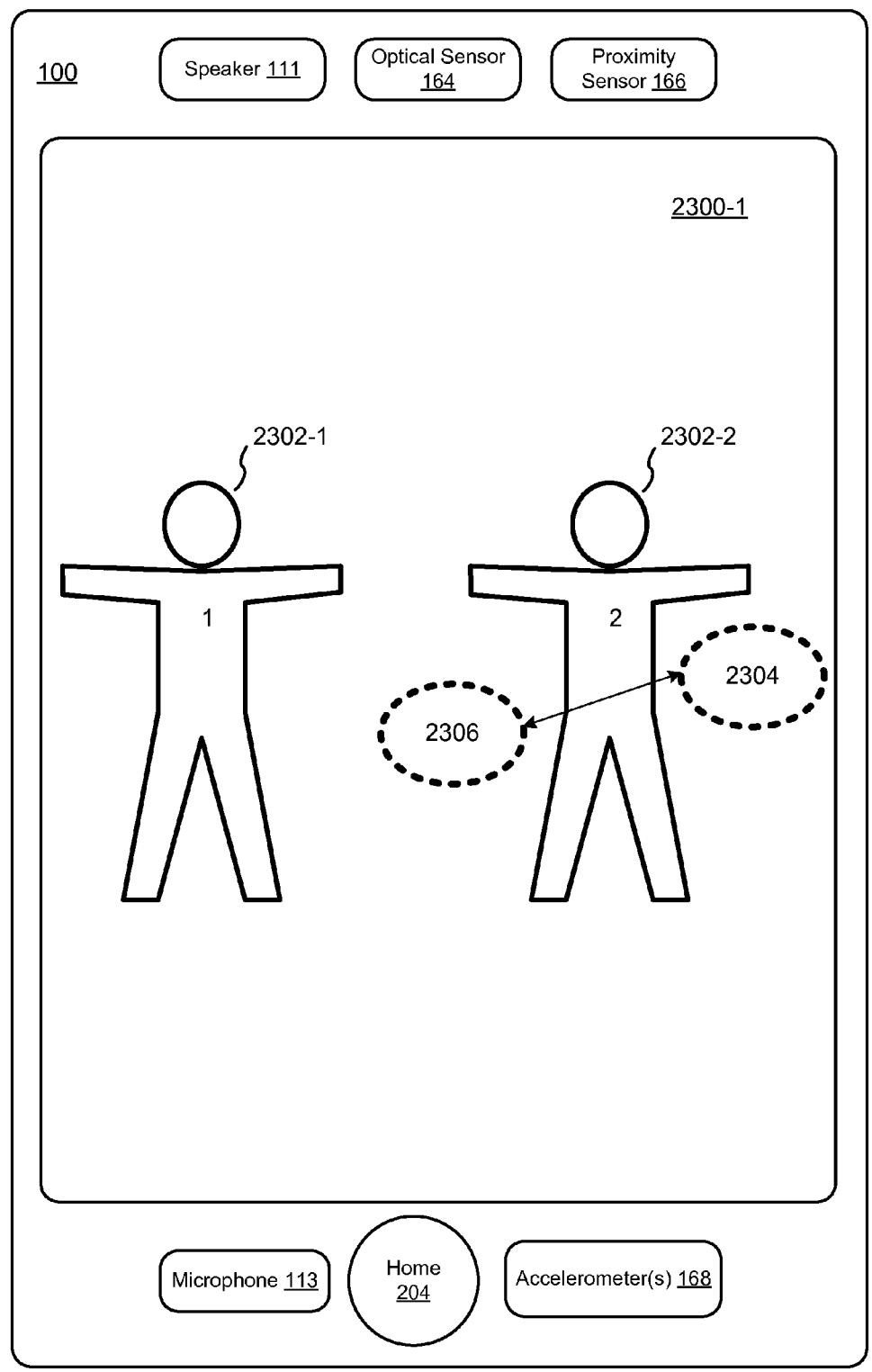
FIGS. 23A-23H illustrate an exemplary user interface for viewing digital objects in a set of digital objects in accordance with some embodiments.
Figure 23B:
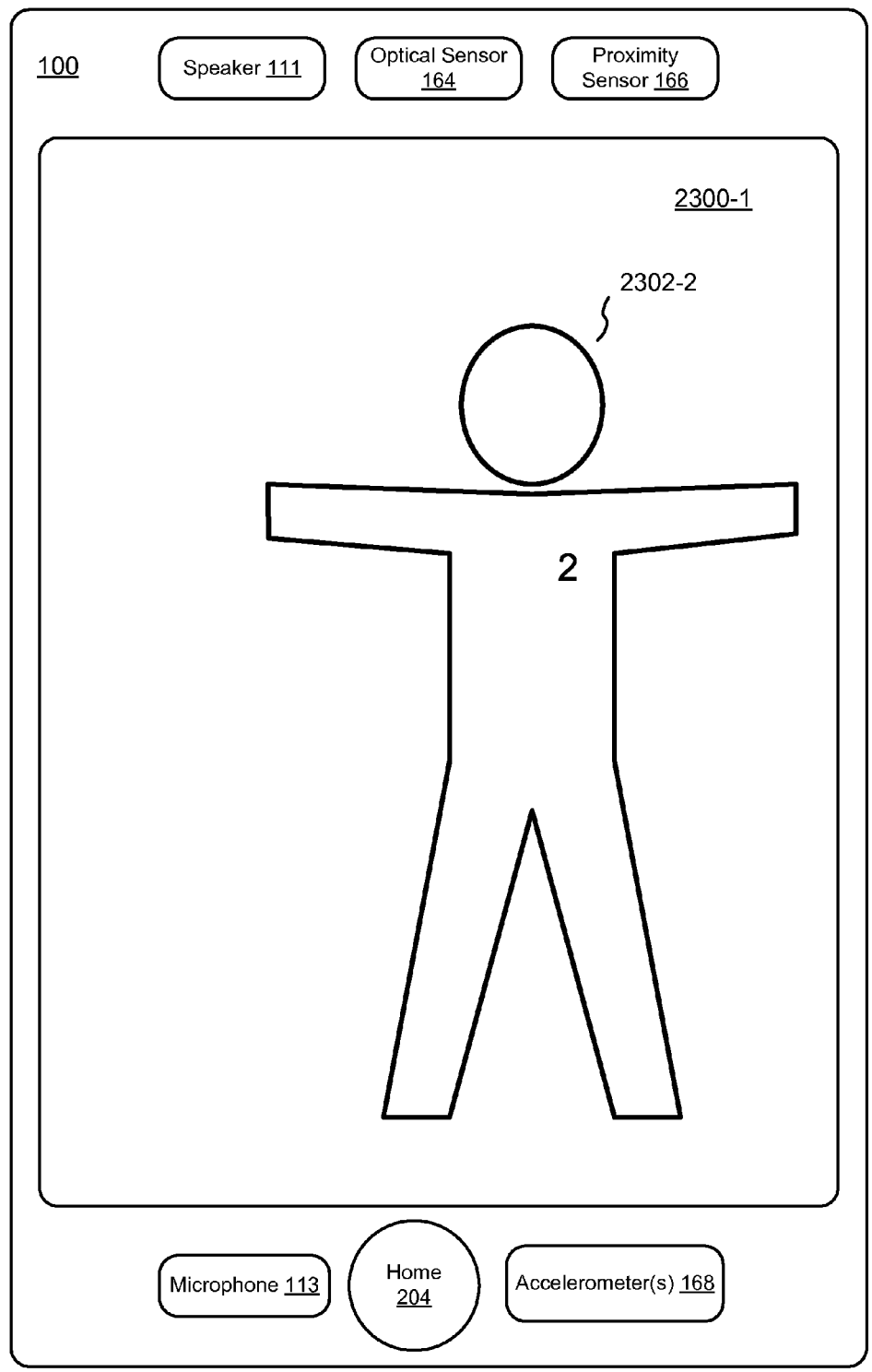

In FIG. 23A, the displayed digital object is a digital image 2300-1. In this example, the entire image 2300-1 is displayed in FIG. 23A. This exemplary image includes a first person 2302-1 and a second person 2302-2. In response to detecting a de-pinching gesture 2304 and 2306 on or about the second person 2302-2, a command to zoom in on a portion of the image 2300-1 that includes the second person 2302-2 is executed. Upon execution of the command to zoom in, a reduced portion of the image 2300-1 is displayed at a higher magnification than in FIG. 23A. For example, in FIG. 23B the second person 2302-2 is shown at a higher magnification than in FIG. 23A and the first person 2302-1 is no longer shown.

Figure 23C:
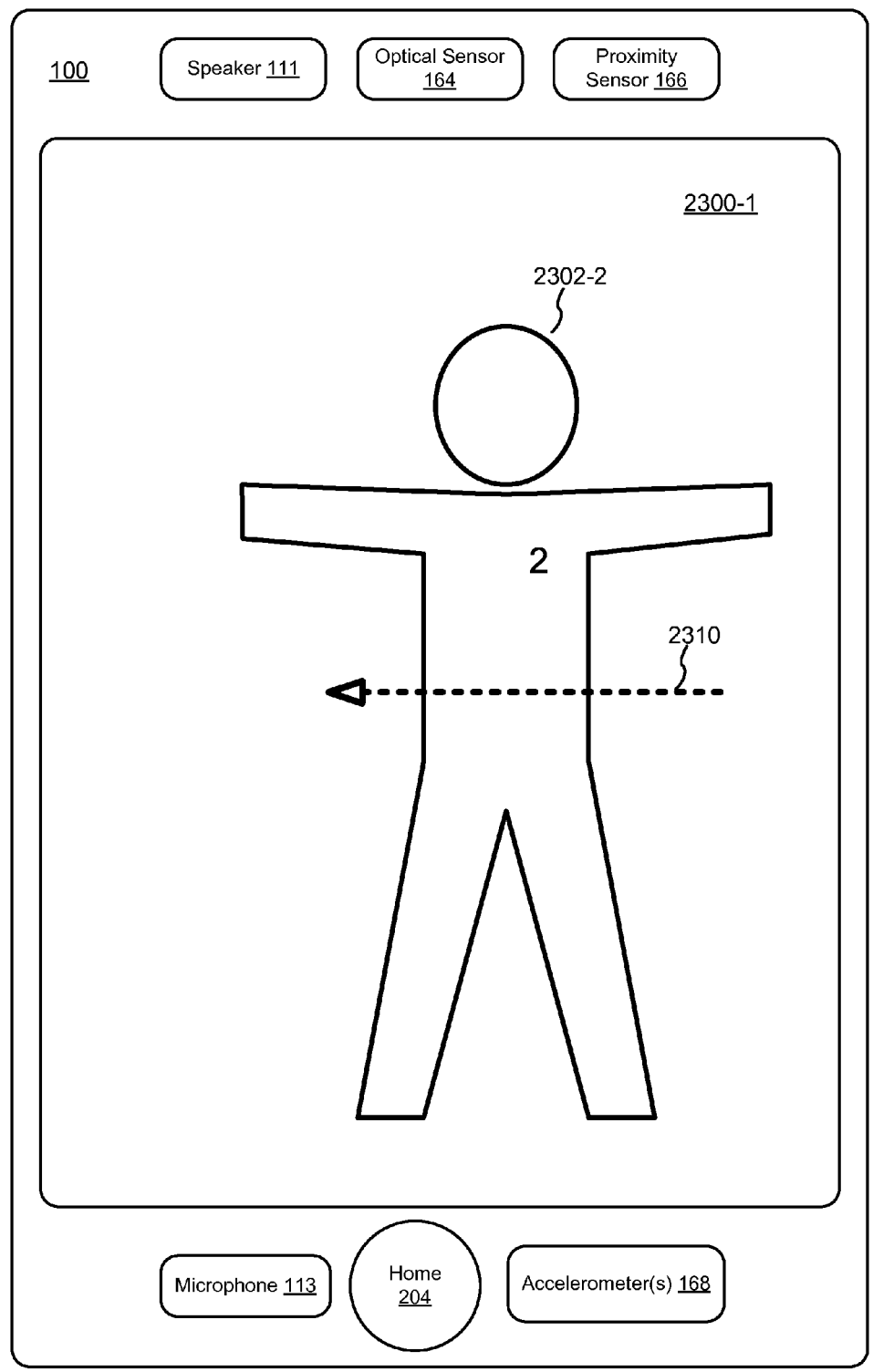
Figure 23D:
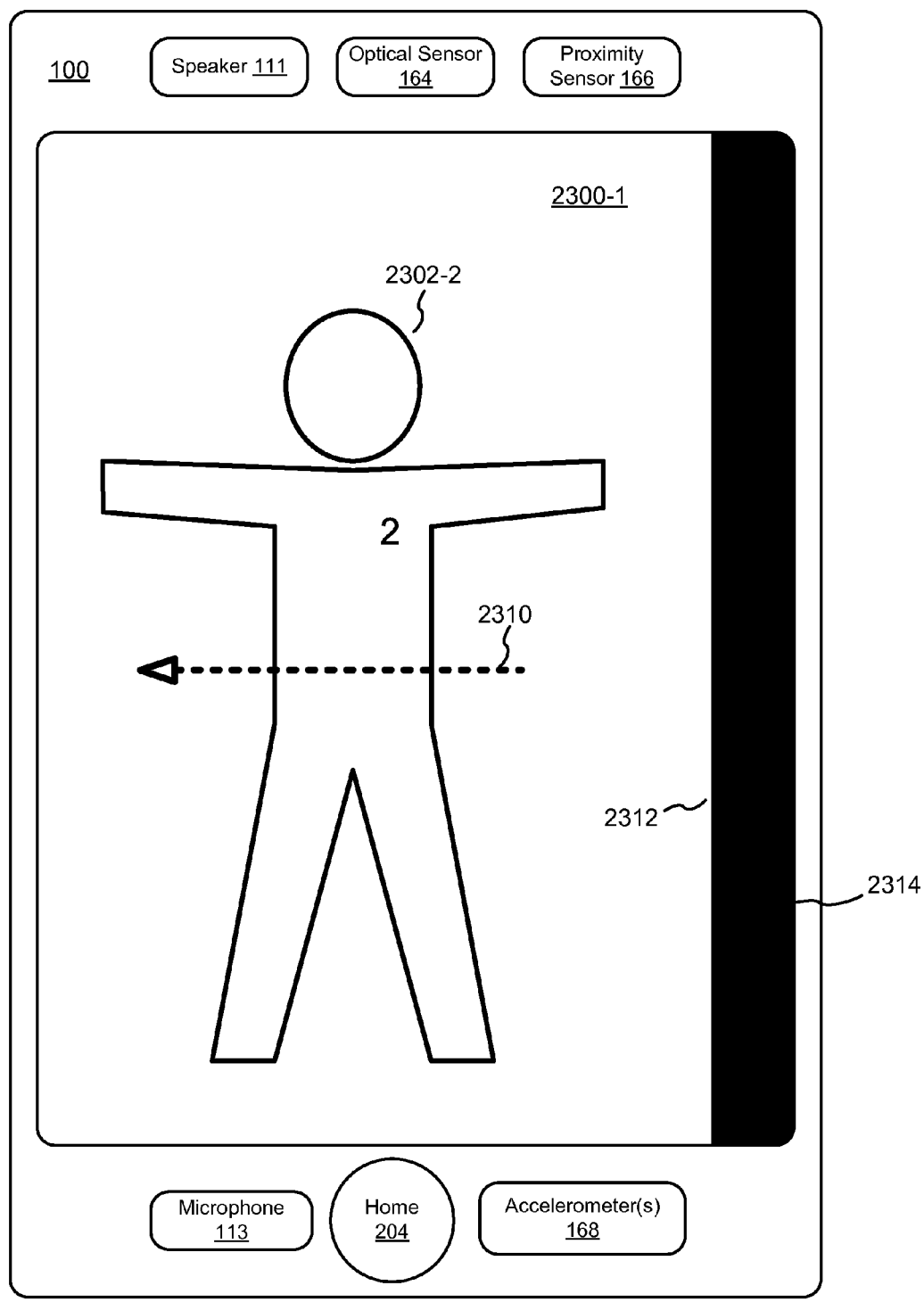
Figure 23E:
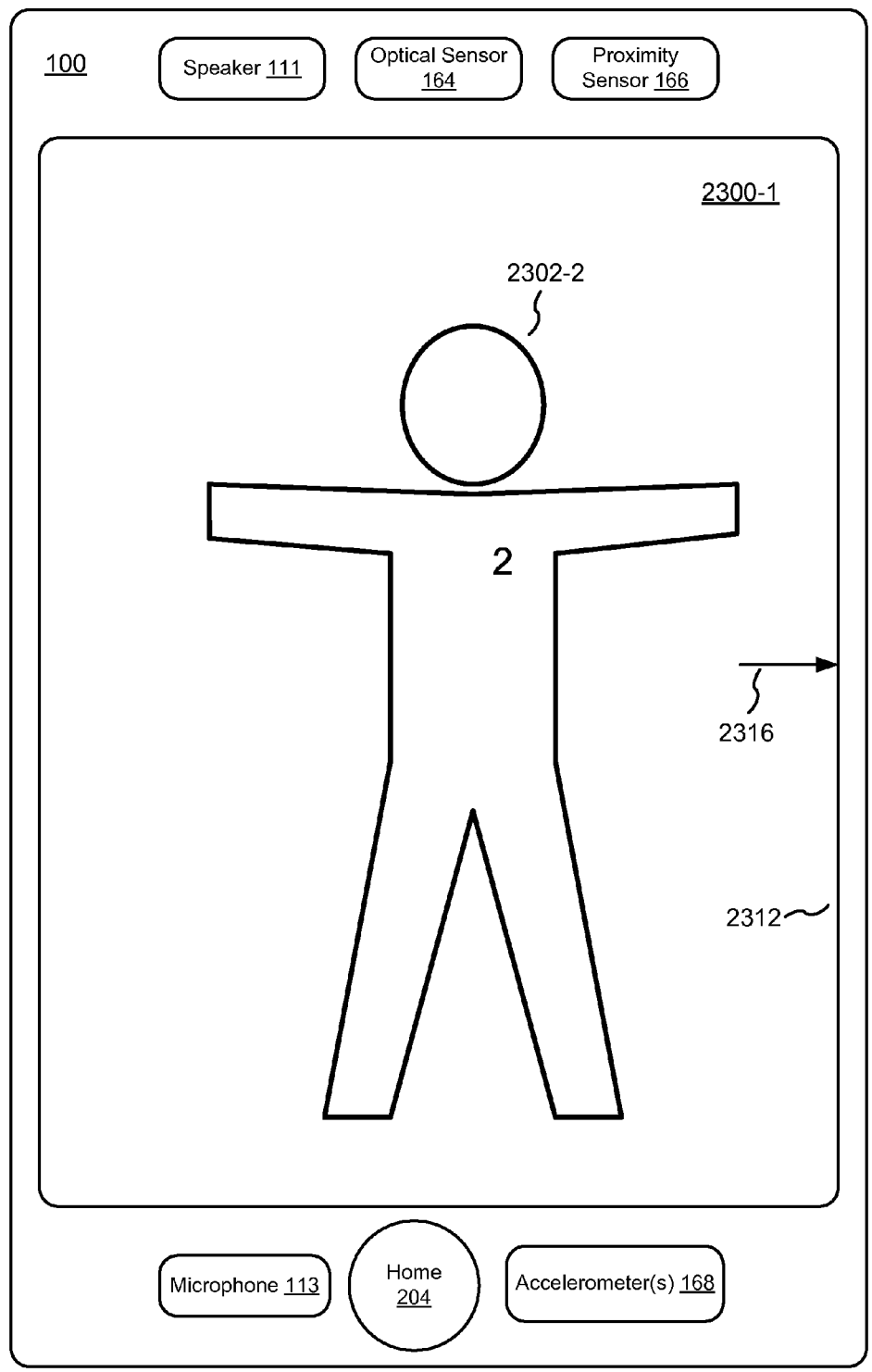
Figure 23F:
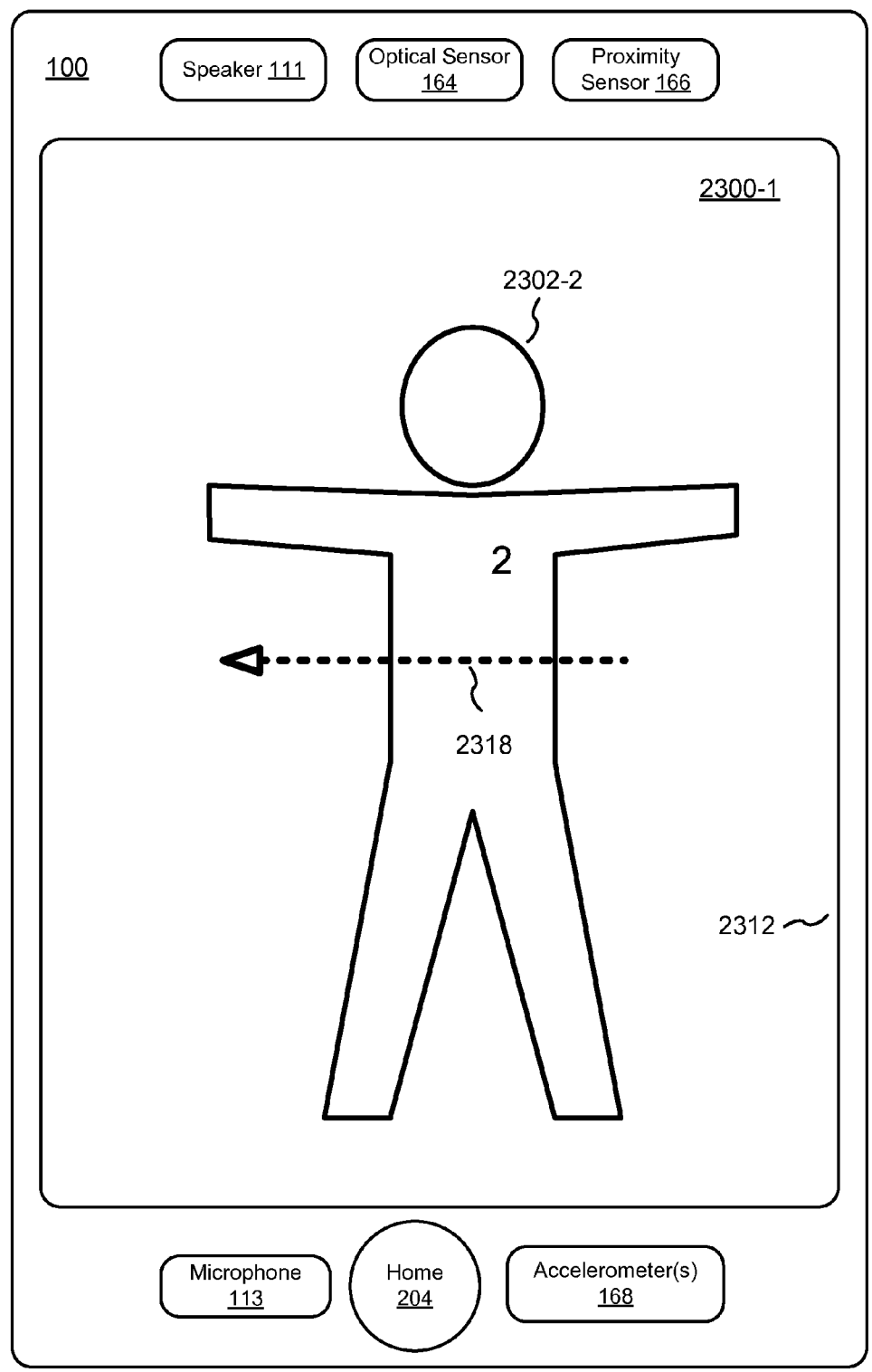

In FIG. 23C, a swipe gesture 2310 is detected on or near the touch screen display. In response, the displayed portion of the image 2300-1, including the second person 2302-2, is translated in a direction corresponding to the direction of the swipe gesture 2310, as shown in FIGS. 23C-23D, where the image is translated horizontally from right to left. An edge 2312 of the (enlarged) image 2300-1 is displayed in FIG. 23D. In response to continued detection of the swipe gesture 2310 (FIG. 23D), an area 2314 beyond the edge 2312 is displayed (e.g., a black area or other area visually distinct from the digital object). After the swipe gesture 2310 is no longer detected, as shown in FIG. 23E, the image 2300-1, including the image of the second person 2302-2, is translated in a second direction 2316 until the area 2314 is no longer displayed (e.g., horizontally from left to right).

Figure 23G:
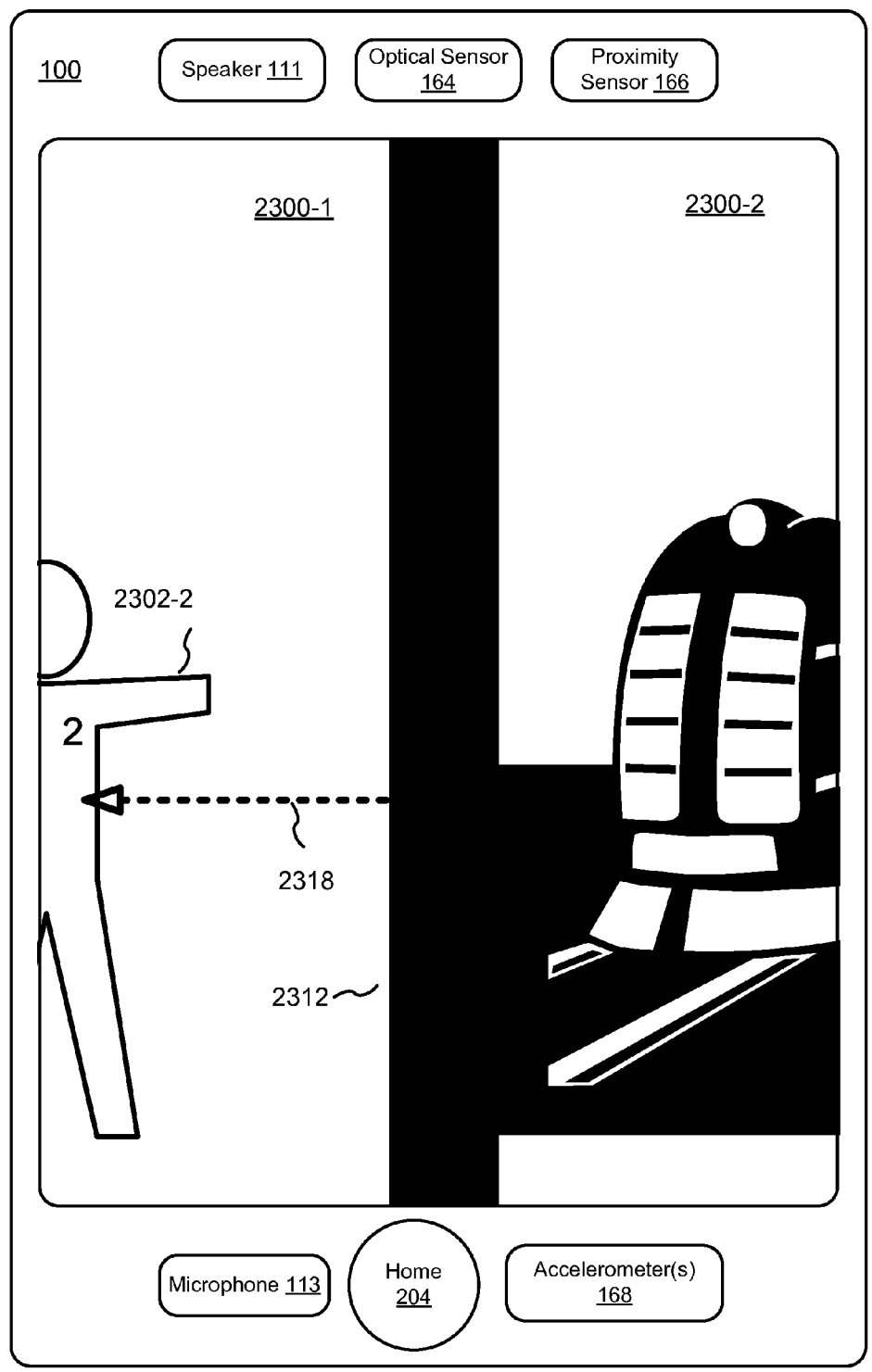
Figure 23H:
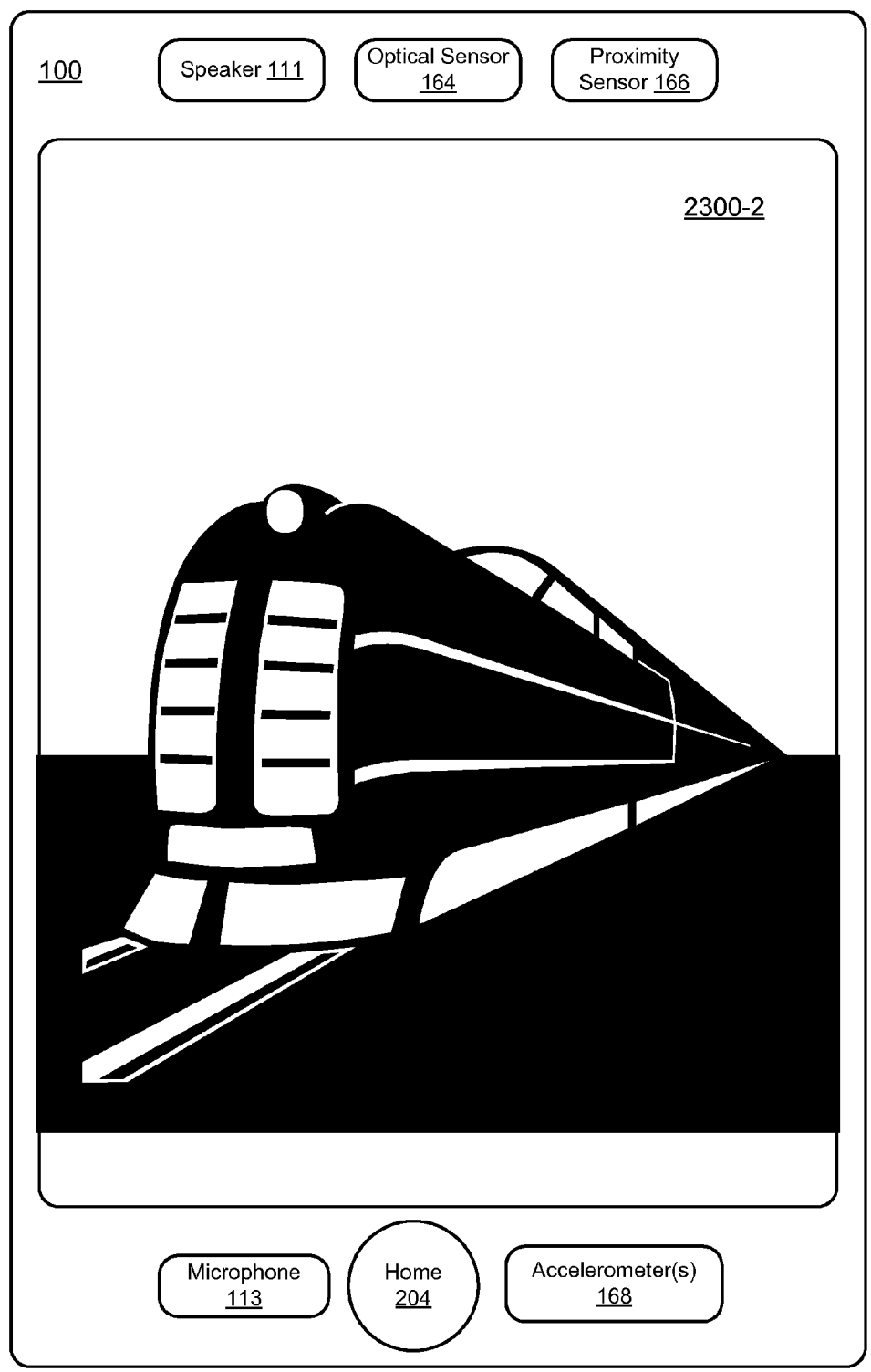

In response to detection of a second swipe gesture 2318, the displayed portion of the image 2300-1 is translated in a direction corresponding to the direction of the second swipe gesture 2318, as shown in FIG. 23G, and a second digital image 2300-2 is displayed. In some embodiments, as shown in FIGS. 23G and 23H, the second digital image 2300-2 (or, more generally, digital object) slides on to the touch screen as the first digital image 2300-1 slides off of the touch screen.

In this example, the display of area 2314 lets the user know that the edge of the (enlarged) digital object has been reached during the first gesture 2310. Upon detecting the second gesture 2318 in the same or substantially the same direction as the first gesture, the device transitions to the display of another image in a set of images, rather than just repeating the visual indication that the edge of the digital object has been reached.

FIG. 24 is a flowchart illustrating a process 2400 for viewing digital objects in a set of digital objects in accordance with some embodiments.

In some embodiments, a device with a touch screen display (e.g., device 100, a tablet computer, or a desktop computer with a touch screen display) detects (2402) a first movement of a physical object on or near the touch screen display. In some embodiments, the device is a portable electronic device. In some embodiments, the physical object is a finger. In some embodiments, the physical object is a stylus. In some embodiments, the first movement is a horizontal swipe gesture (e.g., 2310, FIG. 23C).

While detecting the first movement, the device translates (2404) a first digital object (e.g., a digital image 2300-1) displayed on the touch screen display in a first direction. In some embodiments, prior to the translating, at least one edge of the first digital object extends beyond the touch screen display in the first direction.

The first digital object is associated with a set of digital objects. In some embodiments, the set of digital objects is a set of digital images (e.g., 2300-1, 2300-2, etc., which may be part of an album or part of a set of images taken with a camera in the device). In some embodiments, the set of digital objects is a set of web pages (e.g., a set of web pages selected by a user for display in a browser). In some embodiments, the set of digital objects is a set of electronic documents.

In response to display of a previously hidden edge (e.g., edge 2312, FIG. 23D) of the first digital object and continued detection of the first movement (e.g., swipe gesture 2310, FIG. 23D), the device displays (2406) an area beyond the edge of the first digital object (e.g., area 2314).

After the first movement is no longer detected, the device translates (2408) the first digital object in a second direction until the area beyond the edge of the first digital object is no longer displayed. For example, in FIG. 23E the digital image 2300-1 is translated in a direction 2316 (e.g., horizontally from left to right) until the area 2314 is no longer displayed. In some embodiments, the second direction is opposite the first direction. In some embodiments, the first digital object is translated in the second direction using a damped motion. In some embodiments, the change from translating the first digital object in the first direction to translating the first digital object in the second direction until the area beyond the edge of the first digital object is no longer displayed makes the edge of the first digital object appear to be elastically attached to an edge of the touch screen display or to an edge displayed on the touch screen display.

The device detects (2410) a second movement (e.g., a second swipe gesture 2318 from right to left, FIG. 23F) of the physical object on or near the touch screen display.

In response to detecting the second movement while the previously hidden edge of the first digital object is displayed (e.g., edge 2312, FIG. 23F), the device translates (2412) the first digital object in the first direction and displays a second digital object (e.g., a digital image 2300-2, FIGS. 23G and 23H) in the set of digital objects.

Thus, depending on the context, similar movements (e.g., 2310 and 2318 are both right to left swipe gestures) allow a user to either (1) translate a displayed first digital object or (2) transition from displaying the first digital object to displaying a second digital object in a set of digital objects.

In some embodiments, the time between the first and second movements must be less than a predetermined value (e.g., 0.5 seconds). Otherwise, the device will not transition to displaying the second digital object. Rather, the device may just translate the first digital object and show the area beyond the edge of the object (to show the user again that the edge of the first digital object has been reached).

In some embodiments, if the entire first digital object is displayed (e.g., FIG. 23A), then the first movement (e.g., a horizontal swipe gesture) will transition the device to display another digital object in the set of digital objects.

Process 2400 permits a touch screen user to easily navigate within a displayed digital object and between digital objects in a set of digital objects.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A portable electronic device, comprising:
a phone,
a camera,
a camera roll adapted to manage images and/or videos taken with the camera,
one or more accelerometers adapted to detect an orientation of the portable electronic device, and
a touch screen display adapted to provide control of the phone, the camera, and the camera roll;
a processor;
a memory; and
one or more programs, wherein the one or more programs are stored in the memory and configured to be executed by the processor, the one or more programs including instructions for:
displaying a user interface for the camera on the touch screen display, the user interface for the camera including a viewfinder and a camera roll icon;
while displaying the user interface for the camera, detecting a finger gesture on the camera roll icon;
in response to detecting the finger gesture on the camera roll icon, entering the camera roll and displaying an icon that when activated initiates transfer to the user interface for the camera;
while in the camera roll, displaying an array of thumbnail images that corresponds to a set of photographic images taken with the camera;
detecting a user finger contact with a thumbnail image in the array;
upon detecting the user finger contact with the thumbnail image in the array, replacing the displayed array of thumbnail images with a corresponding photographic image, wherein the corresponding photographic image is displayed at a larger scale than the user-selected thumbnail image;
while displaying the corresponding photographic image at the larger scale, detecting a scrolling gesture comprising a substantially horizontal movement of a user finger contact with the touch screen display;
in accordance with the scrolling gesture, displaying a different photographic image in replacement of the corresponding photographic image; and,
while displaying the different photographic image, upon detection of a change in the orientation of the portable electronic device by the one or more accelerometers, rotating the different photographic image on the touch screen display to maintain a proper viewing orientation.

2. The device of claim 1, including instructions for:
while displaying the different photographic image, detecting a finger gesture on the icon that when activated initiates transfer to the user interface for the camera; and
in response to detecting the finger gesture on the icon that when activated initiates transfer to the user interface for the camera, displaying the user interface for the camera.

3. The device of claim 1, wherein thumbnail images of videos are visually distinguished from thumbnails of still images in the array.

4. The device of claim 1, including instructions for:
upon detecting user selection of an image deletion icon, displaying an image destruction animation of the different photographic image.

5. The device of claim 4, wherein the image destruction animation includes:
splitting the different photographic image into multiple vertical stripes; and
visually moving the multiple vertical stripes out of the touch screen display with different stripes moving at different speeds.

6. The device of claim 1, including instructions for:
upon detecting user selection of an email image icon, displaying an email composition user interface for composing an email message, with the different photographic image included in the email message being composed; and
after sending the email message, redisplaying the array of thumbnail images or the different photographic image.

7. The device of claim 6, including instructions for:
upon detecting the user selection of the email image icon, displaying an animation of the different photographic image being resized and placed into the email message being composed.

8. The device of claim 7, wherein the animation of the different photographic image includes
visually shrinking the different photographic image to a predefined size;
visually moving the email composition user interface into the touch screen, the user interface including a message body region; and
visually fitting the shrunken different photographic image into the message body region.

9. The device of claim 8, including instructions for:
upon detecting a user selection of the message body region, displaying a letter keyboard overlaid on the user selected image; and
upon detecting a user selection of the letter keyboard, displaying a user selected character in the message body region.

10. The device of claim 1, including instructions for:
upon detecting user selection of an image contact assignment icon, displaying a list of contacts; and,
upon detecting user selection of a respective contact from the list of contact, displaying a user interface for associating the different photographic image with the user selected contact.

11. The device of claim 10, wherein displaying a user interface for associating the different photographic image with the user selected contact includes enabling the user to adjust the different photographic image to form an adjusted image to be associated with the user selected contact.

12. The device of claim 11, wherein the adjustment of the different photographic image includes:
moving the different photographic image on the touch screen in response to a movement of an one-finger contact gesture;
enlarging the different photographic image in response to a de-pinching gesture including multiple simultaneous and continuous contacts with the touch screen; and/or
reducing the different photographic image in response to a pinching gesture including multiple simultaneous and continuous contacts with the touch screen.

13. A non-transitory computer readable storage medium storing one or more programs, the one or more programs comprising instructions, which when executed by a portable electronic device with
a phone,
a camera,
a camera roll adapted to manage images and/or videos taken with the camera,
one or more accelerometers adapted to detect an orientation of the portable electronic device, and a touch screen display adapted to provide control of the phone, the camera, and the camera roll, cause the electronic device to:

display a user interface for the camera on the touch screen display, the user interface for the camera including a viewfinder and a camera roll icon;

while displaying the user interface for the camera, detect a finger gesture on the camera roll icon;

in response to detecting the finger gesture on the camera roll icon, enter the camera roll and display an icon that when activated initiates transfer to the user interface for the camera;

while in the camera roll, display an array of thumbnail images that corresponds to a set of photographic images taken with the camera;

detect a user finger contact with a thumbnail image in the array;

upon detecting the user finger contact with the thumbnail image in the array, replace the displayed array of thumbnail images with a corresponding photographic image, wherein the corresponding photographic image is displayed at a larger scale than the user-selected thumbnail image;

while displaying the corresponding photographic image at the larger scale, detect a scrolling gesture comprising a substantially horizontal movement of a user finger contact with the touch screen display;

in accordance with the scrolling gesture, display a different photographic image in replacement of the corresponding photographic image; and, while displaying the different photographic image, upon detection of a change in the orientation of the portable electronic device by the one or more accelerometers, rotate the different photographic image on the touch screen display to maintain a proper viewing orientation.

14. A method, comprising:

displaying a user interface for a camera on a touch screen display of a portable electronic device, the user interface for the camera including a viewfinder and a camera roll icon, wherein:

the portable electronic device includes
a phone,
the camera,
a camera roll adapted to manage images and/or videos taken with the camera,
one or more accelerometers adapted to detect an orientation of the portable electronic device, and
the touch screen display adapted to provide control of the phone, the camera, and the camera roll;

while displaying the user interface for the camera, detecting a finger gesture on the camera roll icon;

in response to detecting the finger gesture on the camera roll icon, entering the camera roll and displaying an icon that when activated initiates transfer to the user interface for the camera;

while in the camera roll, displaying an array of thumbnail images that corresponds to a set of photographic images taken with the camera;

detecting a user finger contact with a thumbnail image in the array;

upon detecting the user finger contact with the thumbnail image in the array, replacing the displayed array of thumbnail images with a corresponding photographic image, wherein the corresponding photographic image is displayed at a larger scale than the user-selected thumbnail image;

while displaying the corresponding photographic image at the larger scale, detecting a scrolling gesture comprising a substantially horizontal movement of a user finger contact with the touch screen display;

in accordance with the scrolling gesture, displaying a different photographic image in replacement of the corresponding photographic image; and, while displaying the different photographic image, upon detection of a change in the orientation of the portable electronic device by the one or more accelerometers, rotating the different photographic image on the touch screen display to maintain a proper viewing orientation.

15. A portable electronic device, comprising:

a phone, a camera, a camera roll adapted to manage images and/or videos taken with the camera, one or more accelerometers adapted to detect an orientation of the portable electronic device, and a touch screen display adapted to provide control of the phone, the camera, and the camera roll;

a processor;

a memory; and one or more programs, wherein the one or more programs are stored in the memory and configured to be executed by the processor, the one or more programs including instructions for:

displaying a user interface for the camera on the touch screen display, the user interface for the camera including a viewfinder and a camera roll icon;

while displaying the user interface for the camera, detecting a finger gesture on the camera roll icon;

in response to detecting the finger gesture on the camera roll icon, displaying an array of thumbnail images that corresponds to a set of photographic images taken with the camera;

detecting a user finger contact with a thumbnail image in the array;

upon detecting the user finger contact with the thumbnail image in the array, ceasing to display the array of thumbnail images and displaying a corresponding photographic image related to the user-selected thumbnail image, wherein the corresponding photographic image is displayed at a larger scale than the user-selected thumbnail image;

while displaying the corresponding photographic image at the larger scale, detecting a scrolling gesture comprising a substantially horizontal movement of a user finger contact with the touch screen display;

in accordance with the scrolling gesture, cease to display the corresponding photographic image at the larger scale and display a different photographic image; and, while displaying the different photographic image, upon detection of a change in the orientation of the portable electronic device by the one or more accelerometers, rotating the different photographic image on the touch screen display to maintain a proper viewing orientation.

* * * * *